United States Patent [19]

Nagashima et al.

[11] Patent Number: 4,617,625
[45] Date of Patent: Oct. 14, 1986

[54] VECTOR PROCESSOR

[75] Inventors: Shigeo Nagashima, Hachioji; Hitoshi Abe; Yasuhiko Hatakeyama, both of Hadano, all of Japan

[73] Assignee: Hitachi, Ltd., Tokyo, Japan

[21] Appl. No.: 453,094

[22] Filed: Dec. 27, 1982

[30] Foreign Application Priority Data

Dec. 28, 1981 [JP] Japan ................... 56-210392

[51] Int. Cl.[4] .............................................. G06F 7/48
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 4,128,880 | 12/1978 | Cray, Jr. ................... | 364/200 |
| 4,302,818 | 11/1981 | Niemann .................. | 364/200 X |
| 4,433,394 | 2/1984 | Torii et al. ................ | 365/221 |
| 4,435,765 | 3/1984 | Uchioa et al. ............. | 364/200 |
| 4,458,330 | 7/1984 | Imsand et al. ............ | 364/900 |

FOREIGN PATENT DOCUMENTS

WO81/01892  7/1981  PCT Int'l Appl. .

Primary Examiner—Thomas M. Heckler
Attorney, Agent, or Firm—Antonelli, Terry & Wands

[57] ABSTRACT

A data processor has a plurality of vector registers capable of reading and writing in parallel; a plurality of ALU's; a plurality of sending circuits, one for each of said vector registers, each for updating a read address for the corresponding vector register requested by a succeeding instruction within such a limit that said read address does not pass a write address for said corresponding vector register requested by a preceding instruction and sending out a read data together with a data valid signal for each updating; circuits for sending the data and the data valid signals from said plurality of sending circuits to the ALU's requested by the corresponding instructions; and circuits, one for each of said ALU's, each for controlling the corresponding ALU such that when the data valid signals have been received from all of the vector registers necessary to execute the instruction which uses the corresponding ALU, the corresponding ALU operates on the data supplied with said data valid signals and sends out a data valid signal.

79 Claims, 26 Drawing Figures

|      R1      |      R2      |      R3      |
| V1 | W1 | GN1 | V2 | W2 | GN2 | V3 | W3 | GN3 |

| DGR | | | RGSW | |
|---|---|---|---|---|
| VI | WI | GNI | $W_i$ | $R_i$ |
| 1 | 1 | <8 | 0 | 0 |
| 1 | 0 | <8 | X | 0 |
| 0 | X | | X | X | i = GNI

X : DON'T CARE

VECTOR PROCESSOR

BACKGROUND OF THE INVENTION

The present invention relates to a program-controlled digital computer, and more particularly to a digital computer suitable to execute a vector operation at a high speed (hereinafter referred to a vector processor).

A vector processor has been proposed for high speed processing such as required for a large scale matrix operation, which frequently appears in a scientific and technical calculation.

A vector processor having a vector register and a chaining function for effectively displaying a fast operation speed of a plurality of pipelined ALU's and enhancing the transfer capability of operation data has been proposed (U.S. Pat. No. 4,128,880).

The prior art system has a problem in connection with the chaining function. This problem will be explained with reference to the following simple example of a vector operation.

| FORTRAN Sentence |
| --- |
| DO 10 I = 1, L |
| 10 Y (I) = A (I) + B (I) * C (I) |

This process is expressed by vector instruction as follows.

| 1. Vector Load | VR0 ← A |
| --- | --- |
| 2. Vector Load | VR1 ← B |
| 3. Vector Load | VR2 ← C |
| 4. Vector Multiply | VR3 ← VR1 * VR2 |
| 5. Vector Add | VR4 ← VR0 + VR3 |
| 6. Vector Store | VR4 → Y | where VRi is an i-th vector register.

Each vector instruction repeatedly executes the operation and the data transfer for L elements.

In the above example, a product of vectors B and C, which is an intermediate result, is temporarily stored in a vector register VR3 and only a sum Y of the product and a vector A is stored in a main storage. In general, in a vector processor having vector registers, an intermediate result of an operation is temporarily stored in the vector register VR1 and only a final result vector is stored in the main storage so that the number of times of data transfer to and from the main storage is substantially reduced. Accordingly, by increasing the speed of the read/write operations of the vector registers, the data transfer capability necessary for the operation is assured even if the accessing capability of the main storage is relatively low.

Considering the fourth and fifth vector instructions of the above example, the vector register VR3 which stores the product provided by the preceding instruction 4 also serves as a vector register from which an operand for the succeeding vector add instruction 5 is read. If the succeeding vector add instruction 5 is started after all of the L results have been written in the vector register VR3 by the fourth vector multiply instruction, the plurality of ALU's (for example, a multiplier and an adder) are not operated in parallel and the processing time is increased. The queuing or waiting time caused when reading the contents of the vector register as the operand for the succeeding vector instruction, which vector register stores the operation result for the preceding vector instruction or a fetched vector data also exists between the vector instruction 1 or 2 and 4, between the vector instructions 3 and 5 and between the vector instructions 5 and 6. The queuing can be relieved by a chaining function. In a prior art chaining operation, the operation result by the preceding vector instruction is written, e.g., in the vector register VR1 and it is simultaneously transferred to the ALU as the operand for the succeeding vector instruction. If the chaining operation is possible, an operation result for a first element of the preceding vector instruction is outputted without waiting for the completion of the operation for the final element of the preceding vector instruction, and the succeeding vector instruction is started. In this manner, in a multi-term vector calculation, a plurality of ALU's are operated in parallel so that the parallel operation capability is enhanced and a high speed operation is attained.

In the prior art chaining, however, the reading of the vector register for the succeeding vector instruction is started in full synchronism with the writing of the operation result vector by the preceding vector instruction or the first element of the fetched vector data into the vector register. At the start of the instruction, it is checked to see if the vector register from which the operand for the instruction is to be read is being used for writing by the preceding instruction, and if the decision is affirmative, the chaining condition is checked. If chaining is possible, the instruction is started, and if chaining is not possible, the start of the instruction is delayed until the writing of all elements by the preceding instruction is completed and the vector register is released. The chainable instruction is started when the operation result of the preceding vector or the first element of the fetched vector data arrives at the vector register. This is called a chain slot time. It is determined that the chaining is possible only when it is predicted at the chain slot time that the writing of all subsequent elements of the preceding instruction is fully synchronous with the readout of th succeeding instruction with respect to the all subsequent elements.

Thus, the prior art chaining operation has the following two restrictions.

(1) The vector instruction decoded after the writing of the first element (that is, after the chain slot time) is determined to be unchainable because the decoding time is after the chain slot time, and under these conditions, the start of the succeeding instruction is delayed until the writing by the preceding instruction is completed. For example, in the above example, when a plurality of vector instructions exist between the vector instructions 4 and 5 and hence the decoding time of the instruction 5 occurs after the chain slot time of the instruction 4, the chaining of the vector register VR3 is not possible and the start of the vector instruction 5 is delayed until the execution of the vector instruction 4 is completed. As a result, the processing time is increased.

(2) Many of the operations are in the form of two vector operands to be operated on to produce a result. If the two vector registers which store the two operands to be read are in the writing operation called for by the preceding instruction, it must be assured that all of the elements of those operands are written into those vector registers at the same time in order to chain those registers to cause the contents thereof to be inputted to the same ALU. In the above example, if it is predicted at the time of decoding of the vector instruction 5 that the arrival of the fetched vector data from the main storage 5 to the vector register VR0 by the vector instruction VR1 and the arrival of the product vector by the vector instruction 4 to the vector register VR3 are synchronized for all elements, it is determined that the chaining is possible and the instruction is instantly started. Accordingly, it is necessary that the consecutive elements of both vector data arrive consecutively in one cycle pitch to the vector registers and the chain slot times of the vector registers are identical.

However, the data fetching from the main storage is generally intermittent because of the bank conflict of a plurality of memory accesses and the intervention of the channel operation. As a result, the frequency or chance of utilization of the fetched vector data obtained by the preceding instruction by the chaining of the succeeding instruction is low. in actual practice, the coincidence of the chain slot times of the two vector data occurs only by chance. Accordingly, the chance of chaining in the prior art vector processor is low.

The prior art vector processor has a further problem. The prior art vector processor has a plurality of ALU's which are configured for parallel execution. Depending on the mutual relation of a plurality of instructions, the ALU's cannot be used in spite of the fact that they are vacant. In the prior art vector processor, the instruction is fetched in the sequence in which it is stored in the main storage and the execution condition is checked, and if the execution is possible it is executed. If the execution is not possible because all of the ALU's are busy or the register is busy etc., the instruction execution is delayed until it becomes possible. If an instruction next to an unexecutable instruction is executable, the instruction decoding is unconditionally delayed and hence the ALU's are not utilized.

In order to resolve the above problem, it is necessary to provide an instruction execution control system which does not execute the instruction in the sequence of the instruction decoding but stores several decoded instructions and executes the executable instructions while taking the order of utilization of the vector register into consideration.

Further, in the prior art vector processor, the conditions required to start the instruction execution include the availbility of the necessary registers and ALU's as well as the availability of the necessary data. As a result, the control of the start of the execution is complex and the decoding of the next instruction is delayed, resulting in an increase of the instruction execution time and a reduction of the performance.

SUMMARY OF THE INVENTION

It is a first object of the present invention to provide a vector processor capable of increasing the processing speed of vector instructions even under a condition that consecutive elements of vector data are intermittently supplied to a vector register.

It is another object of the present invention to provide a vector processor capable of starting a succeeding instruction which utilizes a vector register to which consecutive elements of vector data are intermittently supplied, without waiting for the storing of all elements of the vector data in the vector register.

It is another object of the present invention to provide a vector processor capable of starting a succeeding vector instruction which utilizes two vector registers to which all elements of vector data are asynchronously supplied, without waiting for the completion of the storing of all elements of those two vector data.

It is a further object of the present invention to provide a vector processor which is capble of supplying corresponding elements of a plurality of vector data, even when the elements are asynchronously supplied to respectively different vector registers, to an ALU or a memory requester in synchronism with the corresponding elements of those vector data.

It is a further object of the present invention to provide a vector processor capable of executing a succeeding instruction in advance of a preceding instruction when the preceding instruction is in an execution waiting condition.

It is a still further object of the present invention to provide a vector processor capable of starting the instruction execution when data necessary for the instruction execution is not available.

BRIEF DESCRIPTION OF THE DRAWINGS

The present invention will be apparent from the following detailed description taken in conjunction with the accompanying drawings, in which:

FIGS. 2a-2c show the formats of registers used in the present invention;

DESCRIPTION OF THE PREFERRED EMBODIMENT

1 SCHEMATIC CONFIGURATION

Figure 1:
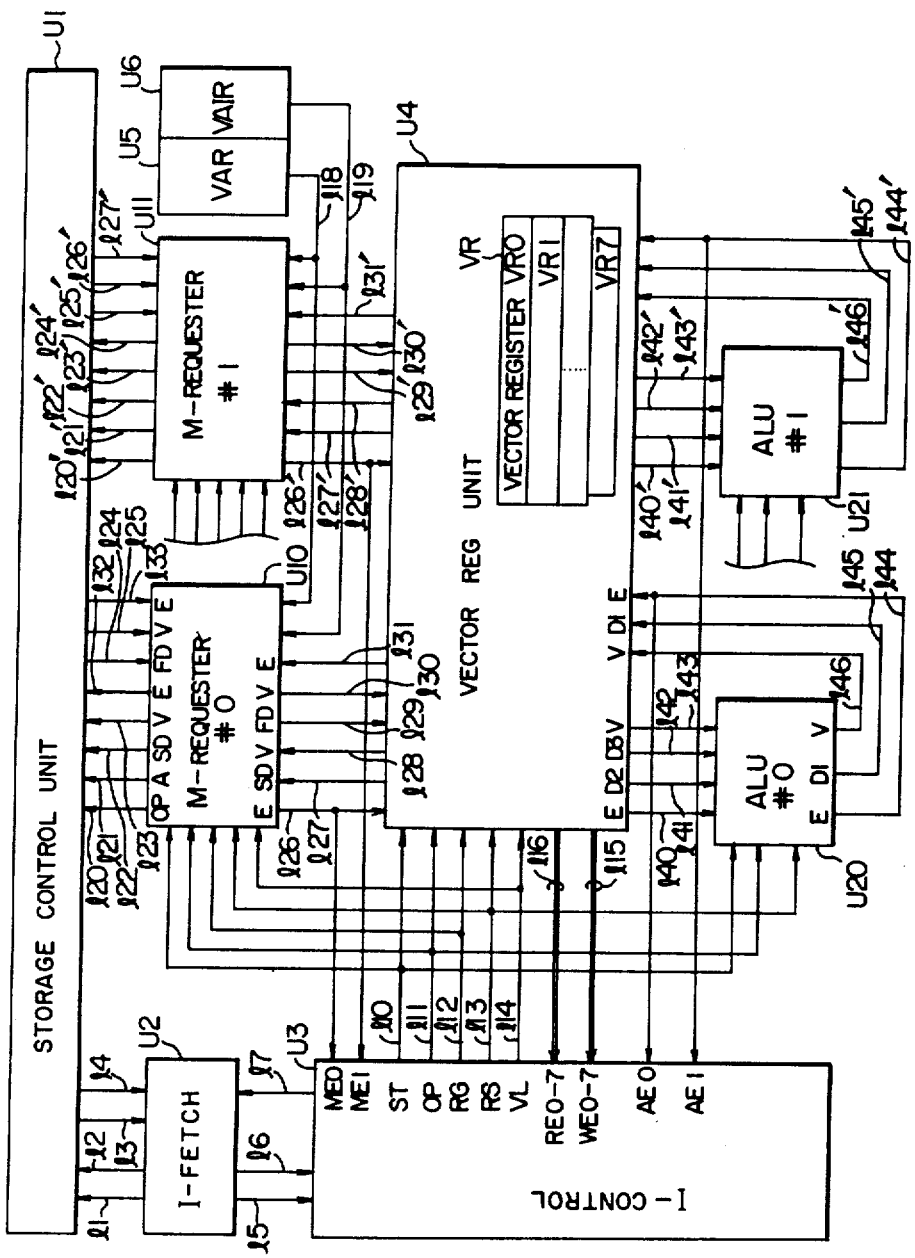
FIG. 1 shows the schematic configuration of a vector processor of the present invention.

Referring to FIG. 1, a storage control unit U1 executes operations in accordance with memory requests (vector data fetch or store requests and vector instruction fetch requests) from an instruction fetch unit (I-fetch) U2 and memory requesters U10 and U11.

The I-fetch U2 sends the instruction fetch request to the storage control unit U1 through a signal line 11 and sends an instruction address through a signal line 12. The storage control unit U1 responds thereto to fetch a plurality of instructions specified by the instruction address and sends back the fetched instructions through a signal line 13 and a signal indicating the validity of the fetched instructions through a signal line 14.

The I-fetch U2 stores the fetched instructions in an instruction buffer (not shown) and sends the instructions one by one to an instruction control unit (I-control) U3. The instruction is carried over a signal line 16 and an instruction valid signal is carried over a signal line 15. The I-fetch U2 fetches the instructions one by one and sends them to the I-control U3 unless the stopping of the instruction send-out operation is requested by the I-control U3 through a signal line 17.

The I-control U3 decodes the instructions and sends a start signal or other signal to memory requesters U10 or U11, a vector register unit U4 or an arithmetic and logical operation unit (ALU)U20 depending on the instructions.

2 GENERAL OPERATION

(i) Start of Instruction Execution

When the I-control U3 starts the instruction execution, necessary data is set on signal lines 111 -114 and a start signal is set on a line 110 so that the memory requesters U10 and U11 and the vector register unit U4, or the ALU's U20 and U21 and the vector register unit U4 are started.

A condition for the instruction execution is that the necessary memory requester U10 or U11, or the ALU U20 or U21 is not busy and the vector registers necessary for the instruction, of vector registers VR in the vector register unit U4, are available.

Whether or not a vector register is available is different from whether or not the vector register is busy as will be explained latter. In this regard, a vector register which is not busy nevertheless may not be available, and there may be registers which are busy but available.

An instruction which does not meet the start condition is registered in an instruction queue and if an instruction which meets the start condition is subsequently decoded, the decoded instruction is started in advance.

The signal line 111 sends an instruction code which specifies the type of operation of the instruction to be executed, such as add, multiply, vector fetch or vector store.

The signal line 112 designates the register number of the register to be used by the instruction. Each instruction can designate up to three registers. In the present embodiment, the vector register unit U4 includes eight vector registers VR0–VR7 and the same number of vector address registers U5 and vector address increment registers U6 are connected to the memory requesters 0 and 1. The vector registers, vector address registers and the vector address increment registers are assigned numbers from the groups 0–7, 8–15 and 16–23, respectively.

The signal line 113 designates the memory requester number or the ALU number to be started. The signal line 113 includes three lines, one for designating the memory requester, one for designating the ALU and one for designating the memory requester number or the ALU number to be used by the instruction. The numbers of the memory requesters and the ALU's are two, respectively, so that only one line is needed to designate the number.

The signal line 114 designates the number of vector elements to be processed.

The memory requesters U10 and U11, the vector register unit U4 and the ALU's U20 and U21 carry out the following operations in response to the start signal on the line 110.

(ii) Vector Data Fetching from Main Storage

When the execution of this instruction is specified by the instruction code on the line 111, the memory requester U10 selects one of the vector address registers U5 and one of the vector address increment registers U6 in accordance with the second and third register numbers designated by the signal line 112 and sets the vector address and its increment therein. The memory requester U10 sends a read command, a vector address and an address valid signal to the storage control unit U1 through signal lines 120, 121 and 123, respectively. The storage control unit U1 fetches the vector element data specified by the vector adddress from a main storage (not shown) and sends back the fetched data FD and a data valid signal to the memory requester U10 through signal lines 124 and 125, respectively. The memory requester U10 sends the data and the data valid signal to the vector register unit U4 through signal lines 129 and 130, respectively. The vector register unit U4 stores the vector element data supplied from the line 29 in a vector register of a first register number designated by the signal line 112. The memory requester U10 updates the vector address in accordance with the vector address increment and fetches the next vector element data in accordance with the updated address. This operation is repeated by the number of times equal to the number of vector elements designated by the signal line 114. When the memory requester U10 sends the address of the last vector element to the storage control unit U1, it sends out a last vector data signal to a line 132. When the storage control unit U1 sends the last vector element, it sends out the last vector data signal to a line 133. When the memory requester U10 sends out the data valid signal for the last vector element, it sends out simultaneously the last vector data signal to a line 126. This signal is sent to the I-control U3 to indicate that the memory requester U10 is free and it is also sent to the vector register unit U4 to control the termination of the writing of the vector registers. The end of the writing of the vector registers indicated from the vector register unit U4 to the I-control U3 through the signal line 115.

(iii) Vector Data Storing to Main Storage

When an instruction to store vector data in the main storage is executed, the vector address and its increment are set in the memory requester U10, as in case of (ii).

The vector register unit U4 reads the vector data one by one from the vector registers having the register numbers designated by the signal line 112 and sends them out to the signal line 127. It also sends the data valid signal to the memory requester U10 through the line 128. The memory requester U10 adds the vector address and sends a write command, the vector address, the vector element data and the data valid signal to the storage control unit U1 through the signal lines 120, 121, 122 and 123, respectively. When the vector data element to be sent is the last one, the memory requester U10 further sends out the last vector data signal to the line 132. The storage control unit U1 controls the storing to the main storage. When a necessary number of vector elements have been sent from the vector register unit U4, the last vector data signal is sent to the memory requester U10 through the signal line 131, and the memory requester U10 sends it to the I-control U3 through the signal line 126, as is the case of (ii).

(iv) Vector Operation

When the ALU U20 or U21 (let us assume U20 here) and the vector register unit U4 are started to execute a vector operation instruction, they operate as follows. It is assumed that the ALU can execute a plurality of types of operations required by various instructions.

The vector register unit U4 reads a first vector element data from each of the vector registers of two register numbers designated by the signal line 112 and sends them to the ALU U20 through signal lines 141 and 142 and it also sends the data valid signal through a signal line 143. The ALU U20 operates on the two vector element data in accordance with an OP code on the line 111 and sends back an operation result and the data valid signal to the vector register unit U4 through signal lines 145 and 146, respectively. The vector register unit U4 stores the result in the vector register having the register number designated by the signal line 112. This operation is repeated for the other vector element data. For the last vector element, the last vector data signal is sent from the vector register unit U4 to the ALU U20 through the signal line 140 and it is sent back to the vector register unit U4 through the signal line 144 in synchronism with the last result from the ALU U20. This signal is also sent to the I-control U3 to indicate that the ALU is free and the vector register is vacant.

The vector element data is transferred in response to a machine clock. When a pair of vector element data to be transferred are not in the vector registers, the vector register unit U4 inhibits the transfer until they have become available. Accordingly, the fetching and the writing of the vector elements are carried out intermittently.

The memory requester U11 and the ALU U21 are of the same construction as the memory requester U10 and the ALU U20, respectively, and signal lines with primed reference numbers in FIG. 1 correspond to those with unprimed numbers.

3 REGISTERS

Before the explanation of detailed operations, the formats of necessary registers will be first explained. FIG. 2a shows the format of an instruction register (I-register) in which an instruction is loaded. An OP field represents an OP code, and the R1, R2 and R3 fields represent register numbers. The instruction has the fields shown in FIG. 2a. The registers designated by the R1, R2 and R3 fields are the vector register, the vector address register and the vector address increment register. They are designated depending on the type of instruction as shown below.

(i) Instruction to operate in the ALU (add instruction, multiply instruction, etc.)

R1: Vector register number in which an operation result vector is to be stored.

R2: Vector register number in which the vector data to be operated (summand (number to be added)on, multiplicand, etc.) is stored.

R3: Vector register number in which the vector data to operate on (addend, multiplier, etc.) is stored.

It is assumed that the R1, R2 and R3 fields designate the different vector registers.

The R3 field may not be used depending on the instruction (transfer instruction, etc.)

(ii) Instruction to fetch data from the main storage

R1: Vector register number in which data is to be stored.

R2: Vector address register number.

R3: Vector address increment register number.

(iii) Instruction to store data in the main storage

R1: Vector register number in which data is stored

R2: Vector address register number

R3: Vector address increment register number

FIG. 2b shows the format of the registers which relate to the control of the ALU's U20 and U21 and the memory requesters U10 and U11 (which are hereinafter referred to as a resource), that is, a decoded resource register (DS register), a queue resource register (QS register), an executable resource register (ES register) and a register unit resource register (RS register). S, A and N fields designate the use of the memory requester, the use of the ALU and the number of the memory requester or the ALU, respectively. The DS register and the QS register have no N field.

FIG. 2c shows the format of the registers which relate to the control of the vector registers, that is, a decoded register register (DG register), a queue register register (QG register), a memory requester register register (MG register) and a register unit register register (RG register). A Vi (i =1–3) field designates the presence or absence of valid data in Wi, GNi fields, and a Wi field designates whether a vector register designated by the GNi field is used for writing or reading. It is "1" for writing and "0" for reading. An Ri field of the instruction is loaded in the GNi field. The MG register has only the GN2 and GN3 fields.

FIG. 2d shows the format of a resource status word register (RSSW register) which controls the resource status. S0 and S1 fields indicate whether the memory requesters U10 and U11 are busy or not, respectively, and A0 and A1 fields indicate whether the ALU's are busy or not, respectively ("1" for busy).

FIG. 2e shows the format of the register status word register (RGSW register) which controls the vector register status. W0–W7 fields indicate whether the vector registers VR0–VR7 are busy for writing or not, respectively and R0–R7 fields indicate whether the vector registers VR0–VR7 are busy for reading or not, respectively ("1" for busy).

4 DETAIL OF I-CONTROL

Details of the units shown in FIG. 1 are now explained. The storage control unit U1 (FIG. 1) and the I-fetch U2 (FIG. 1) respond to the access requests from the memory requesters U10 and U11, and when the access requests are issued simultaneously from those requesters, one of them is preferentially accepted to access the main storage. Those units are similar to the conventional ones and they are not explained here. Timing inputs to flip-flops and registers are omitted. It is assumed that those flip-flops and registers which have no control-signal input thereto have inputs set at a predetermined timing.

Figure 3:
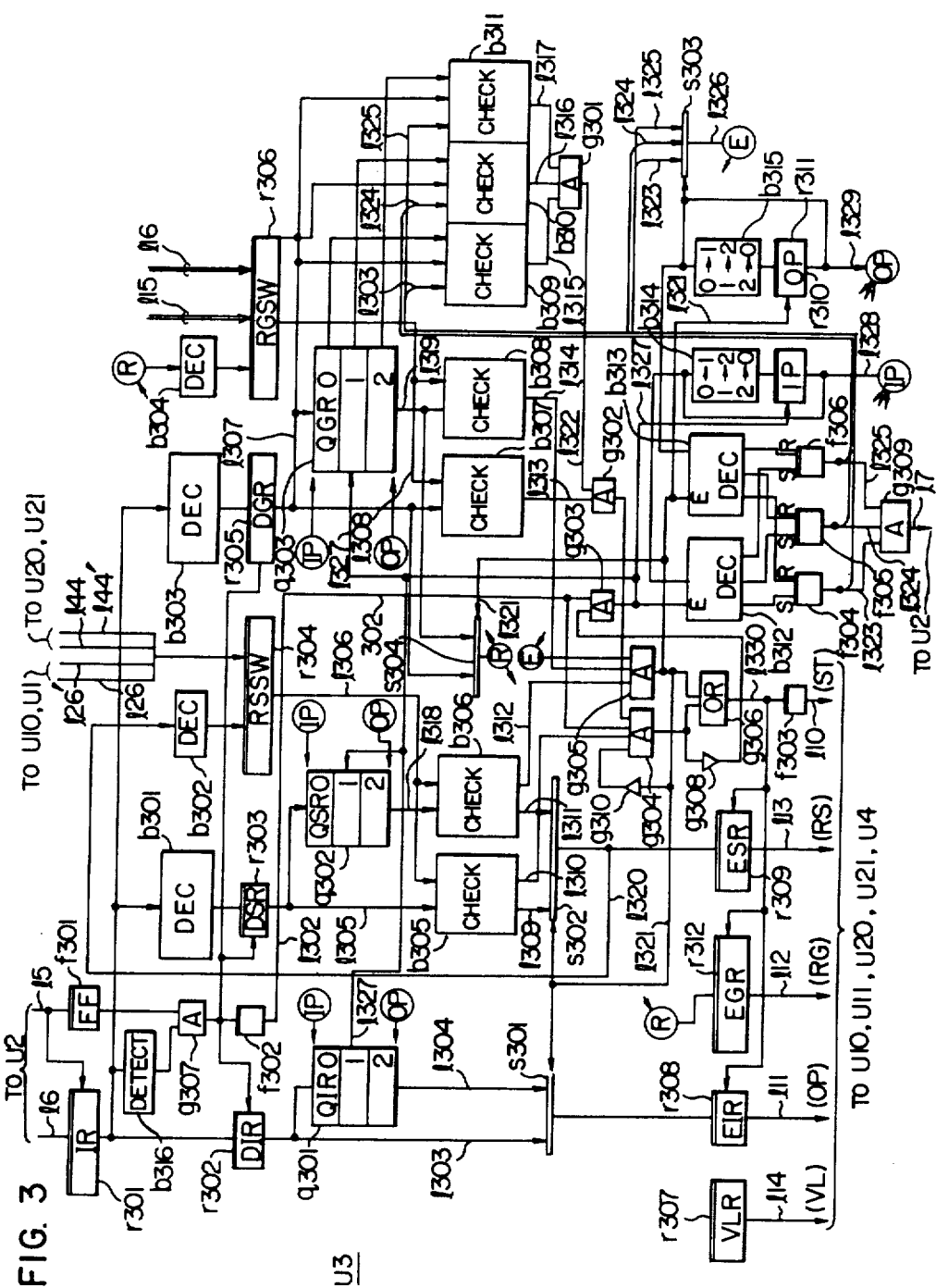
FIG. 3 shows details of an instruction control unit.

Referring to FIG. 3, the vector instruction fetched by the I-fetch U2 and the instruction valid signal are sent over the lines 16 and 15, respectively. The instruction is set in the I-register r301 and the instruction valid signal is set in a flip-flop f301. The instruction valid signal is also used as a set signal to the I-register r301. Unless the I-control U3 sends an instruction-send-out-stop request through the line 17, the I-fetch U2 sends out the instructions one by one in sequence. The time interval is controlled such that immediately after the instruction in the I-register r301 has been transferred to a decoded instruction register (DI register) r302, the next instruction is received. The instruction set in the I-register r301 is transferred through four routes. The OP field is transferred to the DI register r302. An output of the flip-flop f301 controls the setting to the DI register r302 and it is transferred also to a flip-flop f302 through an AND gate g307. The AND gate g307 receives the output of the flip-flop f301 as well as an output of a register designation exception detection circuit b316, which checks the R1–R3 fields of the vector instruction set in the I-register r301 and produces "1" output only when there exists no register designation exception. As a result, the instruction valid signal is set in the flip-flop f302. The instruction in the I-register r301 is also sent to a decoder b301 which determines the resource to be used in accordance with the OP code, and the decoded result is set in a decoded resource register (DS register) r303. The DS register r303 has the S and A fields as shown in FIG. 2b. It does not have the N field. When the OP field designates the use of the memory requester U10 or U11, the decoder b301 sets "1" in the S field, and when the instruction requires the use of the ALU U20 or U21, it sets "1" in the A field. The output of the AND gate g307 is used to set this data into the DS register 303. The instruction in the I-register r301 is further sent to a decoder b303 which decodes the OP code and the contents of the R1, R2 and R3 fields, and the decoded result is set in a decoded register register (DG register) r305. As shown in FIG. 2c, the DG register r305 has the fields GNi (i=1–3) for designating the vector register numbers to be used by the instruction in the I-register r301, the fields Wi (i=1–3) for designating the reading or the writing of the registers and the fields Vi (i=1–3) for designating the validity of those fields. The decoder b303 decodes the instruction in the I-register r301 to supply the field information. Since the OP code of the instruction indicates whether or not the R1–R3 fields of the instruction are valid for the register designation, the decoder b303 determines Vi in accordance with the OP code. Since the OP code also indicates whether the valid register fields Ri are for the writing or not, the decoder b303 can determine the bits Wi in accordance with the OP code. The decoder b303 supplies the contents of the fields Ri to the GNi fields. In this manner, the inputs to the DGR register r305 are determined. The output of the AND gate g307 is also used to control the setting of data into th DG register r305.

As is apparent from the above description, the decoded results set in the DS register r303 and the DG register r305 and the OP code set in the DI register r302 relate to the same instruction. Hereinafter, in some cases for the sake of simplificacation, the data set in those registers are respectively referred to as the instructions or collectively referred to as the instruction in the DI register r302. When the instructions have been set in the DI register r302, the DS register r303 and the DG register r305, the start condition of the resource is checked.

An instruction queuing register (QI register) q301 comprises three registers QIR0–QIR2 which receive the OP codes of the queued instructions from the DI register r302 and store them therein. A resource queuing register (QS register) q302 comprises three registers QSR0–QSR2 which receive and store resource requests for the OP codes in the three registers QIR0–QIR2 from the DS register r303, and a register queuing register (QG register) q303 comprises three registers QGR0–QGR2 which receive and store vector register requests for the OP codes in the registers QIR0–QIR2 from the DG register r305. Thus, three queued instructions are stored in the registers q301–q303. Hereinafter, for the sake of simplification, those three registers q301 to q303 are sometimes collectively referred to as the instruction queuing register or the instruction queuing register q301.

The start condition of the resource for the instruction newly set in the DI register r302 as described above, is determined by different criteria depending on whether an instruction has already been stored or not in the instruction queuing register.

There are the following cases:
(a) When there is no instruction stored in the instruction queuing register:
(a-1) When the instruction in the DI register r302 can be immediately started:
(a-2) When the instruction in the DI register r302 cannot be immediately started and the instruction must be stored in the instruction queuing register:
(b) When there is an instruction already stored in the instruction queuing register:
(b-1) When the instruction already stored in the instruction queuing register is to be started first:
(b-2) When the instruction in the DI register r302 is to be started before the start of the instruction in the instruction queuing register:

The operations for the respective cases will be described below.

(a-1) When there is no instruction stored in the instruction queuing register q301 and the instruction in the DI register r302 is to be started:

This occurs when both the resource (ALU or memory requester) and the vector register required by the instruction in the DI register r302 are available.

In the present embodiment, each resource is constructed to be available only for one instruction at one time. Accordingly, whether the resource is available or not is determined by whether the resource is busy or not.

The non-busy condition of the resource is determined in the following manner. A resource usage check circuit b305 checks the status of the requested resources designated by the DS register r303 and the status of the resources controlled by the RSSW register r304 and sends a signal indicating the non-busy condition of the requested resources through a line 1310 and a non-busy resource number through a line 1309. This will be explained in detail with reference to FIG. 5.

Figure 5:
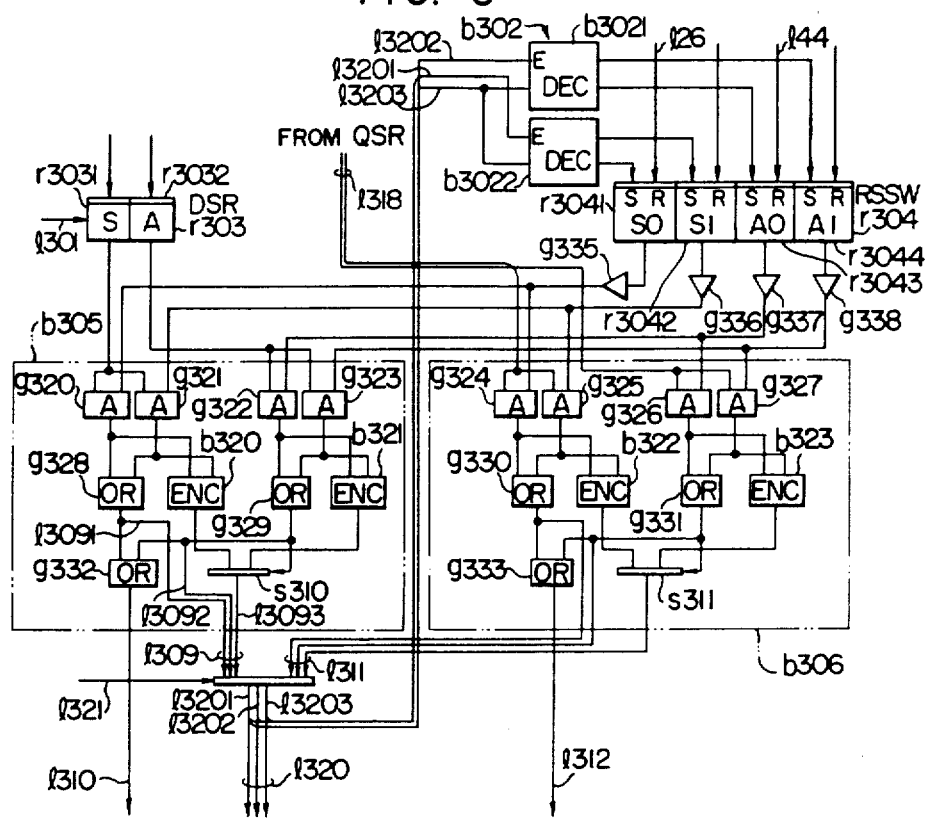
FIG. 5 shows details of a resource usage check circuit.

As seen in FIG. 5, an output of the S field r 3031 of the DS register r303 is supplied to AND gates g320 and g321, to which outputs of the S0 field r3041 and the S1 field r3042 of the RSSW register r304 are supplied through inverters g335 and g336, respectively. Accordingly, outputs of the AND gates g320 and g321 are "1" when the memory requesters U10 and U11 are requested, respectively, and the memory requesters U10 and U11 are not busy, respectively. The outputs of the AND gates g320 and g321 are supplied to an OR gate g328. Accordingly, an output of the OR gate g332 is "1" when a requested memory requester U10 or U11 is not busy. The outputs of the AND gates g320 and g321 are also supplied to an encoder b320 which produces an available memory requester number. Thus, when the output of the AND gate g320 is "1", the output of the encoder b320 is "0" (indicating the non-busy condition of the memory requester U10) independently of the output of the AND gate g321, and when the output of the AND gate g320 is "0" and the output of the AND gate g321 is "1", the output of the encoder b320 is "1" (indicating the non-busy condition of the memory requester U11). (In the present embodiment, one output line of the encoder is used because only two memory requesters are provided.) When both the output of the AND gates g320 and g321 are "0", the output of the encoder b321 may be either "1" or "0". Similarly, the non-busy conditions of the ALU's are checked by inverters g337 and g338, AND gates g322 and g323, an OR gate g329 and an encoder b321 based on an output of the A field r3032 of the DS register r303 and outputs of the A0 and A1 fields r3043 and r3044 of the RSSW register r304. If an ALU is requested by the instruction and the requested ALU U20 or U21 is not busy, the output of the OR gate g329 is "1" and the ALU number is supplied from the encoder b321. Outputs of the OR gates g328 and g329 are supplied to an OR gate g332. An output line 1310 therefrom indicates the non-busy condition of the requested resource. On the other hand, one of the outputs of the encoders b320 and b321 is selected by a selector S310 and supplied to a line 13093, which is combined with the output lines 13091 and 13092 of the OR gates g328 and g329 into a line 1309. In the present embodiment, the selector S310 is controlled by the output of the OR gate g329 to make a request to the requested ALU, and when the requested ALU is not busy, the ALU number is selected and if it is busy or not selected the memory requester number is selected. The content of the line 1309 is selected by a selector S302 and supplied to a line 1320. The line 320 comprises a signal line 3201 for indicating the non-busy condition of the memory requester, a signal line 3202 for indicating the non-busy condition of the requested ALU and a signal line 3203 for indicating the memory requester number or ALU number. Signals from the lines 13091-13093 are selectively supplied to those lines by the selector S302. The selector S302 selects the line 1309 or 1311 depending on whether the input line 1321 is "0" or "1". In the present embodiment, the input line 1321 is "0" as will be described later. In this manner, the non-busy resource number of the requested resource is supplied to the line 1320. The line 1320 is also supplied to the decoder b302 for use in setting the bits of the RSSW register r304. The decoder b302 comprises a decoder b3022 for the memory requester number and a decoder b3021 for the ALU number. Each of them has a decode valid terminal E and decodes an input signal only when the terminal E is "1". Connected to the decode valid terminal E of the decoder b3021 is a line 13202 indicating the non-busy condition of the requested ALU from the line 320, and connected to the decode input signal terminal is a line 13203 indicating the number. Similarly, connected to the decode valid terminal E of the decoder b3022 is a line 13201 indicating the non-busy condition of the requested memory requester from the line 1320, and connected to the decode input signal terminal is a line 3203 indicating the number. The outputs of the decoders b3021 and b3022 are connected to set terminals S of four fields r3041-r3044 (which comprise flip-flops) of the RSSW register r304, and one of the fields S0, S1, A0 and A1 corresponding to the non-busy resource number designated by the lines 13201 and 13203 is set. In this manner, the usage status of the resources is checked by the circuit b305, and the RSSW register r304 is updated depending on the check result.

Referring again to FIG. 3, the check for the usage status of the vector registers used by the instruction in the DI register r302 is explained. In a first check, the register usage check circuit b307 checks to see if the vector registers requested by the instruction in the DI register r302 are available or not, based on the requested vector register numbers and the types of uses (read/write) designated by the DG register r305 and on the vector register busy status in the RGSW register r306. It is now assumed that the instruction queuing register q301 contains no instruction. However, the instruction queuing register q301 usually contains instructions waiting for necessary resources to become available, and hence it is usually necessary to check by register conflict check circuits b309-b311 whether or not there is a discrepancy in the order of usage of the vector registers if the instruction in the DI register r302 is executed in advance of an instruction already stored in the instruction queuing register q301. This is a second check. In the present embodiment, the first and second checks are effected only for the vector registers and not for the vector address register U5 and the vector address increment register U6. In the present embodiment, for the sake of simplicity, the contents of those registers are not updated and the two memory requesters read those registers simultaneously (as will be explained later). Hence, it is not necessary to check the availability of those registers.

Figures 6A, 6B:
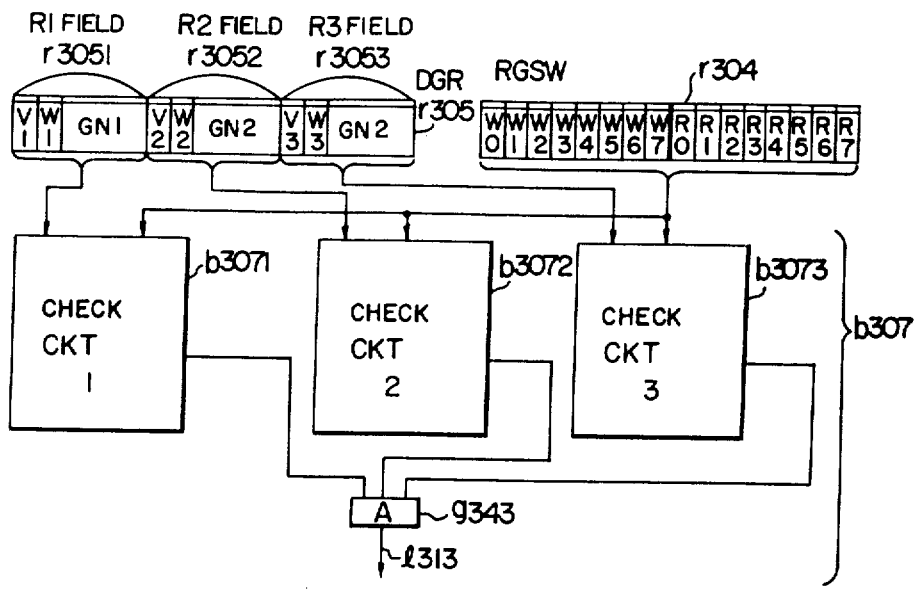
FIG. 6a shows details of a register usage check circuit.
FIG. 6b shows a check condition.

FIG. 6a shows details of the register usage check circuit b307 including the DG register r305 and the RGSW register r306. Based on the R1 field r3051 of the DG register r305 and the output of the RGSW register r306, a first register usage check circuit b3071 determines the availability of the requested vector registers only for a case shown in FIG. 6b. When the register request relates to the writing of data into a vector register (V1=W1=1, GN1<8), the register availability is determined only if the vector register of the number GN1 is not used (Wi=Ri=0, i=GN1), and when the register request is to the reading of the vector register (V1=1, W1=0, GN1<8), the register availability is determined only if the vector register of the number GN1 is not used or in a writing mode (Ri=0, i=GN1), and "1" is supplied to an AND gate g343. When the V1 bit is "0", the vector register is available and "1" is supplied to the AND gate g343. Similarly, second and third usag check circuits b3072 and b3073 check the R2 field r3052 and the R3 field r3053 of the DG register r305 by similar criteria and the results are supplied to the AND gate g343. Thus, when all of the vector registers designated by the R1, R2 and R3 fields are available, a vector register available signal "1" is produced on the line 1313.

The register usage check circuit b307 is characterized in that it determines the availability of the vector registers requested by the instruction in the DI register r302 even if it is in a writing condition by a preceding instruction. This is due to a chaining operation of a vector register wherein a reading operation to a vector register for a succeeding instruction can be performed in parallel to a writing operation to the same vector register for a preceding instruction.

Figure 7:
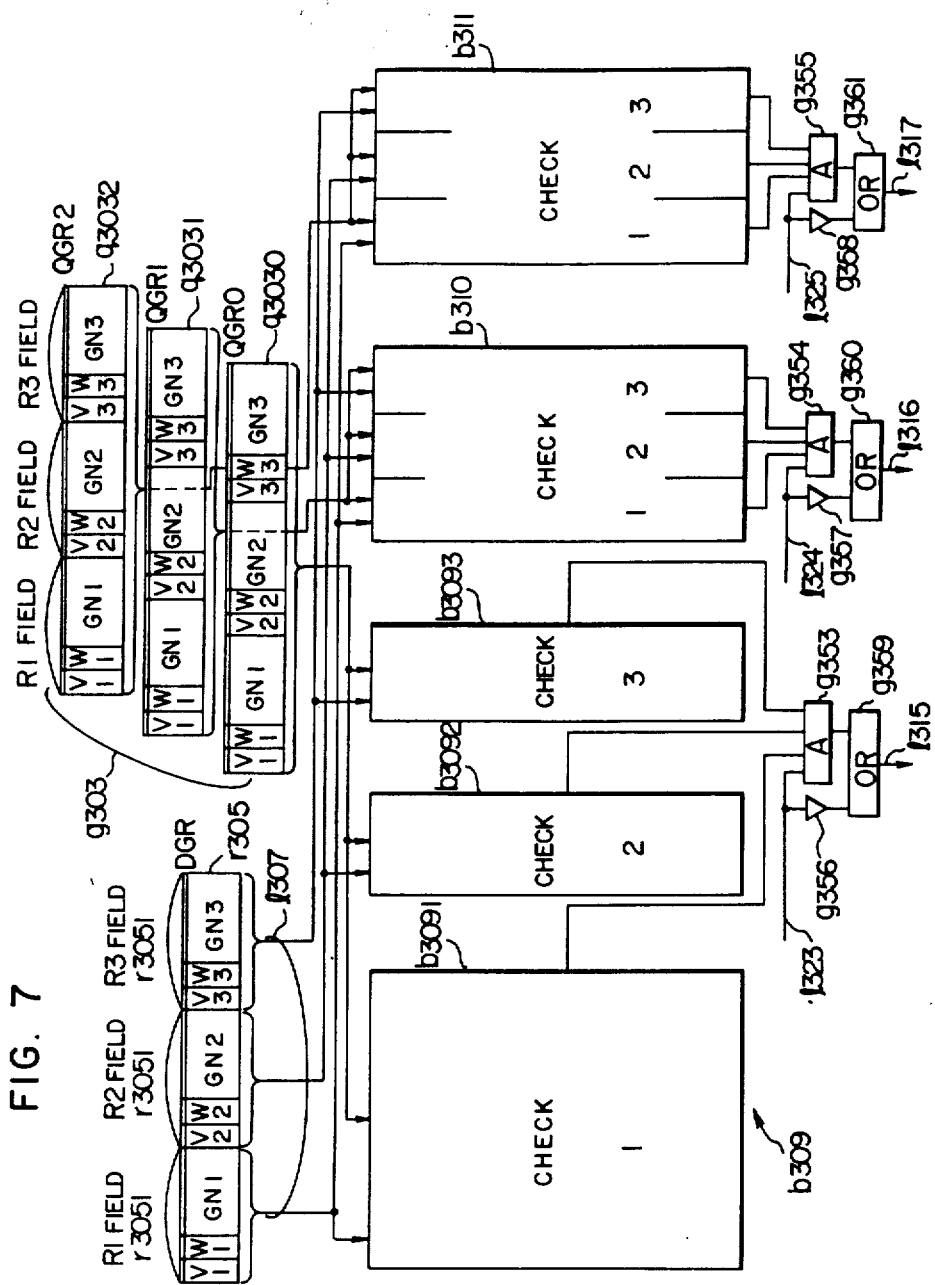
FIG. 7 shows details of a register confliction check circuit.

FIG. 7 shows details of the register conflict check circuits b309-b311. The register conflict check circuit b309 comprises first to third register conflict check circuits b3091–b3093 which check for presence of a conflict between the vector register requests designated by the R1–R3 fields r3051–r3053 of the DG register r305 and the vector register request or requests designated by the QG register q303. The outputs of those circuits are "1" when there is no conflict (as will be explained later). An AND gate 9353 supplies a signal "1" indicating no conflict through an OR gate g359 and onto a line 1315 only when the outputs of the check circuits b3091–b3093 are all "1". The OR gate g359 also receives an output of an inverter g356. Accordingly, when an input line 1323 to the inverter g356 is "0" also, the signal "1" indicating no conflict is produced on the line 1315. The register conflict check circuits b310 and b311 are of the same construction as the circuit b309, and produce conflict check results on lines 1316 and 1317 by way of AND GATES G354 AND g355 or inverters g357 and g358 and OR gates g360 and g361, respectively.

Lines 1323–1325 are connected to the flip-flops f304–f306 (FIG. 3). Those flip-flops are provided one for each of the registers QIR0 QIR2 of the instruction queuing register q301 (FIG. 7) and they are set when the instructions are stored in the respective registers (as will be explained later).

It is now assumed that no instruction is contained in the instruction queuing register q301. Thus, those flip-flops are not set and output lines 1323, 1324 and 1325 thereof are "0". Accordingly, the outputs on the lines 1315–1317 are all "1". Thus, when the instruction queuing register q301 contains no instruction, the signal indicating no conflict of the vector registers is produced independently of the outputs of the conflict check circuits b309–b311.

Referring again to FIG. 3, the output lines 1315–1317 from the register conflict check circuits b309–b311 are "1" as described above. Accordingly, an output line 1322 of an AND gate g301 which receives those outputs is "1". In the present case, the output line 1313 of the register usage check circuit b307 is also "1" on the assumption that the requested vector registers are available and hence an output of the AND gate g302 is also "1". The output line 1310 of the resource usage check circuit b305 is also "1" on the assumption that the requested resources are available. The output line 1302 of the flip-flop f302 which indicates presence of a valid instruction in the DI register r302 is also "1". As will be explained later, the output of the AND gate g305 is "0" and hence the output of the inverter g310 is "1". Under these conditions, the output of the AND gate g304 is "1" and hence the flip-flop f303 is set through the output line 1330 of the OR gate g306. The flip-flop f303 is a D-type flip-flop which is set or reset only by timing and it sends out an instruction start signal ST to the vector register unit U4, the memory requesters U10 and U11 and the ALU's U20 and U21 (FIG. 1) through the line 110. Since the instruction queuing register q301 contains no instruction, the outputs of the flip-flops f304–f306 corresponding to the registers QIR0–QIR2 are now all "0", and the output of the selector S303 to which the output lines 1323–1325 are supplied is "0" independently of the selection operation (to be described later) of the selector S303. Accordingly, the output line 1321 of the AND gate g305 to which the output line 1326 is supplied is also "0". The selectors S301, S302 and S304 select the OP code on the output line 1303 of the DI register r302, the resource request (type of resource and number) on the output line 1309 of the resource usage check circuit b305 and the vector register request (register number and type of use) on the output line 1307 of the DG register r305, respectively, and set them in the EI register r308, the ES register r309 and the EG register r312, respectively. The setting is specified by the line 1330 at the output of OR gate g306. A vector length (VL) to be processed is stored in a vector length register (VL register) r307 by another means (not shown). The contents of those registers are sent to the vector register unit U4 and the resources U10, U11, U20 and U21 through the lines 111–114. In this manner, the start of the instruction execution is effected.

The instruction in the DI register r302 need not be set in the instruction queuing register q301 because it can be immediately started. In the present case, since the output of the AND gate g304 is "1", the output of the inverter g308 is "0" and the output line 1327 of the AND gate g303 to which the output of the inverter g308 is supplied is "0". Thus, the inputting of the content of the DI register r302 to the instruction queuing register q301 which is controlled by the signal line 1327 is suppressed. Similarly, new inputs to the registers q302 and q303 are also inhibited. The setting of the flip-flops f304–f306 which indicate the presence of the instructions in the instruction queuing register q301 and the updating of an in-pointer IP r310 which points to a location in the instruction queuing register q301 to be next set are also suppressed.

As the instruction is started, it is necessary to update the RSSW register r304 which controls the status of the resource used and the RGSW register r306 which controls the status of the vector registers. The updating of the RSSW register r304 has been described in connection with FIG. 5. The RGSW register r306 is updated in the following manner. The output of the DG register r305 selected by the selector S304 is sent to the decoder b304 where the vector register number and the type of use (read/write) etc. are decoded and the corresponding bits in the RGSW register r306 are set to "1". Under the condition that Vi=1 for each field Ri (i=1-3) of the DG register r305, Wj (j=GNi) or Rj of the RGSW register r305 is set to "1" depending on whether Wi is "1" or "0". As will be described later, when a signal indicating the end of writing or reading of the vector register is supplied from the vector register unit U4 through the lines 115 and 116, the RGSW register resets the fields Rj or Wj designated by that signal.

(a-2) When the instruction queuing register q301 does not contain an instruction but the instruction in the DI register r302 is not to be started and is to be stored in the instruction queuing register q301:

This occurs when the resource (ALU or memory requester) or the vector registers requested by the instruction in the DI register r302 is not available.

The check of the usage status of the resource and the vector registers to be used by the instruction in the DI register r302 has been discussed in (a-1) with reference to FIGS. 5–7. As a result of the check for the usage status of the vector registers or the resource requested by the instruction in the DI register r302, it occurs, for a case under consideration, that the output line 1310 of the resource usage check circuit b305 is "0" because the requested resource is busy, or the output 1313 of the register usage check circuit b307 is "0", because the requested vector registers are not all available. In any event, the output of the AND gate g304 is "0" and the output of the inverter g308 is "1". Since an instruction is not present in the instruction queuing register, the output line 1326 of the selector S303 is "0" as explained in (a-1) and hence the output of the AND gate g305 is "0". As a result, the flip-flop f303 is not set and the instruction start signal ST is not supplied to the line 110. Since the output of the inverter g308 is "1" and the output of the flip-flop f302 is "1", the output line 1327 of the AND gate g303 is "1". Thus, the instruction is set in the instruction queuing register in the following manner.

Figure 4:
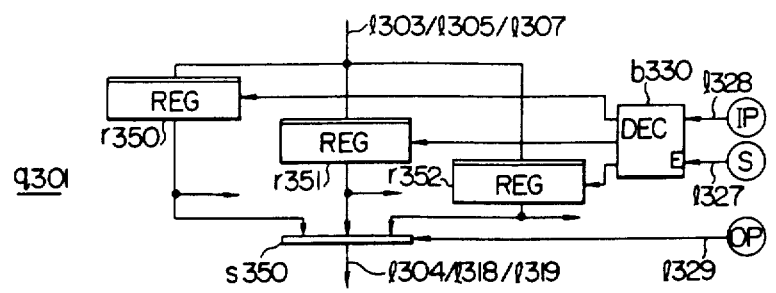
FIG. 4 shows details of an instruction queuing register.

FIG. 4 shows details of the instruction queuing register q301. When a set signal S to the instruction queue register is sent to a line 1327 as a register number to be set and the output IP of the in-pointer register (IP register) r310 is sent to a line 1328, they are supplied to the decode valid terminal E and the data terminal of the decoder b330, respectively, and decoded. Thus, when the line 1327 is "1", the content of the line 1328 is decoded and the content of the input line (line 1303, 1305 or 1307 in FIG. 3) is set in the designated register r350–r352. Thus, the setting to the instruction queuing register q301 has been described. The reading of the instruction queuing register is now described. The reading operation means reading of the contents of the registers r350–r351 designated by the output OP of an out-pointer register (OP register) r311 (FIG. 3). This is effected by controlling the selection of the selector S350 to which the outputs of the registers r350–r352 are supplied, by the output line 1329 of the OP register r311.

The resource queuing register (QS register) q302 is of the same construction as the instruction queuing register q301 except for the difference of the number of bits which the registers r350–r352 require. The register queuing register (QG register) q303 differs from the instruction queuing register q301 in that it further has separate signal lines to directly supply the outputs from the registers r350–r352 without routing through the selector S350 in addition to the difference of the number of bits which the registers r350–r352 require.

Referring again to FIG. 3, when the OP code, the type of resource to be used by the instruction and the register number have been stored in the instruction queuing register q301–q303, the flip-flop corresponding to the newly registered register QIRi (i=0, 1 or 2), of the flip-flops f304–f306 which indicate the presence of an instruction in the instruction queuing register is set. This is effected by supplying the "1" output on the line 1327 to the decode valid terminal of the decoder b312 and setting one of the flip-flops f304–f306 of the number designated by the IP register on the output line 1328 supplied to the data terminal, by the decoder b312. After this operation, the IP register r310 is updated. The output line 1328 of the IP register r310 is supplied to a ternary counter b314 which prepares the next IP count, which is set into the IP register r310 when the line 1327 is "1". The ternary counter b314 produces outputs 1, 2 and 0 as input varies 0, 1 and 2.

When the instruction queuing register q301 (which can store up to three instructions in the present embodiment) is filled with instructions, it can no longer store an instruction. It is, therefore, necessary to suppress the send-out of the instruction from the I-fetch U2 (FIG. 1). This is attained by supplying the outputs of the flip-flops f304–f306 which indicate the presence of an instruction in each register of the instruction queuing register to the AND gate g309 and sending the output line 17 to the I-fetch U2.

In this manner, the start-waiting instructions are stored in the instruction queuing register q301 in the sequence of decode.

(b-1) When an instruction in the instruction queuing register is to be started:

This occurs when the instruction is in the instruction queuing register q301 and the resource and the vector register requested by the instruction are available.

This is independent from the presence or absence of the instruction in the DI register r302 or the start condition of the instruction. When the instruction is in the DI register r302, the instruction is not executed and is registered in the instruction queuing register q301 in accordance with the procedure of (a-2). The operation to read the instruction from the instruction queuing register q301 and start it is now explained.

The operation to read the instruction from the instruction queuing register q301 and start it is similar to the operation to start the instruction in the DI register r302. The instruction designated by the OP register r311 in the instruction queuing register r301 may be substituted for the instruction in the DI register r302.

In order to start the instruction, it is necessary that the required resource and vector register are available, as explained in (a-1).

The non-busy status of the resource to be used by the instruction in the instruction queuing register is checked by the resource usage check circuit b306 of FIG. 3, and the availability of the vector registers is checked by the register usage check circuit b308 of FIG. 3.

The construction of the resource usage check circuit b306 is same as that of the check circuit b305 as shown in FIG. 5. The type of resource requested by the instruction in the instruction queuing register q301 selected by the out-pointer OP is sent from the QS register q302 through a line 1318. On the other hand, the status of the resource is sent from the RSSW register r304. They are compared by the AND gates g324–g327 to check the non-busy status of the resource and the result is sent over the line 1312 which indicates the non-busy status of the resource and the line 1311 which indicates the type of resource and the resource number by way of the OR gates g330, g331 and g333, the encoders b322 and b323 and the selector S311. The above operation is exactly identical to that of the resource usage check circuit b305 which sends the result of its check of the DS register r303 and the RSSW register r304 over the lines 1310 and 1309, and hence a detailed description thereof is omitted here.

The construction of the register usage check circuit b308 is identical to that of the check circuit b307 and the operation thereof is identical to that of the circuit b307 where the output line 1319 of the QG register q303 in FIG. 3 is connected in stead of the output of the DG register r305 in FIG. 6a. The check result is sent over the output line 1314 (FIG. 3) of the register usage check circuit b308.

Referring again to FIG. 3, when the resource usage check circuit b306 sends a "1" signal to the signal line 1312 to indicate the non-busy status of the resource and sends the type of the resource and the resource number to the line 1311 and the register usage check circuit b308 sends a "1" signal to the signal line 1314 to indicate the availability of the vector register and the output line 1326 of the selector S303 which selects the outputs of the flip-flops f304–f306 when the out-pointers OP are "1" (indicating that a register QIRi within the instruction queuing register q301 pointed by the out-pointer contains an instruction which can be started), then the output line 1321 of the AND gate g305 assumes "1". When the output line 1321 is "1", the selectors S301, S302 and S304 select the contents of the output line 1304 of the instruction queuing register q301, the output line 1311 of the resource usage check circuit b306 and the output line 1319 of the QG register q303, respectively, and set the OP code, the type of the resource and the resource number, and the register number and the type of use, respectively, in the EI register r308, the ES register r309 and the EG register r312. Accordingly, when the instruction in the instruction queuing register q301 can be started, the instruction is started independently of whether the instruction in the DI register r302 can be started or not. The line 1321 sets the flip-flop f303 through the OR gate g306 and the instruction start signal ST is sent to the vector register unit U4 and the resource through the line 110. The output line 1330 of the OR gate g306 is also used to control the setting of data in the EI register r308, the ES register r309 and the EG register r312. The start of the instruction is exactly the same as the description of (a-1). The "1" signal on the line 1321 closes the AND gate g304 through the inverter g310. As a result, the output of the inverter g308 assumes "1", and if the instruction is stored in the DI register r302 (when the flip-flop f302 is "1"), the line 327 assumes "1" and the instruction is registered in the instruction queuing register q301. This operation is the same as that described in (a-2). The line 1321 is also connected to the decode valid terminal of the decoder b313 and the decoder b313 resets one of the flip-flops f304–f306 pointed to by the out-pointer OP because the instruction in the instruction queuing register pointed to by the out-pointer OP is read and started. Finally, the line 1321 is used to set the OP register r311 so that the out-pointer OP is updated. The updating is controlled by a ternary counter as is done for the in-pointer. The ternary value is generated by the circuit b315 which is of the same construction as the circuit b314.

(b-2) When the instruction in the DI register r302 is started in advance of an instruction in the instruction queuing register: This occurs in the following case:

(1) the resource or the vector registers requested by the instruction in the instruction queuing register are not available and hence the instruction cannot be started, and:

(2) the resource or the vector registers requested by the instruction in the DI register r302 are available and there is no vector register conflict between the instruction stored in the instruction queuing register q301 and the instruction in the DI register r302.

In order to start the instruction in the DI register r302 in advance of the instruction in the instruction queuing register q301, it is necessary that there is no register conflict, that is, the instruction in the DI register r302 does not use the vector register which is to be updated by the instruction in the instruction queuing register q301, and the instruction in the DI register r302 does not update the vector register which is to be read by the instruction in the instruction queuing register q301. When the vector register to be read but not updated by the instruction in the instruction queuing register q301 is read by the instruction in the DI register r302 in advance, the sequence of reading of the register is reversed but no problem arises. The register conflict described above is checked by the circuits b309–b311 of FIG. 3. The operation thereof is now explained with reference to FIG. 7.

The circuit of FIG. 7 has been explained except for circuits b3091–b3093.

A first register conflict check circuit b3091 compares the R1 field r3051 of the DG register r305 with the R1–R3 fields of the QGR0 register g3030 and the AND gate g353 produces a signal "1" indicating no conflict if any of the following conditions is not met.

(1) $V1=1$ and $W1=0$ for the DG register; and $Vj=Wj=1$ and $GNj=GNl$ of the DG register in one field Rj of the register QGR0.

(2) $V1=1$ and $W1=1$ for the DG register; and $Vj=1$ and $GNj=GNl$ of the DG register in one field Rj of the register QGR0.

Similarly, second and third register conflict check circuits b3092 and b3093 check the R2 field r3052 and the R3 field r3053 of the DG register.

On the other hand, when the output of the flip-flop f304 (FIG. 3), which indicates that the executable instruction is contained in the instruction queuing register, is supplied to the AND gate g353 through the line 1323 and all inputs to the AND gate g353 are "1", the output thereof is sent to the line 1315 through the OR gate g359. In this manner, any conflict between the vector register designated by the DG register r305 and the vector register designated by the QGR0 register q3030 is checked. Similarly, any conflict between the vector register designated by the DG register r305 and the vector register designated by the QGR1 register q3031 is checked by the check circuit b310, and any conflict between the vector register designated by the DG register r305 and the vector register designated by the QGR2 register q3032 is checked by the check circuit b311, and the check results are sent to the output lines 1316 and 1317 of the OR gates g360 and g361 through the AND gates g354 and g355, respectively.

The check of the usage status of the resource and the register requested by the instruction in the DI register r302 is same as that described in (a-1).

As a result of the check, the resource usage check circuit b305 sends the "1" signal indicating the non-busy status of the resource to the line 1310, the register usage check circuit b307 sends the type of resource and the resource number to the line 1309 and the "1" signal indicating the availability of the vector register is sent to the line 1313. On the other hand, since one or both of the resource and the vector register to be used by the instruction in the instruction queuing register pointed to by the out-pointer OP are not available, at least one of the output line 1312 of the resource usage check circuit b306 and the output line 1314 of the register usage check circuit b308 is "0". Since the instruction queuing register contains the instruction, the output line 1326 of the selector S303 is "1", and since the DI register r302 contains an instruction, the line 1302 is also "1".

Under this condition, the output line 1321 of the AND gate g305 is not "1". Since it is now assumed that there is no conflict between the registers requested by the instruction in the DI register and those requested by the instruction in the instruction queuing register, the lines 1315–1317 are "1" and the output of the AND gate g301 is "1". The output of the AND gate g302 to which the output of the AND gate g301 and the line 1313 are supplied is "1", and the output of the AND gate g304 to which the "1" output of the AND gate g302, the line 1310, the line 1302 which indicates the valid instruction in the DI register and the output of the inverter g310 which receives the line 1321 is "1". The subsequent operation up to the start of the instruction is same as the instruction start operation of the instruction in the DI register described in (a-1). Since the output of the AND gate g304 is "1", the output line 1327 of the AND gate g303 which receives the output of the AND gate g304 through the inverter g308 is "0" and the line 1321 described above is "0". Accordingly, the in-pointer IP and the out-pointer OP are not updated and the states of the flip-flops f304–f306 which indicate the presence of the instruction in the instruction queuing register are not updated.

5 MODIFICATION OF I-CONTROL

The details of the I-control U3 (FIG. 1) have thus been described. In the present embodiment, passing of the instruction execution, that is, execution of a succeeding instruction in advance of a preceding instruction is effected only between the DI register r302 and the instruction queuing register. Once the instructions are stored in the instruction queuing register, they are read by the out-pointer in the sequence of the storing into the instruction queuing register and the passing of the instruction execution among instructions within the instruction queuing register is not effected. However, the passing of the instruction execution among instructions within the instruction queuing register can be readily attained by similar control to that of the passing of the instruction execution between the DI register and the instruction queuing register. In this case, the execution sequence for the instruction in the instruction queuing register must be stored. The instructions are stored in the instruction queuing register in the sequence of availability of the registers within the instruction queuing register rather than in the sequence determined by the in-pointer IP.

Figure 8:
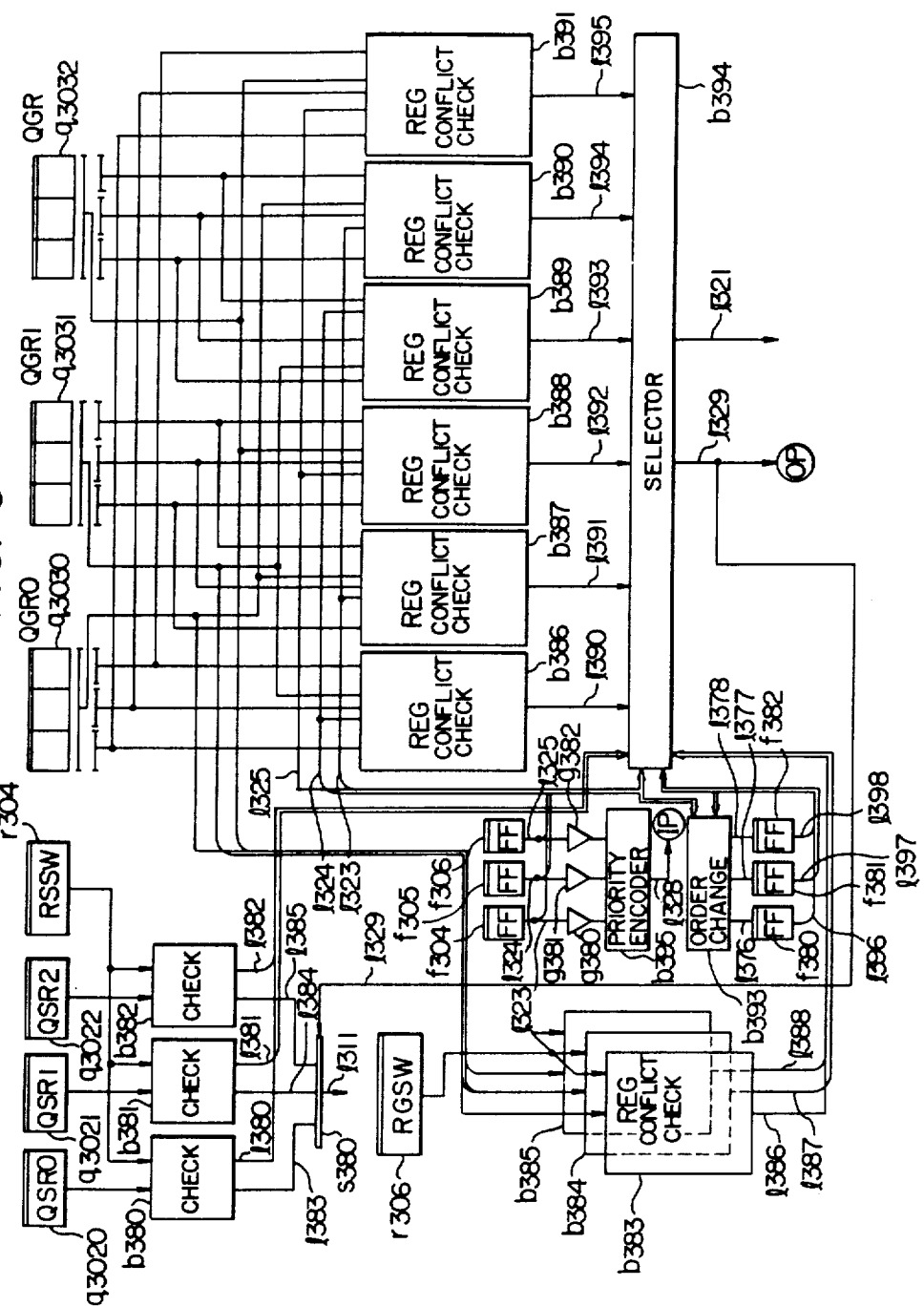
FIG. 8 shows a modification of the instruction control unit.

FIG. 8 shows that portion for implementing the above which is different from the circuit of FIG. 3. Flip-flops f304, f305 and f306 indicate that the instruction queuing register contains valid instructions ("1" when it contains) and they are identical to the flip-flops f304–f306 of FIG. 3. The outputs of the flip-flops are inverted by inverters g380–g382 and then supplied to a priority encoder b395, which produces the number of a register QIRi which has the smallest number among vacant registers within the instruction queuing register. In the present modification, the IP register r310 and the ternary counter b314 of FIG. 3 are replaced by the inverters g380–g381 and the priority encoder b395 and the output of the priority encoder is used as the in-pointer IP in place of the IP of FIG. 3.

It is necessary to store the order of the instruction starts of the instructions in the instruction queuing register q301. To this end, in the present modification, flip-flops f380–f382 and an execution order change circuit b393 are added to the circuit of FIG. 3. Assuming that the instructions set in the instruction queuing register q301 by the in-pointers IP 0-2 are designated by Q0, Q1 and Q2, respectively, it may be possible that those instructions are started in the following orders.

Q0→Q1→Q2

Q0→Q2→Q1

Q1→Q2→Q0

Q1→Q0→Q2

Q2→Q0→Q1

Q2→Q1→Q0

Those six conditions are stored by the flip-flops f380–f382. The relation between the information stored in the flip-flops f380, f381 and f382 and the orders of the instruction execution is shown below.

| f380 | f381 | f382 | Order of Instruction Execution |
|---|---|---|---|
| 0 | 0 | 0 | Q0 → Q1 → Q2 |
| 0 | 0 | 1 | Q0 → Q2 → Q1 |
| 0 | 1 | 0 | Q1 → Q2 → Q0 |
| 0 | 1 | 1 | Q1 → Q0 → Q2 |
| 1 | 0 | 0 | Q2 → Q0 → Q1 |
| 1 | 0 | 1 | Q2 → Q1 → Q0 |

The order of the instruction execution is changed when the flip-flops f304–f306 change from "1" to "0" (from busy to non-busy). The change is controlled by the change control circuit b393, which receives the outputs l396–l398 of the flip-flops f380–f382 indicating the current start conditions and the outputs l323–l325 of the flip-flops f304–f306 and produces the next start condition on the lines l376–l378 and the next start condition is set in the flip-flops f380–f382. The circuit b393 detects a time point when one of the instructions in the instruction queuing register q301 is started and the lines l323–l325 change from "1" to "0", and produces an output signal based on the contents of the lines l396–l398 and sends it out to the lines l376–l378.

The flip-flops f380–f382 are set such that the remaining two of the instructions in the instruction queuing register q301 are first started in the order specified by the flip-flops f380–f382, and after the start of those two instructions, the instruction newly stored in the instruction queuing register which is to take the place of the instructions just started is then started.

(1) When the line l323 changes from "1" to "0":

| l396 | l397 | l398 | l376 | l377 | l378 |
|---|---|---|---|---|---|
| 0 | 0 | 0 | 0 | 1 | 0 |
| 0 | 0 | 1 | 1 | 0 | 1 |
| 0 | 1 | 0 | 0 | 1 | 0 |
| 0 | 1 | 1 | 0 | 1 | 0 |
| 1 | 0 | 0 | 1 | 0 | 1 |
| 1 | 0 | 1 | 1 | 0 | 1 |

(2) When the line l324 changes from "1" to "0":

| l396 | l397 | l398 | l376 | l377 | l378 |
|---|---|---|---|---|---|
| 0 | 0 | 0 | 0 | 0 | 1 |
| 0 | 0 | 1 | 0 | 0 | 1 |
| 0 | 1 | 0 | 1 | 0 | 0 |
| 0 | 1 | 1 | 0 | 0 | 1 |
| 1 | 0 | 0 | 1 | 0 | 0 |
| 1 | 0 | 1 | 1 | 0 | 0 |

(3) When the line l325 changes from "1" to "0":

| l396 | l397 | l398 | l376 | l377 | l378 |
|---|---|---|---|---|---|
| 0 | 0 | 0 | 0 | 0 | 0 |
| 0 | 0 | 1 | 0 | 0 | 0 |
| 0 | 1 | 0 | 0 | 1 | 1 |
| 0 | 1 | 1 | 0 | 1 | 1 |
| 1 | 0 | 0 | 0 | 0 | 0 |
| 1 | 0 | 1 | 0 | 1 | 1 |

The lines 1323-1325 do not simultaneously change from "1" to "0" because the instructions are started one at a time.

In order to enable the start of any instruction in the instruction queuing register q301, it is necessary to check the usage status of the resources and the vector registers for all instructions in the instruction queuing register and check the possibility of conflict of the vector registers for all instructions in the instruction queuing register. In FIG. 8, QSR0, QSR1 and QSR2 registers q3020-q3022 hold the types of resources requested by the instructions in the instruction queuing register q301. They are contained in the QS register q302 of FIG. 3. In the present modification, signal lines for sending resource requests directly from the registers q3020-q3030 independently of the out-pointer OP are provided. The resource requests by the instructions and the content of the RSSW register r304 which manages the status of the resources are checked by resource usage check circuits b380-b382 which are provided in the presen modification in place of the resource usage check circuit b306 of FIG. 3, and the respective check circuits supply signals indicating the non-busy status of the resources to the lines 1380-1382 and the types of the available resources and the resource numbers to the lines 1383-1385, respectively. The resource usage check circuits b380-b382 are of the same construction as the circuit b305 of FIG. 5. In FIG. 8, QGR0-QGR2 registers q3030-q3032 store the register numbers requested by the instructions in the instruction queuing register and they are contained in the QG register q303 of FIG. 3. The register requests by the instructions and the content of the RGSW register r306 which manages the status of the vector registers are checked by register usage check circuits b383-b385 which are newly provided in the present modification, and signals indicating whether all vector registers requested are available or not are sent to the lines 1386-1388. The register usage check circuits are of the same construction as the circuit b307 shown in FIG. 6. In order to check for conflict between the vector registers requested by the instructions, register conflict check circuits b386-b391 which are newly provided in the present modification are used. It is desirable that the instructions in the instruction queuing register can be executed in any order. When up to three instructions can be stored in the instruction queuing register, two check circuits are necessary in order to allow one instruction to be started in preference to the other two instructions. Three sets of such check circuits are necessary one set for each instruction. Accordingly, total of six register conflict check circuits b386-b391 are necessary. The circuit b386 receives the R1-R3 fields of the QGR0 register and the R1-R3 fields of the QGR1 register and checks for register conflict therebetween. When no register conflict is detected for any field, a "1" output is produced on the line 1390. The circuit b386 is of the same construction as the register conflict check circuit b309 of FIG. 7. The circuit b386 also receives the output line 1324 of the flip-flop f305, and like the circuit b309 (FIG. 7), it unconditionally produces a "1" output on the line 1390 when the line 1324 is "0". Similarly, the circuit b387 checks to see if the fields of the QGR1 register have a register conflict with the fields of the QGR0 register. Similarly, the circuits b388-b391 check for register conflict between QGR2 and QGR1, QGR1 and QGR2, QGR0 and QGR2, and QGR2 and QGR0, respectively. The output lines 1390-1395 of the register conflict check circuits b386-b391 are supplied to an instruction selection circuit b394. The instruction selection circuit b394 receives the output lines 1380-1382 of the resource usage check circuits b380-b382, the output lines 1386-1388 of the register usage check circuits b383-b385, the outputs of the flip-flops f380-f382 which designate the order of the instruction start, and the output lines 1323-1325 of the flip-flops f304-f306 which show the presence of the executable instructions in the instruction queuing register, and the instruction in the instruction queuing register which does not cause a conflict between the vector registers is selected by the instruction selection circuit b394 when the vector register and the resource are not-busy, and the number of the selected instruction in the instruction queue register is sent to the line 1329 as the out-pointer OP and a signal indicating the selection of the instruction in the instruction queuing register is sent to the line 1321.

Figure 9:
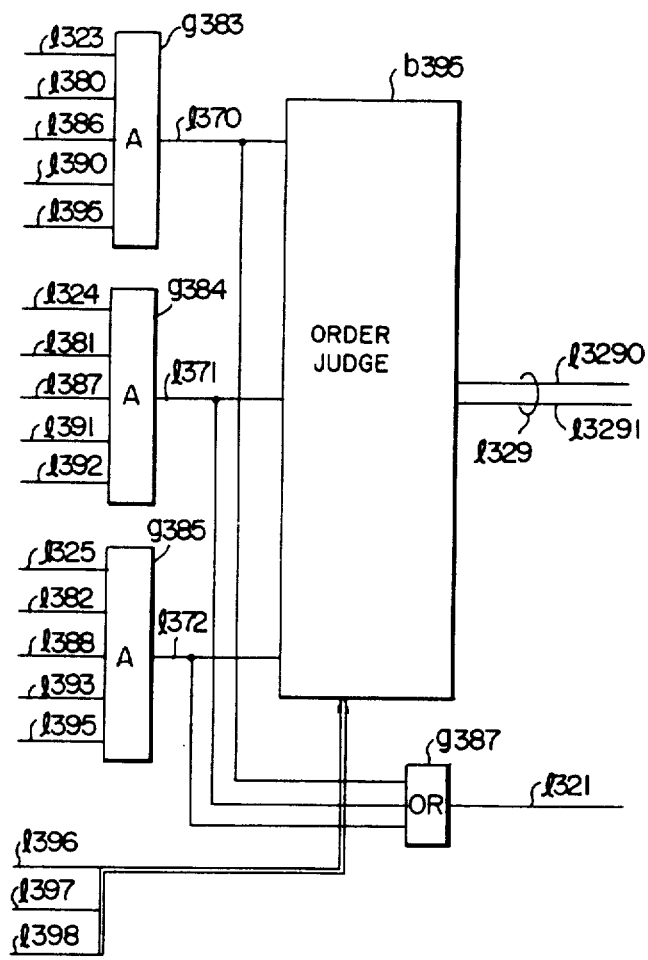
FIG. 9 shows a detailed block diagram of a selector b394 of FIG. 8.

FIG. 9 shows the details of the instruction selection circuit b394. An AND gate g383 receives the output line 1323 of the flip-flop f304, the output line 1380 of the resource usage check circuit b380, the output line 1386 of the register usage check circuit b383 and the output lines 1390 and 1395 of the register conflict check circuits b386 and b391, and when all of those inputs are "1", the AND gate g383 produces a "1" output on an output line 1370. This indicates that the zeroth instruction Q0 in the instruction queuing register can be executed. Similarly, AND gates g384 and g385 receive signal line for the first and second instructions in the instruction queuing register and produce outputs on lines 1371 and 1372, respectively. It may be possible that two or more of the lines 1370-1372 are simultaneously "1". The lines 1370-1372 are supplied to an OR gate g387 which produces a "1" output on an output line 1321 when any one of the instructions are executable. The selection of the signals from the lines 1370-1372 indicating the executable instructions is effected by the priority encoder b395, which receives the output lines 1396-1398 of the flip-flops f380-f382 indicating the order of the instruction execution in addition to the lines 1370-1372, and the instruction number on the instruction queuing register to be executed is produced on the line 1329 in the following manner. The line 1329 comprises two lines 13290 (upper order ) and 13291 (lower order) and represents binary numbers "00", "01" and "10" by the two lines to indicate the instruction numbers in the instruction queuing register.

(1) When the lines 1396-1398 are "0", "0" and "0":

| 1390 | 1371 | 1372 | 13290 | 13291 |
|------|------|------|-------|-------|
| 0 | 0 | 1 | 1 | 0 |
| 0 | 1 | 0 | 0 | 1 |
| 0 | 1 | 1 | 0 | 1 |
| 1 | * | * | 0 | 0 |

(*indicates "don't care")

(2) When the lines 1396-1398 are "0", "0" and "1":

| 1370 | 1371 | 1372 | 13290 | 13291 |
|------|------|------|-------|-------|
| 0 | 0 | 1 | 1 | 0 |
| 0 | 1 | 0 | 0 | 1 |
| 0 | 1 | 1 | 1 | 0 |
| 1 | * | * | 0 | 0 |

(3) When the lines 1396-1398 are "0", "1" and "0":

| 1370 | 1371 | 1372 | 13290 | 13291 |
|------|------|------|-------|-------|
| 0    | 0    | 1    | 1     | 0     |
| 1    | 0    | 0    | 0     | 0     |
| 1    | 0    | 1    | 1     | 0     |
| *    | 1    | *    | 0     | 1     |

(4) When the lines 1396–1398 are "0", "1" and "1":

| 1370 | 1371 | 1372 | 13290 | 13291 |
|------|------|------|-------|-------|
| 0    | 0    | 1    | 1     | 0     |
| 1    | 0    | 0    | 0     | 0     |
| 1    | 0    | 1    | 0     | 0     |
| *    | 1    | *    | 0     | 1     |

(5) When the lines 1396–1398 are "1", "0" and "0":

| 1370 | 1371 | 1372 | 13290 | 13291 |
|------|------|------|-------|-------|
| 0    | 1    | 0    | 0     | 1     |
| 1    | 0    | 0    | 0     | 0     |
| 1    | 1    | 0    | 0     | 0     |
| *    | *    | 1    | 1     | 0     |

(6) When the lines 1396–1398 are "1", "0" and "0":

| 1370 | 1371 | 1372 | 13290 | 13291 |
|------|------|------|-------|-------|
| 0    | 1    | 0    | 0     | 1     |
| 1    | 0    | 0    | 0     | 0     |
| 1    | 1    | 0    | 0     | 1     |
| *    | *    | 1    | 1     | 0     |

The lines 1329 and 1321 which are the output of the instruction selection circuit b394 may be used in place of the output line 1329 of the OP register r311 of FIG. 3 and the output line 1321 of the AND gate g305. Accordingly, the OP register r311, the ternary counter b315, the selector S303 and the AND gate g305 of FIG. 3 are not necessary.

The selector S380 in FIG. 8 selects the type of the resource and the resource number requested by the instruction in the instruction queuing register in accordance with the out-pointer OP (on the line 1329), and the output line 311 thereof is used in place of the output line of the resource usage check circuit b306 of FIG. 3.

As described above, the I-control of the present invention decodes the fetched instructions one be one, starts the executable instruction one by one and stores the unexecutable instructions in the instruction queuing register. When the requested resource is not busy and the requested vector registers are available, the instruction is started independently of the order of decoding on the condition that there is no restriction in the order of usage of the vector registers so that the non-busy times of the resource and the vector registers are reduced and the instructions are executed substantially in a shorter time.

6 VECTOR REGISTER UNIT

(i) General

Figure 10:
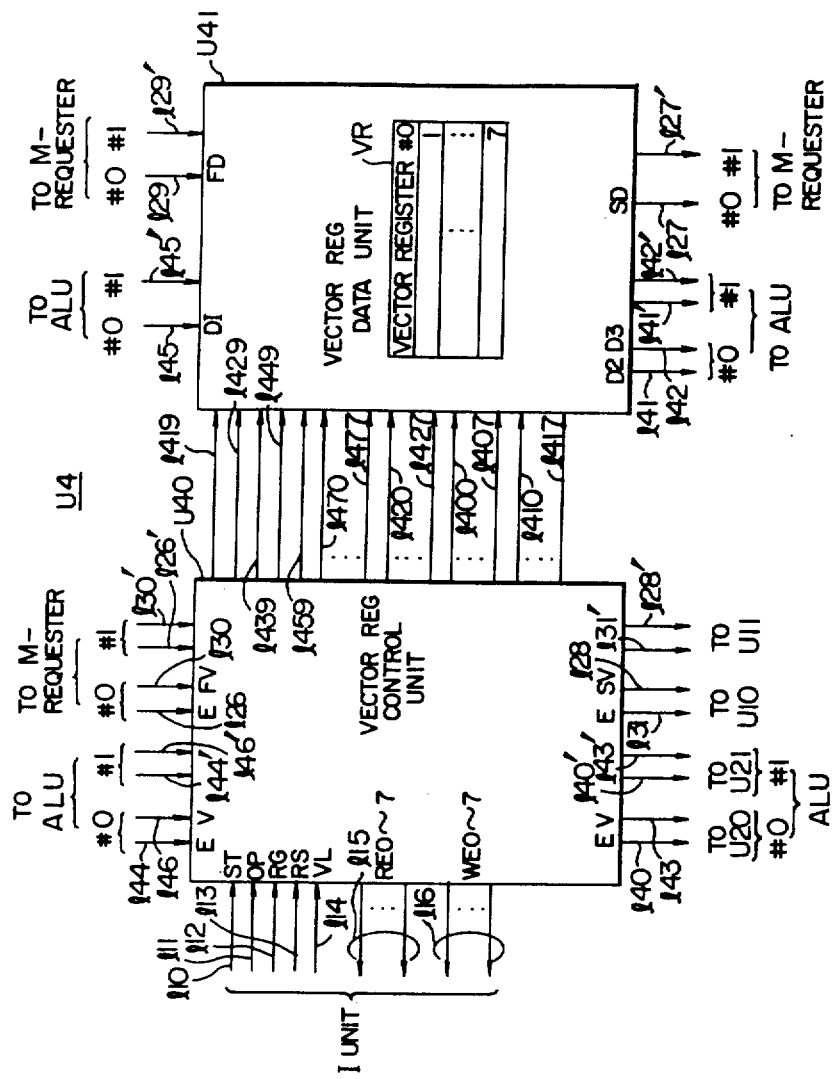
FIG. 10 shows the configuration of a vector register unit.

In FIG. 10, the vector register unit U4 is divided into a vector register control unit U40 and a vector register data unit U41.

The vector register control unit U40 reads necessary data from the vector register VR of the vecto register data unit U41 in accordance with a command from the I-control U3 and sends that data to the ALU's U20 and U21 and the memory requesters U10 and U11 (FIG. 5) as required, and writes the data sent from the ALU's U20 and U21 and the memory requesters U10 and U11 in the vector register VR. It also informs the end of usage of the vector register VR to the I-control U3.

The vector registers VR each hold a number of vector elements and comprise memory cells like a conventional one. Thus, an address counter (to be described later) for specifying a read/write address is provided for each vector register VR. The address counters are controlled by the vector register control unit U40.

The vector elements in the vector register VR are read under the control of the vector register control unit U40 in the following manner. In the present embodiment, if a succeeding instruction requests the reading of a vector register in which elements of vector data are being written in the course of execution of a preceding instruction, the vector register is chained such that the reading is started in parallel with the writing at a time point when any number of elements have been written in the vector register. Under the chaining mode, when the writing by the preceding instruction is intermittent, the reading of the succeeding instruction is also effected intermittently. When the instruction uses two vector registers for reading, the elements of the same number present in the two vector registers are read in pairs even if some other vector elements are stored in one or both of the vector registers. When the remaining elements are written in those vector registers intermittently, each pair of elements of the same number are read whenever a pair of elements are written in the two registers.

The vector elements to be supplied to the ALU are usually fetched from the main storage, temporarily stored in the vector register, thence supplied to the ALU. The elements are read in synchronism with the machine clock. The vector elements to be fetched from the main storage, however, are not always written in the vector register successively in each machine cycle because of the possible occurrence of a conflict in the fetching of data from the main storage (for example, when two memory requesters simultaneously request). In this case, the vector elements to be supplied to the ALU arrive at the vector register intermittently to be written therein. According to the embodiment, even under such a condition, reading of the elements in parallel with the writing (chaining) is performed, so that the start of the instruction execution can be made earlier.

(ii) General description of the vector register control unit

Figure 11:
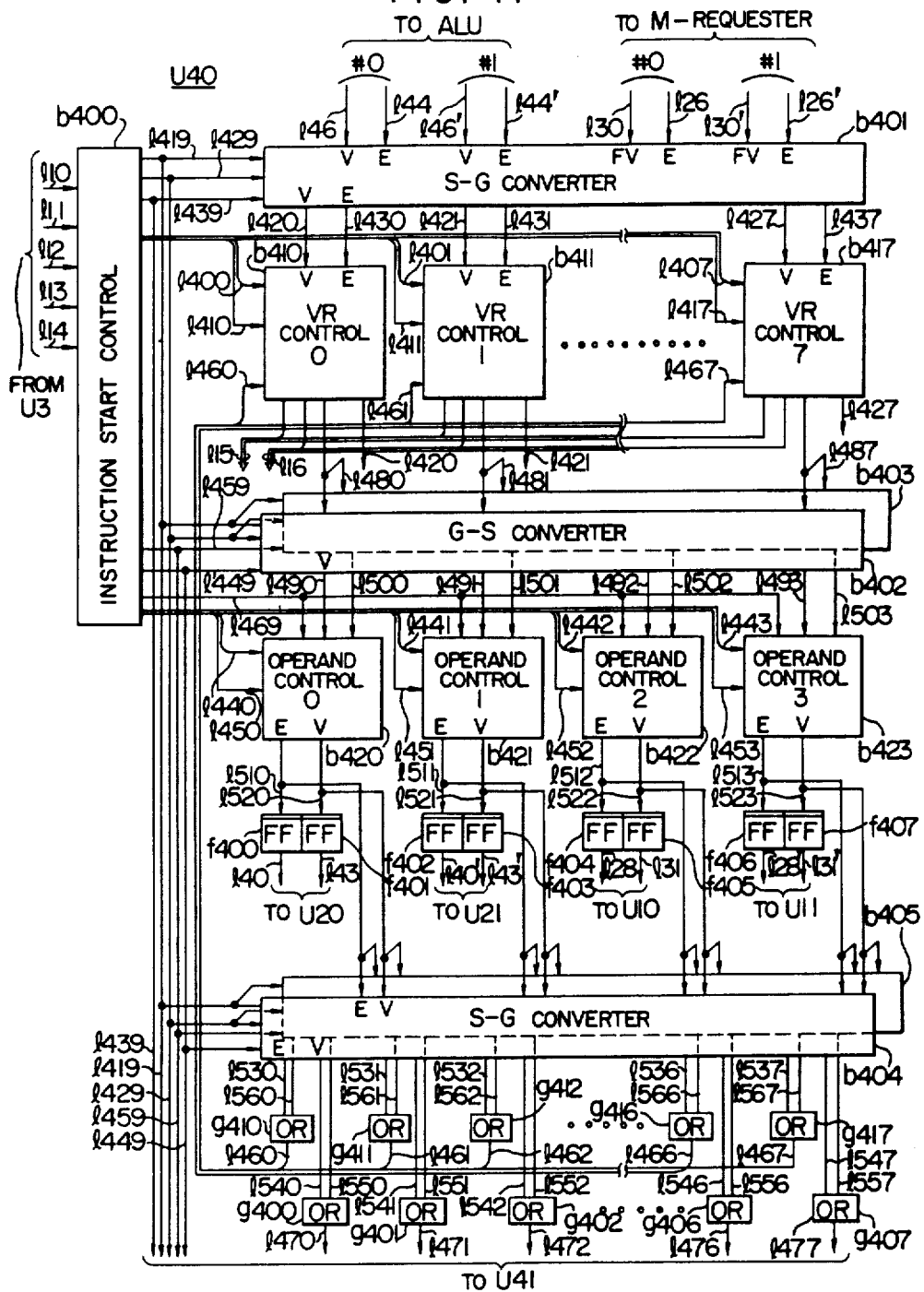
FIG. 11 shows details of a vector register control unit.

As shown in FIG. 11, the vector register control unit U40 comprises an instruction start control circuit b400, vector register control circuits b410–b417 one for each of the vector registers VR0–VR7, operand control circuits b420–b423 one for each of the ALU's U20 and U21 and the memory requesters U10 and U11, flip-flops f400–f407 for holding the outputs of the operand control circuits b420–b423, respectively, resource-register conversion circuits (G-S converters) b401, b404 and b405, and register-resource conversion circuits (G-S converters) b402 and b403. The G-S converter b402 or b403 sends the signals from any two of the vector register control circuits b410–b417 for one or two reading vector register numbers designated by the I-control U3 to one of the operand control circuits b420–b427 for the resource number designated by the I-control U3. The S-G converter b401 (or b404 or b405) sends the signal sent from the resource (or the operand control circuit b420-b427 therefor) designated by the I-control U3 to one of the vector register control circuits b410-b417 having the vector register number designated by the I-control U3 (or to the vector register of the same number).

When the instruction start control circuit b400 receives the start signal (on the line 110), the OP code (on the line 111), the register number (on the line 112), the type of resource (on the line 113) and the length of vector to be processed (on the line 114) from the I-control U3 and the OP code requests the use of the vector register, the following operation is carried out.

(1) The resource number, the vector register number necessary for the conversion and the set signals therefor are sent to the S-G converters b401, b404 and b405 and the G-S converters b402 and b403.

(2) The write or read start signal is issued to that one of the vector register control circuits b410-b417 which has the designated vector register number.

(3) The vector length data, the set signal therefor and, for an instruction which uses only one operand, a signal indicating that operand are set to that one of the operand control circuits b420-b423 which corresponds to the designated type of resource and resource number.

When the instruction is executed, the control signal is transferred in the following manner. It is now assumed that the data is read from the vector registers VR0 and VR1 and operated on by the ALU U20, and the result is written in the vector register VR7.

When the vector register VR0 permits the reading of a vector element, a vector register read enable signal is supplied from the vector register control circuit b410 to the line 1480. A vector register read enable signal for the vector register VR1 is supplied from the vector register control circuit b411 to the line 1481. The signals on the lines 1480 and 1481 are transferred to the output lines 1490 and 1500 to the ALU U20 through the G-S converters b402 and b403 and they are supplied to the operand control circuit b420. When those vector read enable signals are simultaneously present, the operand control circuit b420 prepares send vector data signals one for each vector element and supplies them to the line 1520. This signal is temporarily stored in the flip-flop f401 and then supplied to the ALU U20 through the line 143 as the data valid signal. On the other hand, the send vector data signal on the line 1520 is also supplied to the S-G converters b404 and b405 and sent to the lines 1540 and 1551 corresponding to the vector register numbers 0 and 1, respectively. They are used to update the read address counters (to be described later) for the vector registers VR0 and VR1 in the vector register data unit U41 (FIG. 10), through the OR gates g400 and g401 and the lines 1470 and 1471, respectively. According to one feature of the present invention, the address of the read address counter for the vector data is updated only after the send vector data signal (on the line 1520) has been generated. In actual practice, the reading of the data is effected after it has been confirmed that the reading of the two operands (vector registers VR0 and VR1) is permitted.

The data valid signal V (on the line 143) and the vector element data are sent to the ALU U20, operated thereby, and the operation result is sent to the vector register data unit U41 through the line 145 (FIG. 10) and the data valid signal V is returned to the vector register control unit U40 through the line 146. The data valid signal V is transmitted to the line 1437 for the write vector register VR7 by the S-G converter b401. In response to the signal on the line 1437, the vector register control circuit b417 sends the write address counter updating signal for the vector register VR7 to the vector register data unit U41 through the line 1427 and uses it to manage a pointer (to be described later) which is in the vector register control circuit b417 and points to the last written vector element in the vector register VR7. The pointer is used to read the written vector elements in the vector register VR7 when it is read by the succeeding instruction while it is being written.

When the last vector element is sent to the ALU U20, the operand control circuit b420 sends the last vector data signal E to the line 1510 in synchronism with the send vector data signal in order to indicate that it is the last vector element. The circuit b420 stores the vector length to be processed, which was set at the start of the instruction execution, and when the send vector data signals have been sent by that number of times, the last vector data signal is sent out. This signal is temporarily stored in the flip-flop f400 and then sent to the ALU U20 through the line 140 and returned to the S-G converter b401 through the line 144 in synchronism with the final operation result. The signal on the line 144 is transmitted to the line 1427 for the vector register VR7 by the S-G converter b401 and supplied to the vector register control circuit b417. The control circuit b417 terminates the writing to the vector register VR7 and informs the I-control U3 through the line 116 of the termination of the writing of the vector register VR7. On the other hand, the last vector data signal E on the output line 1510 from the operand control circuit b420 is also supplied to the S-G converters b404 and b405 and signals are produced on the lines 1530 and 1531 corresponding to the vector registers VR0 and VR1. They are supplied to the vector register control circuits b410 and b411 through the OR gates g410 and g411 via the lines 1460 and 1461, respectively, to terminate the reading of the vector registers and inform the I-control U3 through the line 115 of the termination of the reading of the vector registers VR0 and VR1.

(iii) Instruction start control circuit

Figure 12:
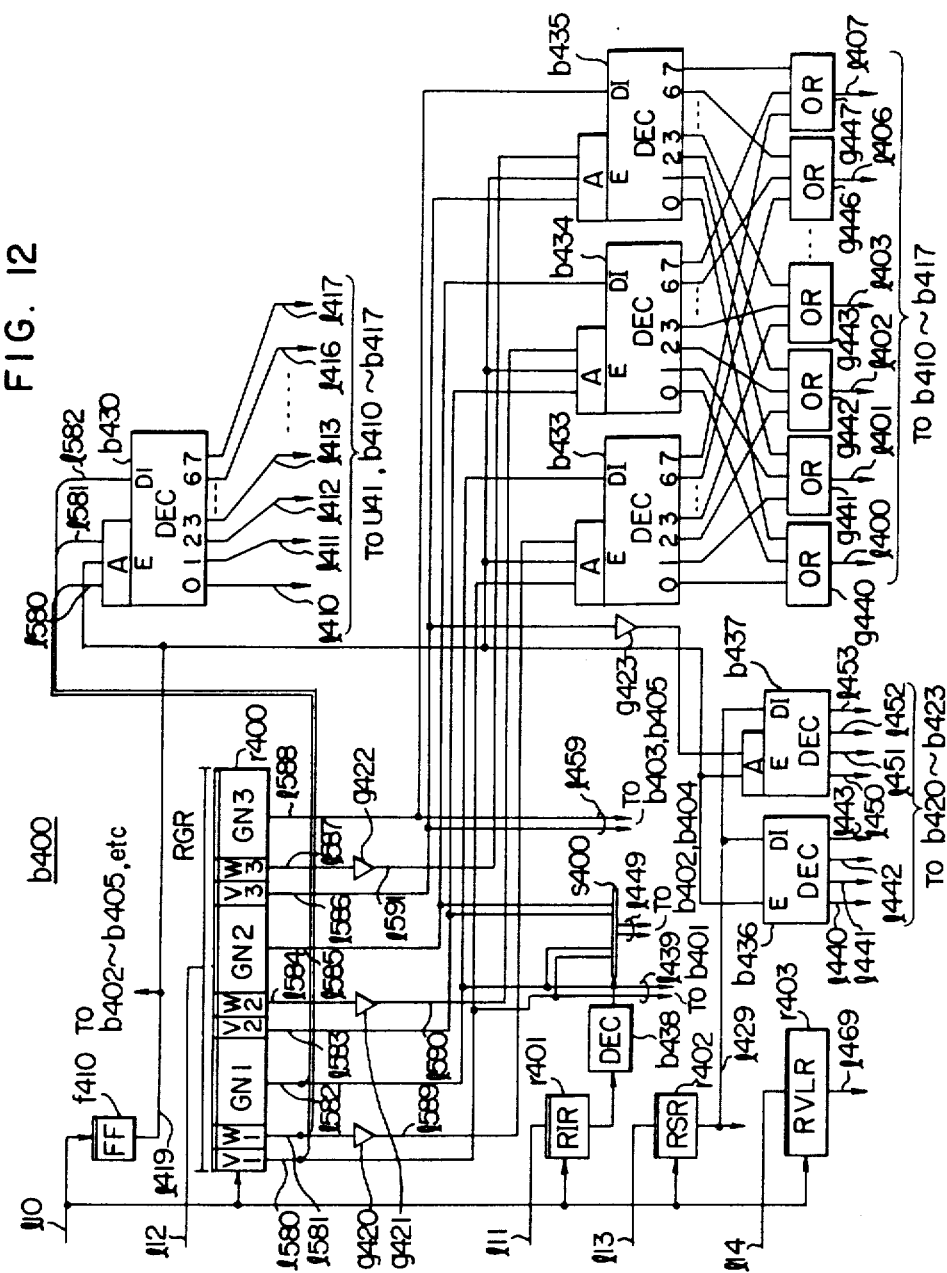
FIG. 12 shows details of an instruction start control circuit.

As shown in FIG. 12, the instruction start control circuit b400 sets the instruction start signal ST, the OP code, the vector register number and the type of use, the type of resource and the resource number, and the vector length to be processed, which are supplied from the I-control U3 through the lines 110-114, respectively, in the flip-flop f410, the RG register r400, the RI register r401, the RS register r402 and the RVL register r403, respectively, in response to the instruction start signal ST.

The output of the flip-flop f410 is sent to the S-G/G-S converters 402-405 (FIG. 14) as the information setting signal on the line 1419 and is used to generate various internal data signals.

Based on the content of the RG register r400, the register numbers to be supplied to the S-G converter and the G-S converter (FIG. 11), and the initialization 1 start signals to be supplied to the vecto register control circuit and the vector register data unit are generated. In a normal vector instruction, the R1 field uses the write vector register and the R2/R3 fields use the read vector register. Thus, the register number for the R1 field is supplied to the S-G converter b401 of FIG. 11, the register number for the R2 field is supplied to the G-S converter b402 and the S-G converter b404 and the register number for the R3 field is supplied to the G-S converter b403 and the S-G converter b405. However, as described in connection with FIG. 2, in the instruction to store the vector data in the main storage, it is necessary to carry the register number for the R1 field on the signal line which normally sends the register number for the R2 field because the R1 field designates the read vector register number. Thus, the GN1 field and the V1 field of the RG register r400 are sent to the S-G converter b401 through the line 1439 and supplied to the selector S400 as a first set. On the other hand, the GN2 field and the V2 field of the register r400 are supplied to the selector S400 as a second set, and on of the sets is selected and sent out by the S-G converter b404 and the G-S converter b402 through the line 1449. The selection by the selector S400 is controlled by the decoder b438. The selector S400 is controlled to select either the former or the latter depending on whether the OP code in the RI register r401 is for the instruction to store the vector data in the main storage or not. The GN3 field and the V3 field of the RG register r400 are sent to the S-G converter b405 and the G-S converter b403 through the line 1459.

In order to start the writing for the vector register control circuits b410-b417 and the vector register in the vector register data unit U41, the R1-R3 fields of the RG register r400 are sent to the decoder b430. The decoder b430 has a decode valid terminal E with an AND gate A. When all inputs to the AND gate A are "1", the decoding is valid. The V1 field, the W1 field and the output of the flip-flop f410 are supplied to the AND gate A of the decoder b430 through the lines 1580, 1581 and 1419, respectively, and the GN1 field is supplied through the line 1439 as the signal to be decoded. When the decoding is valid, that is, when the data in the GN1 field is significant (V1 field is "1"), the writing is designated (W1 field is "1" and the instruction is to be started (1419 is "1"), the content of the GN1 field supplied through the line 1582 is decoded, and if the GN1 field includes any one of the vector register numbers 0-7, one of eight output lines 1410-1417 is "1". It is assumed here that decoding is such that when the GN1 field is "0" the output line 1410 is "1", and when the GN1 field is "1", the output line 1411 is "1", and when it is "2", the output line 1412 is "1". For the instruction under consideration, the R1 field of the RG register r400 designates the writing to the vector register VR0 (W1="1", GN1="0"). Thus, only the line 1410 is "1". The output lines 1410-1417 of the decoder b430 are supplied to the vector register control circuits b410-b417 (FIG. 11) and the vector register data unit U41. The decoders b433-b435 start the reading of the vector register. Not the W1, W2 and W3 fields but the inversions of those through the inverters g420-g422 are supplied to the decode valid terminals E with AND gates A, through the lines 1589-1591, and the decoding is valid only when the Ri field of the RG register r400 is for reading (Wi="0"). The other aspects are identical to the decoder b430. The outputs of the decoders b433-b435 are sent to the vector register control circuits b410-b417 and the vector register data unit U41 through the OR gate g440-g447 and the lines 1400-1407, as the start signals. In the above embodiment, the decoder b433 may be omitted and the output of the selector S400 may be supplied to the decoder b434. In this case, it is necessary to supply the outputs of the W1 field and the W2 field as well as the GN1 and GN2 fields to the selector S400.

The decoder b436 sends the start signal for the operand control circuits b420-b423. The line 1419 is supplied to the decode valid terminal E and the type of resource and the resource number from the RS register r402 are supplied to the data input terminal DI. They are decoded so that one of the lines 1440-1443 assumes "1". The "1" signal on the lines 1440-1443 is used as the start signal for the operand control circuits b420-b423.

The decoder b437 indicates when it is not necessary to synchronize two vector elements by means of the operand control circuits b420-b423. The synchronization of two operands is not necessary when the vector data is stored from one vector register to the main storage, when the vector data is transferred between a pair of vector registers, or when the vector data in one vector register is converted and stored in another vector register, that is, when only one vector register is to be read and the R3 field of the instruction is not necessary. In such a case, the V3 field of the RG register r400 is "0". The decoder b437 has a decode valid terminal E with a two-input AND gate A to which the line 1419 and the inversion of the output of the U3 field of the RG register r400 through the inverter g423 are supplied. The decoder b437 decodes the type of resource and the resource number supplied from the RS register r402 and supplies a "1" output to one of the lines 1450-1453. The outputs of the decoder b437 are connected to the operand control circuits b420-b423 through the lines 1450-1453, respectively.

The type of resource and the resource number in the RS register r402 are also supplied to the S-G converters b401, b404 and b405 and the G-S converters b402 and b403 through the line 1429.

The vector length to be processed, as stored in the RVL register r403, is supplied to the operand control circuits b420-b423 through the line 1469.

(iv) S-G converter

Figure 13:
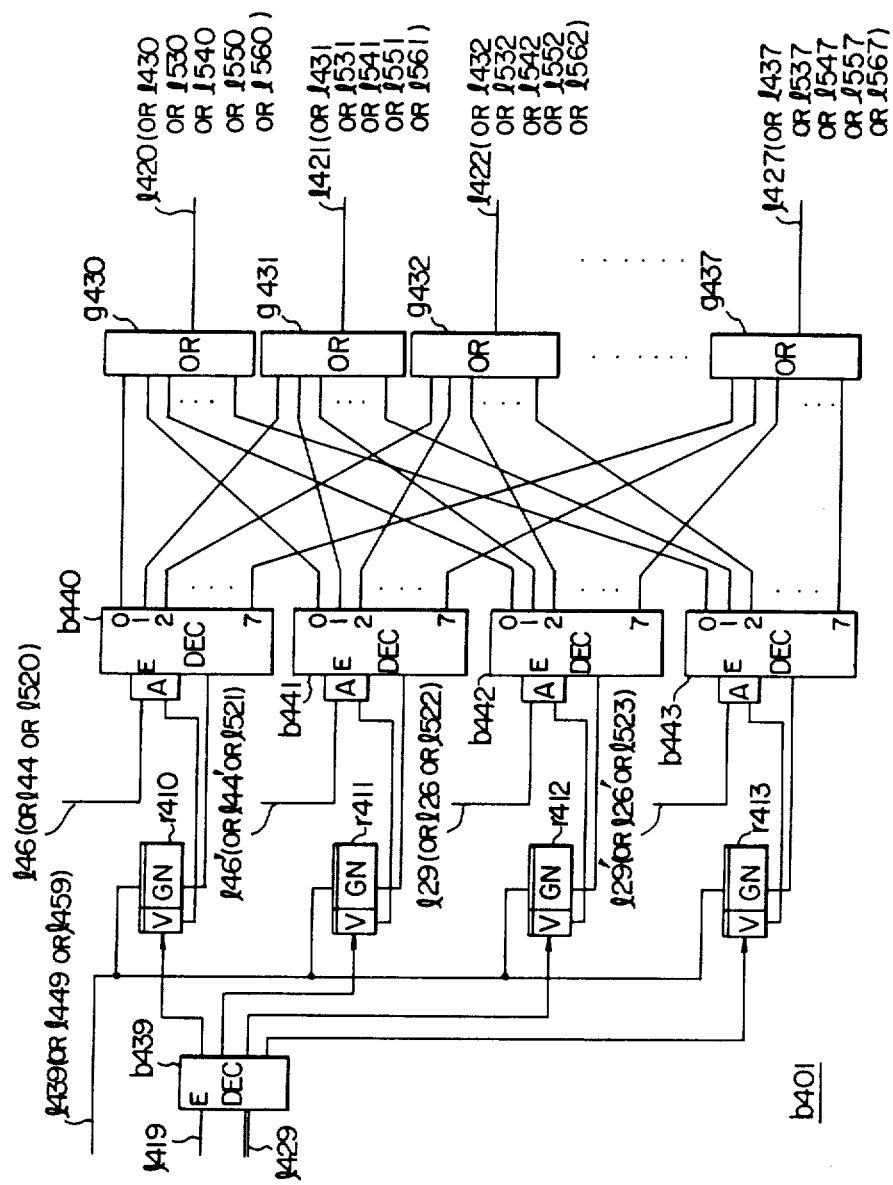
FIG. 13 shows details of an S-G conversion circuit.

FIG. 13 shows that circuit of the S-G converters b401 which supplies the data valid signal sent from the resource to the vector register circuit for the register number designated by the I-control U3.

In FIG. 13, the type of resource is supplied to the data terminal of the decoder b439 through the line 1429, the write vector register number is supplied to the register r410-r413 corresponding to the resource through the line 1439, and the instruction start signal ST is supplied to the decode valid terminal E of the decoder b439 through the line 1419. The registers r410-r413 correspond to the memory requesters U10 and U11 and the ALU's U20 and U21, respectively. The line 1439 carries the register number GN1 as well as the signal V indicating the validity of the register number as explained in connection with FIG. 12. These signals are reset by the decoder b439 to those corresponding to the type of resource and the resource number on the line 1429 in the registers r410-r413. The register numbers GN1 in the registers r410-r413 are supplied to the decode input terminals of the decoders b440-b443 and the V bits are supplied to the first input terminals of the decode valid terminals E with AND gates A of the decoders b440-b443. The data valid signals from the memory requesters U10 and U11 and the ALU's U20 and U21 are supplied to the second input terminals of the decode valid terminals E, through the lines 146, 146', 129 and 129', respectively. For example, when the output "1" of the V field in the register r410 is supplied to the AND gate of the decoder b440, the decoder b440 is in the decode valid status if "1" signal is supplied from the line 146, and the output of the GN field of the register r410 is decoded so that one of the output terminals 0-7 of the decoder assumes the level "1" and one of the output lines 1420-1427 of the OR gates g430-g437 connected to the respective output terminals of the decoder assumes the level "1". The output lines 1420-1427 correspond to the vector registers VR0-VR7 and supply the data valid signals to the respective vector register control circuits 0-7.

Once the data have been set in the registers r410-r413, the "1" or "0" status on the line 146 is transmitted to one of the lines 1420-1427. It should be noted here that so long as the register numbers in the registers r410-r413 are different, the signals on the lines 146, 146', 129 and 129' can be supplied to the corresponding ones of the lines 1420-1427 simultaneously. The signals can be supplied simultaneously to up to four register numbers. In this manner, up to four resources can be operated in parallel. The circuit portion of the S-G converter b401 which supplies the last vector data signal supplied from the resource to the vector register control circuit 0-7 corresponding to the register number designated by the I-control U3 is obtained by substituting the lines 146, 146', 129 and 129' of FIG. 13 by the lines 144, 144', 126 and 126', respectively, and substituting the lines 1420-1427 by the lines 1430-1437, respectively.

The S-G converter b404 comprises a circuit for sending out the send vector data signals supplied from the operand control circuits 0-3 for the respective resources through the lines 1520-1523 to the vector registers of the register numbers designated by the I-control U3, through the lines 1540-1543 and a circuit for sending out the last vector data signals supplied from the operand control circuits 0-3 through the lines 1510-1513 to the vector register control circuits 0-7 for the resource numbers designated by the I-control U3, through the lines 1530-1537. The former circuit is obtained by replacing the line 1439 of FIG. 13 by the line 1449, replacing the lines 146, 146', 129 and 129' by the lines 1520-1523, respectively, and replacing the lines 1420-1427 by the lines 1540-1547, respectively. The latter circuit is obtained by replacing the lines of FIG. 13 by the lines 1459, 1510-1513 and 1530-1537. The S-G converter b405 may be similar to the circuit b404 and hence a detailed description thereof is omitted. The signal line numbers after the substitution are shown in FIG. 13 in the parentheses following the signal line numbers 146, 146', 129, 129', 1420-1427.

(v) G-S converter

Figure 14:
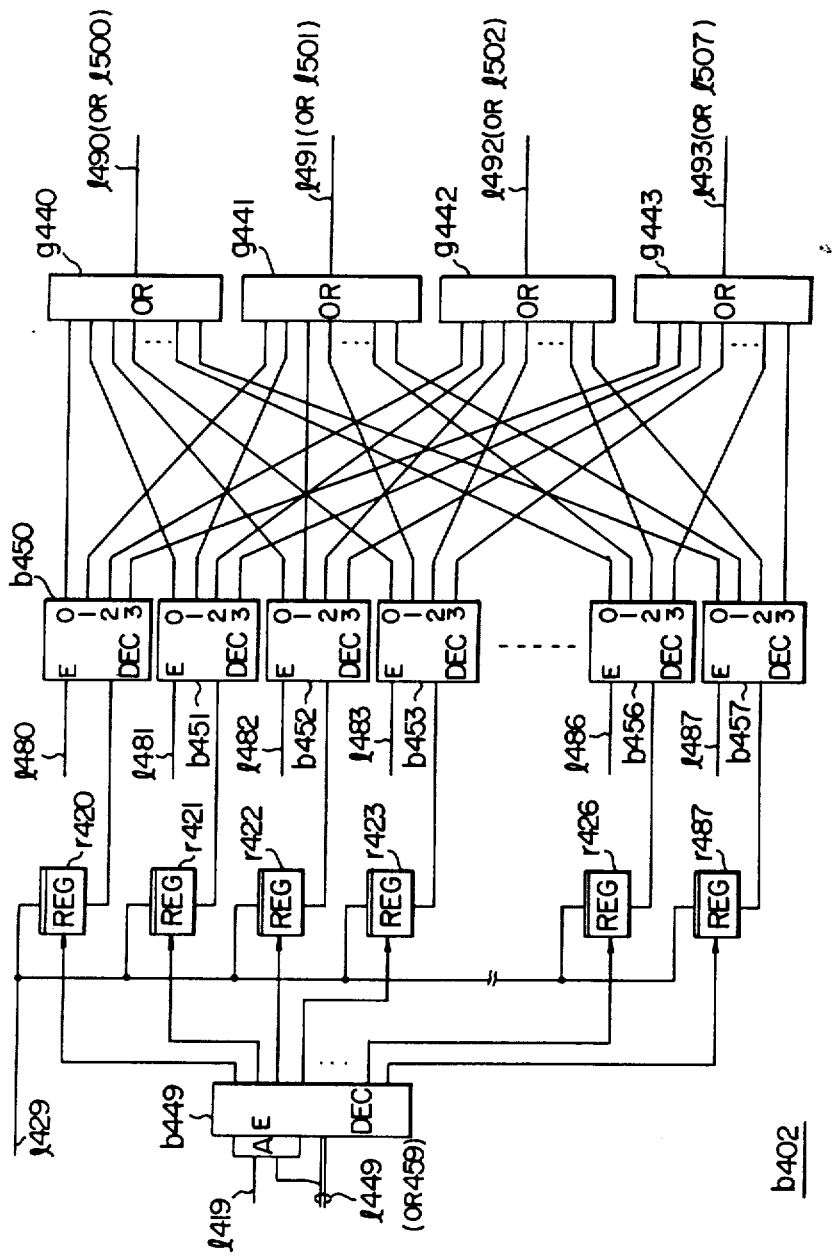
FIG. 14 shows details of a G-S conversion circuit.

FIG. 14 shows a detail of the G-S converter b402 (FIG. 11). The type of resource and the resource number are supplied from the instruction start circuit b400 through the line 1429 and the register number is supplied through the line 1449 and the set signal is supplied through the line 1419. The type of resource and the resource number on the line 1429 are set in that one of the registers r420-r427 for the vector registers which correspond to the register number on the line 1449. The designation of the register in which they are set is controlled by the decoder b449 which receives the register number on the line 1449 to the data terminal and receives the set signal on the line 1419 and the register number valid signal V on the line 1439 to the AND gate A of the decoder b449. The outputs of the registers r420-r427 are supplied to the corresponding decoders b450-b457. When the vector register read enable signal supplied to each of the decode valid terminals of the decoders b450-b457 from the corresponding vector register control circuits 0-7 through the signal lines 1480-1487, respectively, is "1", the decoders b450-b457 each produces "1" output on one of the output terminals corresponding to the type of resource and the resource number supplied from the data input terminal. As a result, one of the lines 1490-1493 which corresponds to the designated resource assumes the level "1" via one of the OR gates g440-g443 connected to the output terminals 0-3 of the decoders b450-b457. When one of the lines 1480-1487 is "0", the corresponding one of the decoders b450-b457 is prevented from decoding and the "1" and "0" status of the lines 1480-1487 are transmitted to the corresponding signal lines 1490-1493.

When the types of resource and the resource numbers set in the registers r420-r427 are different from each other, the "1" signals on the lines 1480-1487 can be simultaneously supplied to the corresponding ones of the lines 1490-1493. The signals can be supplied simultaneously to up to four resources. In this manner, up to four resources can be operated in parallel.

The G-S converter b403 of FIG. 11 can be obtained by replacing the signal line 1449 of FIG. 14 by the line 1459 and replacing the lines 1490-1497 by the lines 1500-1507, respectively. In FIG. 14, the signal line numbers after the substitution are shown in the parentheses following the signal line numbers of the lines to be replaced.

(vi) Vector register control circuit

Figure 15:
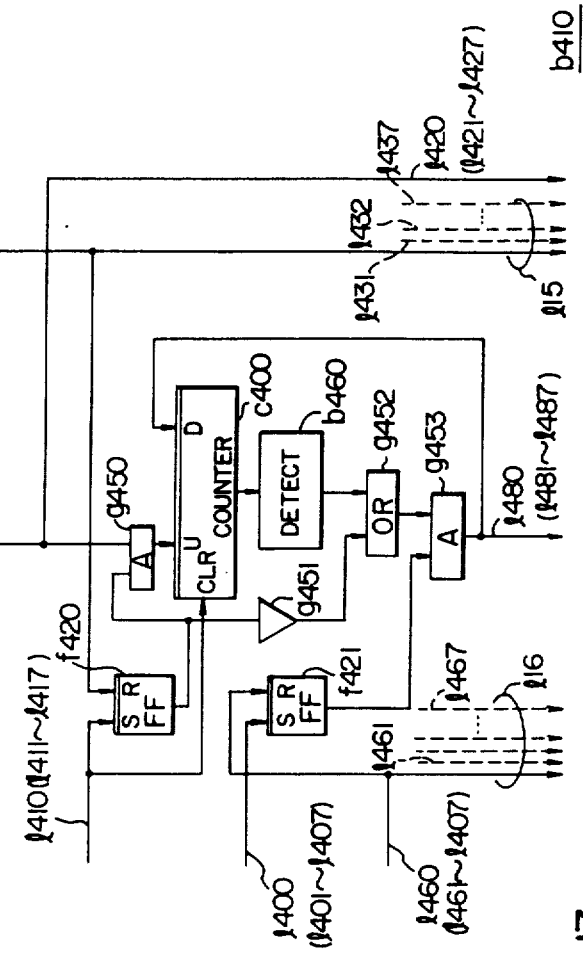
FIG. 15 shows details of a vector register control circuit.

FIG. 15 shows a detail of the vector register control circuit b410. Other vector register control circuits 1-7 are of the same construction and can be obtained by replacing the lines 1400, 1410, 1420, 1430, 1460 and 1480 by the signal line numbers shown in the parentheses following to the above signal line numbers. The control circuits each operate in one of three modes, reading, writing and chaining (simultaneous reading and writing).

(a) Writing

When the start of writing to the vector registe VR0 is commanded by the instruction start control circuit b400 (FIG. 14) through the line 1410, the flip-flop f420 which indicates the writing mode is set and the up/down counter (U/D counter) C400 is cleared. The U/D counter produces the following output for the respective inputs to the U/D terminals

| Input | | Output |
| --- | --- | --- |
| U | D | (Content of counter) |
| 0 | 0 | no change |
| 0 | 1 | decremented by one |
| 1 | 0 | incremented by one |
| 1 | 1 | no change |

When the data valid signal is supplied from the S-G converter b401 through the line 1420, this signal is supplied to the U terminal of the U/D counter C400 through the AND gate g420 which is now open by the "1" output of the flip-flop f420 so that the content of the U/D counter C400 is incremented by one. The data valid signal is also sent to the vector register data unit U41 (FIG. 10). When the last vector data signal is supplied from the S-G converter b401 through the line 1430, this signal resets the flip-flop f420 to terminate the write mode and it is also sent to the I-control U3 (FIG. 1) through the line 1430 to reset the bit (Wj) corresponding to the write vector register number (j) in the RGSW register r306 (FIG. 3). The line 1430 and the output lines 1431–1437 of the vector register control circuits 1–7 correspond to the line 115 in FIG. 1.

(b) Reading

When the start of reading of the vector register VR0 is commanded by the instruction start control circuit b400 (FIG. 11) through the line 1400 while the writing of the vector register VR0 is not started, the flip-flop f421 which indicates the read mode is set. Since the flip-flop f420 is in the reset status, the output line 1480 of the AND gate g453 to which the output of the flip-flop f420 is supplied through the inverter g451 and the OR gate g452 and the output of the flip-flop f421 is supplied is "1". The signal on the line 1480 is supplied to the G-S converter b402 (FIG. 11) as the read enable signal. Accordingly, as explained in connection with the I-control U3, when an instruction uses the vector register for reading, the succeeding instruction which uses that vector register for writing is no started until the reading is completed. Accordingly, the flip-flop f420 is not set until the reading is completed. Thus, the read enable signal is continuously sent to the line 1480 until the flip-flop f421 is reset. When all of the elements of the vector register VR0 have been read, the last vector data signal is supplied from the S-G converter b404 through the line 1460 and the flip-flop 421 is reset thereby.

The line 1460 is combined with the signal lines 1461–1467 of the vector register control circuits b411–b417 as the line 116, which is supplied to the RGSW register r306 (FIG. 3) in the I-control U3 to indicate the termination of the reading of the vector register VR0 and to reset the bit R0 of the register to zero.

(c) Chaining

The chaining occurs when the writing of a vector register is requested by an instruction and the reading of the register is requested before the end of the writing, by a subsequent instruction. When the writing is requested, the actual writing of the vector register does not occur until the data valid signal and the write data arrive from the resource, but the time relation between the arrival of the data valid signal and the request for reading is not important.

(C-1)

When the writing is requested through the line 1410 and the flip-flop f420 is set so that the U/D counter C400 is reset and then the reading is requested through the line 1400 before the arrival of the data valid signal from the line 1420 and the flip-flop f421 is set, the output of a positive detection circuit b460 connected to the output of the U/D counter C400 to detect when the content of the counter is no smaller than 1 is "0" and the output of the inverter g451 is also "0" so that the output line 1480 of the AND gate g453 remains "0". If the data valid signal arrives on the line 1420 in a machine cycle n, it is supplied to the U/D counter C400 through the AND gate g450 to increment the content of the U/D counter C400 by one. Thus, the output of the positive detection circuit b460 assumes "1" and the vector register read enable signal is supplied to the line 1480 through the OR gate g452 and the AND gate g453. The line 1480 is connected to the D terminal of the U/D counter C400. If the next data valid signal is not supplied to the line 1420 in the machine cycle (n+1), the count of the counter C400 is reset to zero in the machine cycle (n+1). Accordingly, the read enable signal is supplied to the line 1480 only once. If the data valid signal is intermittently supplied thereafter, the read enable signal is supplied to the line 1480 each time in a similar intermittent fashion. On the other hand, if the data valid signal is continuously supplied in and after the machine cycle (N+1), "1" is supplied to the U terminal and the D terminal so that the count of the counter C400 does not change but remains "1" and "1" is continuously supplied to the line 1480.

(C-2)

It is assumed that the writing is requested through the line 1410, the flip-flop f420 is set, the U/D counter C400 is reset and then the data valid signal arrives over a plurality of machine cycles and the U/D counter C400 is counted up each time to indicate a non-zero count, and then the flip-flop f421 is set by the read start in the machine cycle n. Since the output of the positive detection circuit b460 connected to the output of the U/D counter C400 is "1", the vector register read enable signal is supplied to the line 1480. Since the line 1480 is supplied to the D terminal of the U/D counter C400, the count of the U/D counter C400 is decremented by one unless the data valid signal is supplied from the line 1420 in the next machine cycle (n+1), and the count remains unchanged if it is supplied. The above operation is repeated until the count of the U/D counter C400 reaches zero. The number of the read enable signals supplied to the line 1480 after the start of reading is equal to a sum of the count of the U/D counter C400 before the flip-flop f421 is set and the number of the data valid signals supplied thereafter to the line 1420. Thus, in the cases of (C-1) and (C-2), it is assured that the reading does not occur beyond the number of the vector elements written in the vector register. It may be considered that the content of the U/D counter C400 represents the difference between the number of the vector elements written in the vector register and the number of vector elements read therefrom.

When the writing is completed during the chaining and the flip-flop f420 is reset, the content of the U/D counter is not significant and the operation is equivalent to the reading of (b).

(vii) Operand control circuit

Figure 16:
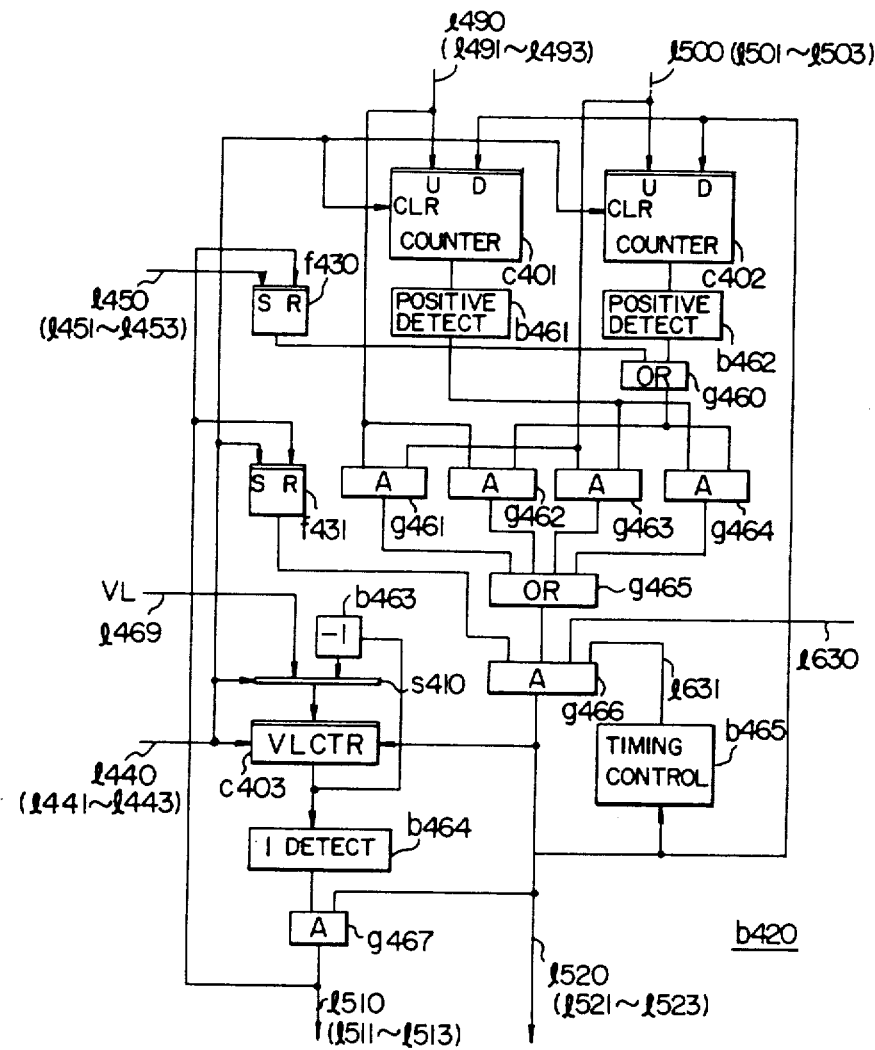
FIG. 16 shows details of an operand control circuit.

FIG. 16 shows the details of the operand control circuit 0 b420. The other operand control circuits 1-3 are of the same construction except that the signal line numbers are changed to those shown in the parentheses following the signal line numbers shown in FIG. 16.

When the start signal is supplied from the instruction start control circuit b400 through the line 1440, the selector S410 selects the vector length (VL) to be processed (assuming that it is always no smaller than one) on the line 1469 and it is set in the vector length counter (VLCTR) C403. The U/D counters C401 and C402 are cleared by the start signal. The flip-flop f431 is set to store the indication that the processing of the operand control circuit 0 is valid. If the instruction which requests the memory requester U10 corresponding to the operand control circuit 0 requires the reading of only one vector register (assuming that the R3 field of the instruction does not designate the reading of the vector register), a signal indicating this fact is sent from the instruction start control circuit b400 through the line 1450 to set the flip-flop f430.

It is now assumed that the R2 and R3 fields of the instruction which requires the ALU U20 designate the reading of the vector register. In this case, the flip-flop f430 is "0". The lines 1490 and 1500 supply the vector register read enable signals from the G-S converters b402 and b403 to the U terminals of the counters C401 and C402, respectively. Those signals are supplied in various ways.

The operation is carried out in each machine cycle depending on the input signals. The counters C401 and C402 are of the same construction as the counter C400 (FIG. 15), and the positive detection circuits b461 and b462 are of the same construction as the positive detection circuit b460 (FIG. 15).

(a) When both signals are not supplied:
This case includes the following four cases.
(a-1) The U/D counters C401 and C402 are "0".
(a-2) Only the U/D counter C401 is positive.
(a-3) Only the U/D counter C402 is positive.
(a-4) The U/D counters C401 and C402 are positive.

(a-1)–(a-3)
In those cases, none of the outputs of the AND gates g461–g464 is "1" and no output is produced.

(a-4)
This case occurs after the vector register read enable signals have been sent through the lines 1490 and 1500. In this case, the outputs of the positive detection circuits b461 and b462 are "1" and the former is supplied directly to the AND gate g464 and the latter is supplied to the AND gate g464 through the OR gate g460. The "1" output from the AND gate g464 is supplied to the AND gate g466 through the OR gate g465. The AND gate g466 receives the output of the flip-flop f431. The AND gate g466 also receives the lines 1630 and 1631 as will be described later. It is now assumed that both lines are "1". The send vector data signal is supplied to the output line 1520 of the AND gate g466. The output line 1520 is supplied to the D terminals of the U/D counters C401 and C402 so that the counts thereof are decremented by one.

The output line 1520 is supplied to the VLCTR counter C403 as a set signal to decrement the count thereof by one. That is, the output of the VLCTR C403 is connected to a decrementer b463 and the decremented count is supplied to the selector S410. Since the instruction start signal is now no longer at the control terminal of the selector S410 through the line 1440, the output of the decrementer b463 is selected and it is set in the VLCTR C403. The next operation of the circuit depends on the contents of the U/D counters C401 and C402 and the inputs of the vector register read enable signals from the lines 1490 and 1500.

When the send vector data signal is supplied to the line 1520, if a "1" detection circuit b464 detects that the content of the VLCTR C403 before the decrement is "1", the detection signal is sent to the AND gate g467 which ANDs it with the send vector data signal and supplies the last vector data signal to the line 1510. The flip-flops f431 and f430 are reset by the signal on the line 1510.

(b) When only the signal on the line 1490 is supplied:
(c) When only the signal on the line 1500 is supplied:
The operations are same for both cases. The operation for the case (b) is explained here. This case includes the following two cases:
(b-1) The U/D counter C402 is "0":
(b-2) The U/D counter C402 is positive.

(b-1) case
In this case, the output of the positive detection circuit b462 is "0" and hence none of the outputs of the AND gates g461–g464 is "1". Accordingly, the output of the OR gate g465 and the output of the AND gate g466 are "0" and the inputs to the D terminals of the U/D counters C401 and C402 remain "0". The send vector data signal is not supplied to the line 1520. Since the vector register read enable signal is supplied from the line 1490 to the U terminal of the U/D counter C401, the U/D counter C401 is incremented by one.

(b-2) case
In this case, the output of the positive detection circuit b462 is "1" and hence the output of the AND gate g462 is "1" and the send vector data signal is sent to the line 1520 through the OR gate g465 and the AND gate g466. The controloperations for the VLCTR C403 and the flip-flops f430 and f431 are same as those in (a-4) and hence they are not explained here. As the line 1520 is "1", the D terminals of the U/D counters C401 and C402 are "1". Since the "1" signal is supplied to the U terminal of the U/D counter C401, the content thereof does not change. Since the "0" signal is supplied to the U terminal of the U/D counter C402, the count thereof is decremented by one.

(d) When the signals on the lines 1490 and 1500 are simultaneously supplied:
This case includes the following four cases.
(d-1) The U/D counters C401 and C402 are "0".
(d-2) Only the U/D counter C401 is positive:
(d-3) Only the U/D counter C402 is positive:
(d-4) The U/D counters C401 and C402 are positive.

(d-1)
In this case, the output signal of the AND gate 9461 is "1" as a result of the vector register read enable signals on the lines 1490 and 1500. As a result, the send vector data signal is supplied to the line 1520. The U terminals of the U/D counters C401 and C402 are "1" and the D terminals are also "1" by the "1" signal on the line 1520. Therefore, the contents of the counters do not change. The control operation for the VLCTR C403 is same as that in (a-4).

(d-2) and (d-3)
The operations are same for the both cases. The operation for the case (d-2) is explained here.

In the case (d-2), only the content of the U/D counter C401 is positive and hence the output of the positive detection circuit b461 is "1" and the outputs of the AND gates g461 and g463 are "1". Accordingly, the send vector data signal is supplied to the line 1520 through the OR gate g465 and the AND gate g466. The control operation for the VLCTR C403 is the same as that in (a-4) and hence it is not explained here. The contents of the U/D counters C401 and C402 are not changed similar to the case (d-1).

(d-4)
In this case, the contents of the U/D counters C401 and C402 are positive and hence the outputs of the positive detection circuits b461 and b462 are "1" and all outputs of the AND gates g461–g464 are "1". The operation is same as that in (d-2) and the send vector data signal is supplied to the line 1520. The contents of the U/D counters C401 and C402 are not changed.

As seen from the above description of the operations, the U/D counters C401 and C402 serve to synchronize the send-out of the two operands (vector data). When only one vector data read enable signal is supplied, it is stored in the counter ( by incrementing the counter by one) and the counter is decremented by one when it is read. When the vector register read enable signals are supplied simultaneously, the content of the counter is not changed.

When only one of the operands is used, the flip-flop f430 which indicates that only one operand is used is set at the start of the operand control circuit. The output of the flip-flop f430 is supplied to the input of the OR gate g460 to which the output of the positive detection circuit b462 is also supplied. Thus, the output of the OR gate g460 assumes the level "1" irrespective of the content of the U/D counter C402. As a result, the send vector data signal is produced only by the vector register read enable signal supplied to the line 1490.

The line 1630 shown in FIG. 16 carries a send grant signal for the send vector data signal as required. (It is not necessary in the present invention). It is used, for example, when it is desired to supply the vector data (and data valid signals) to the ALU with at least a predetermined time interval (for example, when the ALU cannot continuously receive the data). In this case, the send grant signal is produced by the operand control circuit. For example, an output of a flip-flop which is reset by the data valid signal and set a predetermined time after the data valid signal may be used as the grant signal. It may also be used to temporarily stop the vector data from being sent to the memory requester (when the storing in the main storage is to be delayed). In this case, the grant signal is produced by the storage control unit U1 (FIG. 5) or the memory requester. When the sending of the vector data is not granted by the line 1630, the vector register read enable signals supplied from the lines 1490 and 1500 are supplied to the U/D counters C401 and C402 to update the counters. When the grant signal is supplied from the line 1630, the output of the AND gate g464 assumes the level "1" because the contents of the U/D counters C401 and C402 are positive even if the signals from the lines 1490 and 1500 are not supplied, and the send vector data signal is supplied to the line 1520. The U/D counters C401 and C402 are decremented by one.

The timing control circuit b465 controls the send timing of the send vector data signal. As shown in detail in FIG. 18, the vector register is fpr,ed by two memory elements and the memory elements are alternately read and written so that the reading and the writing occur apparently simultaneously for the vector register. When one memory element is written, the other memory element is read, and in the next cycle the read and write modes are reversed. Since the memory element which is in the write mode cannot read the data simultaneously, it is necessary that the reading be delayed during that cycle and the data is read in the next cycle. To this end, the sending of the send vector data signal is suspended for a while. This is controlled by the timing control circuit b465. If it determines that the send vector data signal should not be sent in the next cycle, it produces a "0" signal on the output line 1631 to suppress the output of the AND gate g466.

Figure 17:
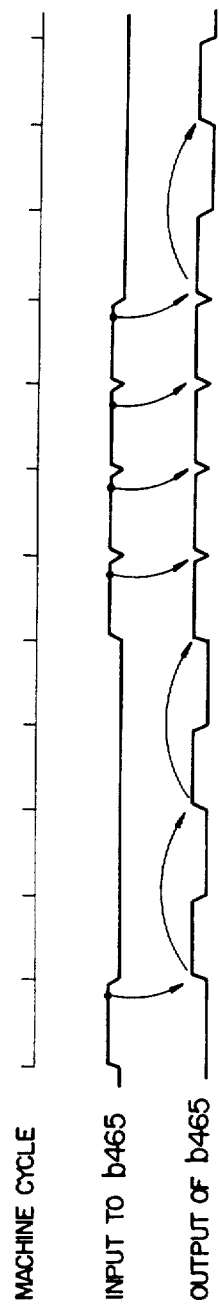
FIG. 17 shows a time chart for the operation of a timing control circuit.

Specifically, the timing control circuit b465 operates in the following manner. When the send vector data signal is supplied in one machine cycle, it produces a "1" output in the next machine cycle, the two cycle later machine cycle, the four cycle later machine cycle and so on. It produces a "0" output in the one cycle later machine cycle, the three cycle later machine cycle and so on. This timing is shown in FIG. 17. It should be noted that if the send vector data signal is supplied continuously, the timing control circuit b465 continuously produces a "1" output because a "1" output is supplied in the next machine cycle.

In the present embodiment, the operand control circuit receives two vector register read enable signals. It may be readily attained to receive three or more vector register read enable signals to prepare the send vector data signal.

(viii) Vector register data unit

Figure 18:
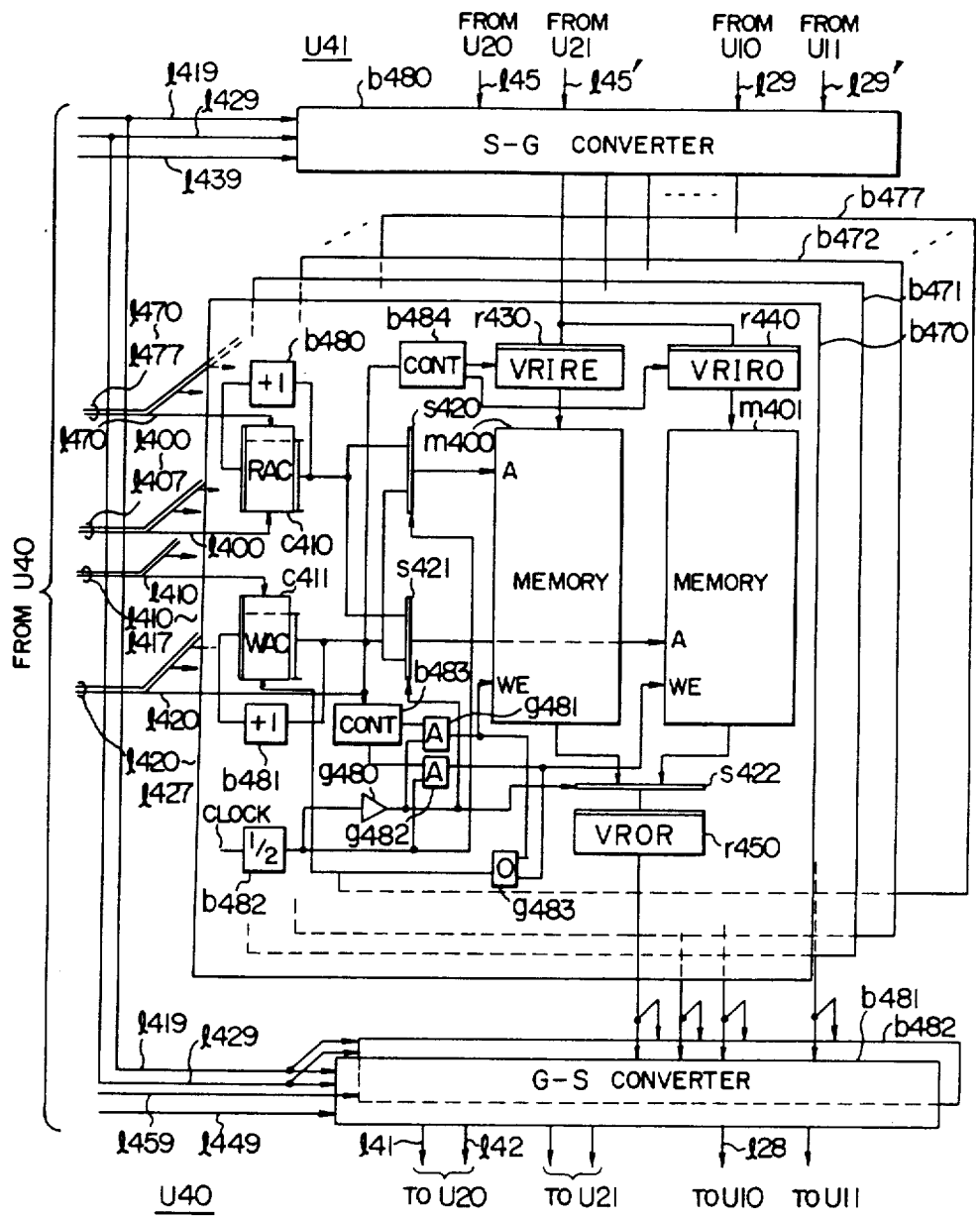
FIG. 18 shows details of a vector register data unit.

In FIG. 18, eight vector registers are included in the vector register circuits b470–b477. Each vector register is constructed by memory elements because of the large capacity. The memory elements are addressed to read or write data from or to the addressed location but the data cannot be read or written from or to different addresses simultaneously. Since it is necessary for the chaining to simultaneously write a vector element and read another vector element, each vector register is constructed by two memory elements m400 and m401 and they are alternately read and written in the present embodiment. As a result, the reading and the writing at different addresses can be simultaneously effected.

The vector elements are numbered such that the even-numbered vector elements and the odd-numbered vector elements are in the same memory element.

The operation is now explained in detail. The reading and writing of the vector register UR0 is explained. The operations of the other vector registers are identical.

When the instruction is started, the instruction start control circuit b400 (FIG. 12) of the vector register control unit U40 supplies to the S-G converters b480 and G-S converters b481 and b482 the type of resource and the resource number through the line 1429, the write vector register number through the line 1439, the read vector register numbers (for two operands) through the lines 1449 and 1459 and a set signal therefor through the line 1419, and they are set in the S-G converter b480 and the G-S converters b481 and b482. The S-G/G-S converters b480, b481 and b482 are identical to those shown in FIGS. 13 and 14.

Figure 19:
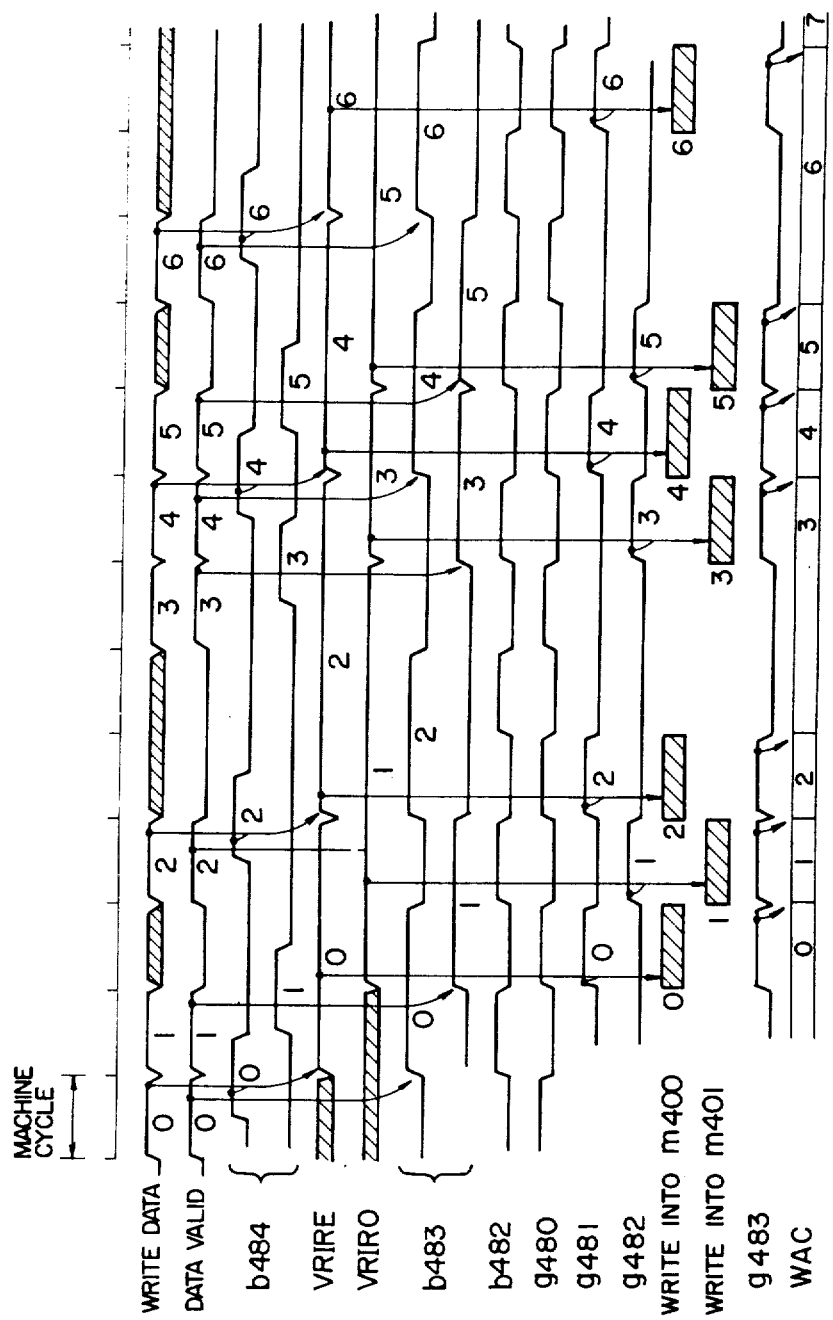
FIG. 19 shows a time chart for the circuit of FIG. 18.

The writing to the vector register VR0 is effected in the following manner. The signal to instruct the start of the writing to the vector register VR0 is sent from the instruction start control circuit b400 through the line 1410. This signal clears the write address counter C411 to zero. The output of the write address counter C411 is supplied to the selectors S420 and S421, which also receive the output of the read address counter C410. The output of the timing control circuit b482 and the inversion thereof through the inverter g480 are supplied to the control terminals of the selectors S420 and S421. The timing control circuit b482 includes a trigger type flip-flop (not shown) which receives a clock produced in each machine cycle, and alternately produces "0" and "1" outputs for each machine cycle. Accordingly, the timing control circuit b482 controls those selectors such that when the selector S420 selects the output of the read address counter C410 the selector S421 selects the output of the write address counter C411, and in the next machine cycle the select oppositely. The output of the selector S420 is supplied as the address of the memory element m400 and the output of the selector S421 is supplied as the address of the memory element m401. When the write data arrives at the S-G converter b480 from the ALU U20 or U21 or the memory requesters U10 or U11 through the line 145, 145', 129 or 129', the data is supplied from the resource designated by the line l429 to one of the vector register circuits b470 b477 designated by the line l439. Since it is now assumed that the data is to be written in the vector register VRO, it is supplied to the circuit b470. The write data is alternately set into the registers VRIRE r430 and VRIRO r440 at the input of the circuit b470 under the control of the VRIR input control circuit b484. The VRIR input control circuit b484 receives the data valid signal on the line l420 and controls to set the data in the VRIRE r430 and the VRIRO r440 when the data valid signal is even-numbered and odd-numbered, respectively. The write cycle is alternately allotted to the memory elements m400 and m401 (as will be explained later) so that the vector element may not be written in a certain cycle but may have to wait for one cycle. The next write data may arrive at the same vector register circuit b470 during waiting. Accordingly, two registers VRIRE and VRIRO are provided so that the two sequential write data can be written in the different memory elements m400 and m401. The writing is instructed by the data valid signal supplied from the vector register control circuit 0 (FIG. 14) through the line l420. This signal is supplied to the write timing control circuit b483. The circuit b483 produces two signals of two-cycle duration at a timing shown in FIG. 19 in accordance with the even-numbered and odd-numbered write instructions. These signals are supplied to the AND gates g481 and g482, which also receive the output of the timing control circuit b482 and the inversion thereof through the inverter g480. The outputs of the AND gates g481 and g482 are supplied to the memory elements m400 and m401 as the write enable signals. The write address counter C411 is incremented by one by the incrementer b481 to point to the next address. This is controlled by the output of the OR gate g483 which ORs the outputs of the AND gates g481 and g482. Since the writing is alternately effected to the memory elements m400 and m401, the write address counter C411 may be incremented by one after the writing to both the memory elements m400 and m401. In the present embodiment, the least significant bit of the content of the write address counter is neglected to produce the write address, which is then supplied to the selectors S420 and S421. This is equally applicable to the read address counter C410. In this manner, the vector elements are alternately written in the memory elements m400 and m401. The time chart of the above operation is shown in FIG. 19. The reading from the vector register VRO is effected in the following manner. First, the signal to instruct the start of the reading from the vector register VRO is sent from the instruction start control circuit b400 through the line l400. The read address counter C410 is cleared by this signal. Since the read address counter C410 has initially been cleared to zero, the addresses are supplied to the memory elements m400 and m401 through the selectors S420 and S421 and the data at the address 0 is read and supplied to the selector S422. The inversion of the output of the timing control circuit b482 through the inverter g480 is supplied to the control terminal of the selector S422 to indicate which of the data read from the memory elements is to be selected. Thus, the output of the memory m400 is selected in the read cycle for the memory m400 and the output of the memory m401 is selected in the next cycle. The selected data is temporarily set in the register VROR r450 and then converted to the data for the resource by the G-S converter b481 and b482. If it is data to be operated on by the ALU U20, it is sent to the ALU U20 through the line l41. The data to the memory requester (data to be stored in the main memory) may be only one and only one G-S converter may be used. The circuit b481 is used for the G-S conversion in the present embodiment. Each time the vector element of the vector data is sent, the updating signal for the read address counter C410 of the vector register is supplied from the vector register control unit U40 through the line l470. Thus, the read address counter C410 is decremented by one each time. The updating is effected by returning the output of the counter C410 to the input of the counter C410 through the incrementer b480.

As described above, the vector register unit fetches the vector data to be supplied to the resource and stores the vector data sent from the resource. Since two data are to be supplied to the resource for the operation, they must be sent after both of those vector data have been received. In addition, the vector elements stored in two vector registers of arbitrary interval by the chaining must be read after both have been received. To this end, a circuit to detect if the reading is permitted or not and respective circuits for each resource for detecting if two data can be read or not are provided, and the data is read from the vecto register only when the reading is possible. (In actual practice, the data has already been read and the read address counter is updated for the next reading.)

7 MEMORY REQUESTER

Figure 20:
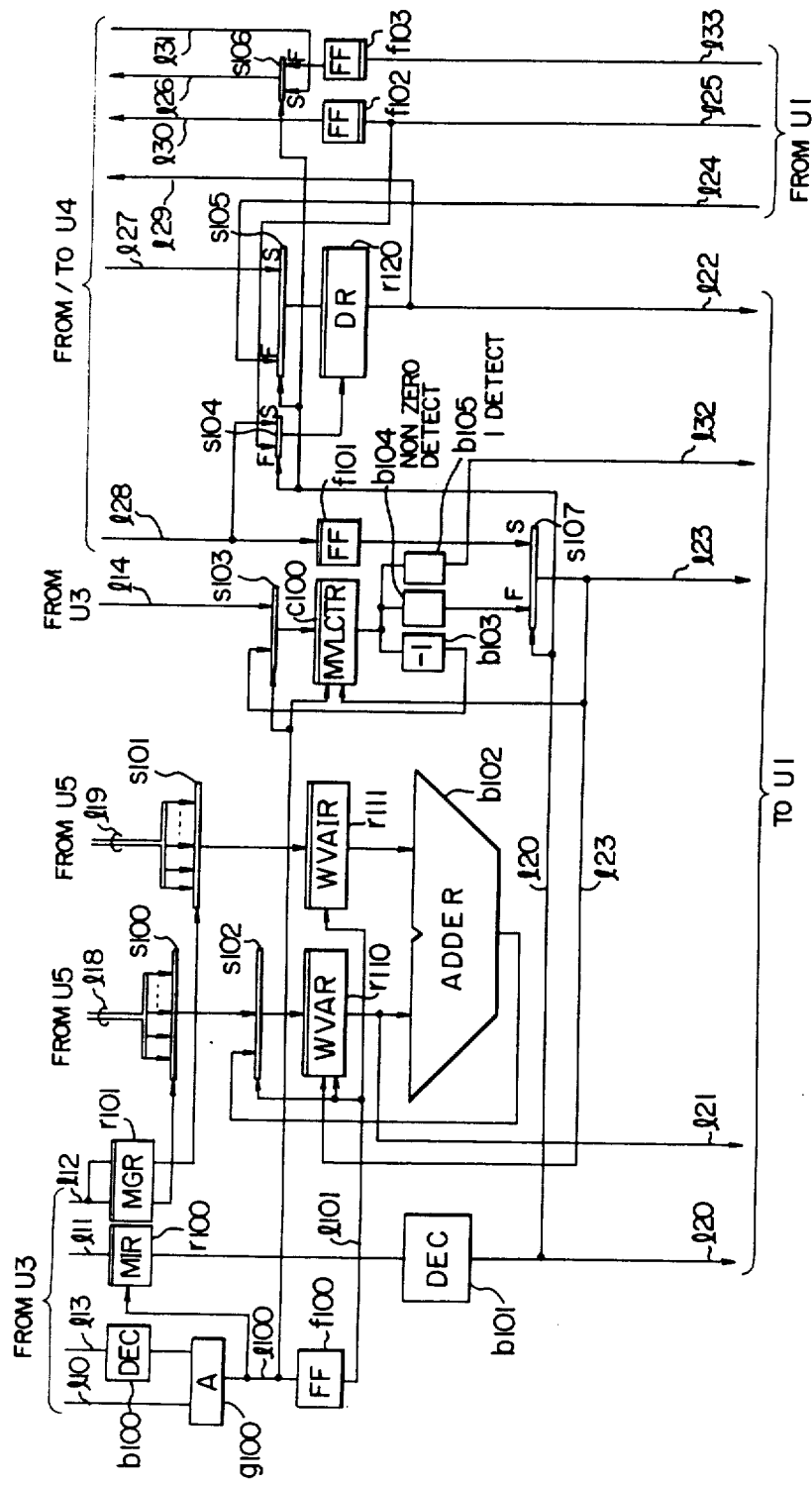
FIG. 20 shows details of a memory requester.

FIG. 20 shows a detail of the memory requester U10. The operation of the memory requester is divided into initialization at the start of the instruction, fetching from the main storage and storing in the main storage.

(i) Initialization at the start of the instruction

In FIG. 20, the I-control U3 sends the instruction start signal through the line 110, the type of resource and the resource number through the line 113, the OP code through the line 111, the register number through the line 112 and the vector length to be processed through the line 114. The type of resource and the resource number on the line 113 are decoded by the decoder b100, and if it is a request to its own memory, the decoder b100 produces a "1" output which is sent to the AND gate g100 together with the instruction start signal on the line 110 and the AND gate g100 produces a "1" output on the output line 1100. The line 1100 is supplied to the flip-flop f100 to set the flip-flop and also supplied to the set terminals of the registers MIR r100 and MGR r101 to set the OP code and the register number therein, respectively. The line 1100 is also supplied to the control terminal of the selector S103 which selects the vector length on the line 114 and sets the vector length in the vector length counter MVLCTR C100. The line 1100 is also connected to the set terminal of the MVLCTR C100. Thus, the initialization is terminated.

(ii) Fetching from the main storage

The fetching from the main storage is identified by decoding the outputs of the MIR r100 in which the OP code is set, by the decoder b101. The output line 120 of the decoder b101 is sent to the storage control unit U1 (FIG. 1) to designate either fetching or storing and it is also supplied to the control terminals of the selectors S104, S105, S106 and S107, which select the "F" inputs.

When the storing to the main storage is designated by the MIR r100, the selectors select the "S" inputs.

The outputs of the vector address register U5 and the vector address increment register U6 (FIG. 1) are supplied to the selectors S100 and S101 through the lines 118 and 119, respectively, and the contents of the vector address register U5 and the vector address increment register U6 designated by the output of the MGR r101 in which the register number is stored are selected. The vector address is set in the working vector address register WVAR r110 and the working vector address increment register WVAIR r111 through the selector S102. The setting to those registers is controlled by the output line 1101 of the flip-flop f100. The line 1101 is also connected to the control terminal of the selector S102 to select the output of the selector S100. When the vector address is set in the WVAR r110, the first vector address is sent to the storage control unit U1 (FIG. 1) through the line 121. The non-zero detection circuit b104 connected to the output of the MVLCTR C100 produces a "1" output (assuming that the vector length of no smaller than one is set in the MVLCTR) and it is sent to the storage control unit U1 by the selector S107 as the address valid signal through the line 123. The line 123 is also suppliedto the control terminal of the MVLCTR C100 to decrement the content thereof by one. The decremented output of the MVLCTR C100 is produced by the decrementer b103 connected to the output of the MVLCTR C100 and it is supplied to the MVLCTR through the selector S103. The line 123 is also supplied to the control terminal of the WVAR r110 to control the setting of a sum from the adder b102 for the contents of the WVAR r110 and the WVAIR r111 to the WVAR r110 through the selector S102. As a result, the next vector element is set in the WVAR r110. The above operation is repeated so that the vector address as well as the address valid signal (on the line 123) are sent to the storage control unit U1 through the line 121 to effect the fetching from the main storage.

After the fetching from the main storage has been completed, the storage control unit U1 returns the fetched data through the line 124 and the data valid signal through the line 125. The fetched data on the line 124 is supplied to the data register DR r120 through the selector S105 and the line 125 is supplied to the set terminal of the DR r120 through the selector S104 so that the fetched data is set in the DR r120 and the output thereof is supplied to the vector register data unit U41 (FIG. 10) through the line 129. The data valid signal on the line 125 is temporarily set in the flip-flop f102 and sent to the vector register control unit U40 through the line 130.

As the MLLCTR C100 is decremented and the content thereof reaches "1", the "1" detection circuit b105 detects the last vector element and the last vector data signal is sent to the storage control unit U1 through the line 132 together with the vector address (on the line 121) and the address valid signal (on the line 123), and it is returned through the line 133 in synchronism with the fetched data. The last vector data signal on the line 133 is temporarily set in the flip-flop f103 and sent to the vector register control unit U4 (FIG. 10) by the selector S106 through the line 126. When the content of the MVLCTR C100 reaches zero by the decrementer b103, the non-zero detection circuit b104 produces the "0" output, which stops the sending of the address valid signal. Thus, the fetching of the vector data is completed.

(iii) Storing of vector data

In storing the vector data, the signal designating the storing is first sent to the storage control unit U1 through the line 120. This signal is produced by decoding the content of the MIR r100 by the decoder b101. The sending of the main storage address for the data to be stored is same as that of the fetching operation. The designated ones of the vector address registers and the vector address increment registers are selected by the selectors S100 and S101 and set in the WVAR r110 and the WVAIR r120, respectively. The vector address is sent to the storage control unit U1 through the output line 121 of the WVAR r110, as is done in the fetching operation.

The data to be stored is sent to the vector register unit U4 through the line 127 together with the data valid signal (on the line 128). The vector data is set in the DR r120 through the selector S105. The setting to the DR r120 is controlled by supplying the data valid signal on the line 128 to the set terminal of the DR r120 through the selector S105. The data valid signal on the line 128 is also supplied to the flip-flop f101 and temporarily set therein and then the output thereof is sent to the storage control unit U1 by the selector S107 through the line 123 together with the vector data to be stored, in the DR r120. Thus, the storage control unit effects the storing in r120. The address valid signal on the line 123 is supplied to the set terminal of the WVAR r110 to update the WVAR r110 as is done in the fetching operation. In this manner, whenever the data to be stored and the data valid signal are sent from the vector register unit, the data is assigned the address and sent to the storage control unit and the WVAR r110 is updated to prepare for the next vector data storing. This operation is repeated so long as the data is sent from the vector register unit.

In the storing operation, the MVLCTR r100 operates in the same manner as the fetching operation but it has no significance. If the last vector data signal is sent to the storage control unit through the line 132, it is neglected in the storing operation.

8 ALU

Figure 21:
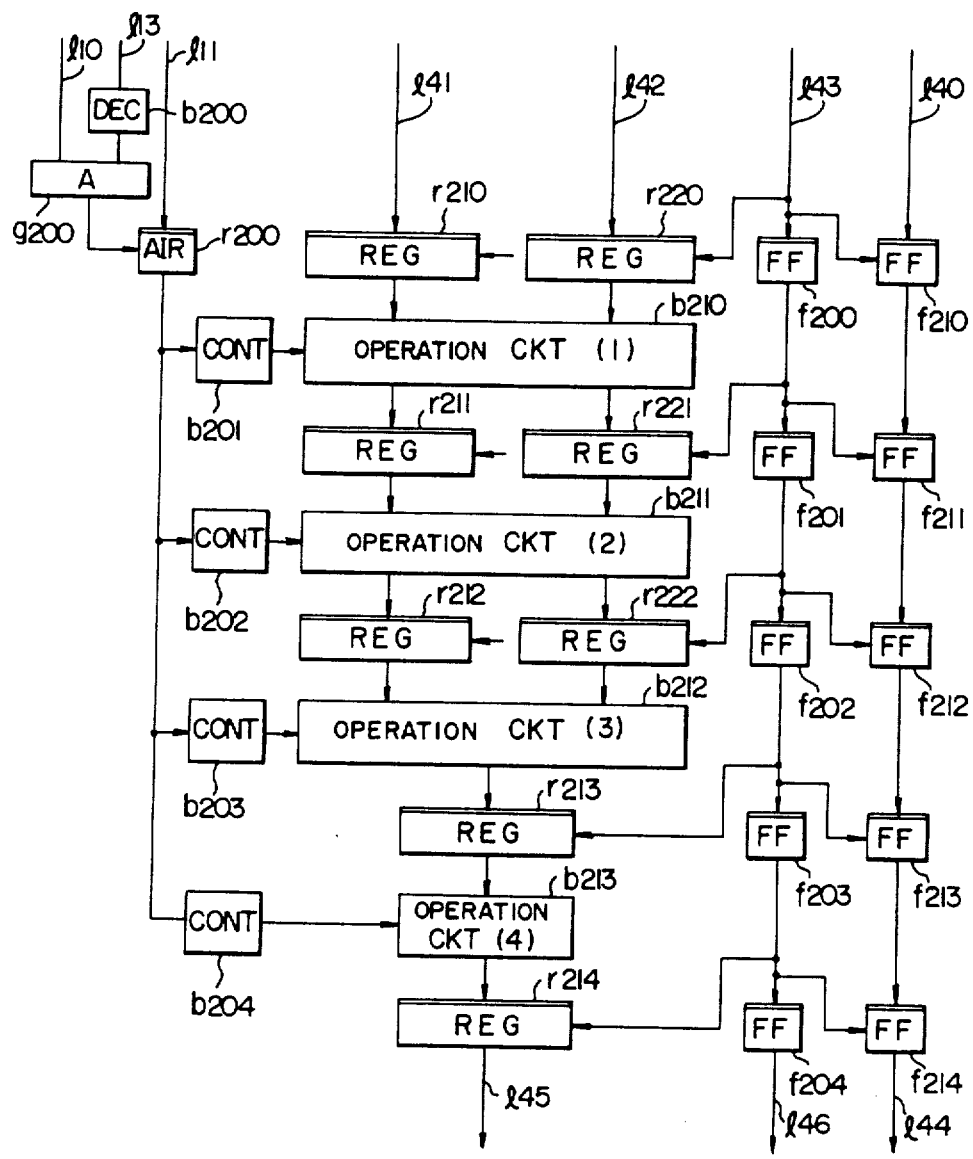
FIG. 21 shows details of an ALU.

FIG. 21 shows a general construction of the ALU U20. The ALU U21 is of the same construction. In the present embodiment, the ALU circuits b210–b213 carry out partial operations on the respective inputs under the control of the operation control circuits b201–b204, as is well known in the art. It is assumed here that the pipeline operation is carried out in four stages, although the number of stages is not restrictive. The ALU's U20 and U21 can carry out various operations designated by the instructions. In the present embodiment, when the vector data as the input operand and the data valid signal are supplied, it is operated in the pipeline stages and the resulting vecto data and the data valid signal are produced in synchronism, and when the last vector data signal is supplied, this signal is also produced in synchronism with the data valid signal.

The general operation is described below.

The instruction start signal is supplied to the AND gate g200 from the I-control U3 through the line 110, and the type of resource and the resource number are supplied to the decoder b200 through the line 113, and the OP code is supplied to the register r200 through the line 111. The output of the decoder b200 is "1" when the input thereto designates the ALU of its own and it instructs the setting of the OP code on the line 111 in the register AIR r200 through the AND gate g200. The output of the AIR r200 is supplied to the operation control circuits b201-b204 which control the operations of the ALU circits b210-b213 in the respective stages.

On the other hand, when the vector register unit supplies the vector data to be operated on through the lines 141 and 142 and the data valid signal through the line 143, the vector data is set in the registers r210 and r220 and the data valid signal is set in the flip-flop f200. The data valid signal (on the line 143) is used as the set signal for the registers r210 and r220. The contents in the registers r210 and r220 are operated in the ALU circuit b210 and the interium result is set in the registers r211 and r221 in the next cycle. The setting of data into the registers is controlled by the output of the flip-flop f200 and the output thereof is also supplied to the flip-flop f210. Similarly, the outputs of the registers r211 and r212 are supplied to the ALU circuit b211 and operated thereby, and the interium result is set in the registers r212 and r213 in the next cycle. In synchronism therewith, the output of the flip-flop f201 is transferred to the flip-flop f202. The above operation is repeated so that the operation proceeds as the data is moved through the ALU circuit b212, the register r213 and the ALU circuit b213, and the final result is set in the register r214. The data valid signal is also transferred through the flip-flops f202, f203 and f204. The operation result and the data valid signal therefor are returned to the vector register unit through the lines 145 and 146, respectively.

When the data to be operated on has been transferred from the registers r210 and r220 to the registers r211 and r221, the data to be next operated on is set in the registers r210 and r220 as is done in the conventional pipeline ALU.

When the last vector data signal is supplied to the flip-flop f210 through the line 140, it is set in the flip-flop 210. In synchronism with the transfer of the data valid signal through the flip-flops f200-f204, the last vector data signal is transferred through the flip-flops f210-f214 to the line 144, thence returned to the vector register unit U4.

As described hereinabove, the ALU of the present invention receives the vector data and the data valid signal in synchronism, operates on the data in synchronism with the transfer of the data valid signal through the pipeline stage, and produces the result in synchronism with the data valid signal. The same is equally applicable to the last vector data signal.

SUMMARY

As described hereinabove, the present invention attains the following functions which have not been attainable by the prior art vector processor and hence provide a vector processor of a higher performance.

(1) At the start of the instruction, it is necessary to check only the non-busy status of the resources such as the ALU's and the memory requesters, and the vector registers which are necessary to execute the instruction, and it is not necessary to check to see if all of the data necessary for the execution of the instruction has been received. Accordingly, the control for the instruction start is simplified.

(2) The instruction queue which can store a plurality of decoded instructions is provided and the circuit for modifying the order of the instruction execution in accordance with the non-busy status of the ALU's and the memory requesters so that no logical confliction occurs is provided. Therefore, the ALU's and the memory requesters can be effectively utilized.

(3) The vector registers are arranged to permit the writing and the reading for the different addresses in each cycle to allow discontinuous writing to the vector registers, and chaining is permitted so that the reading can be started at any time wherever the write address is and the vector elements are read without passing the write address.

(4) In the reading (including chaining) of the vector register which supplies the vector data as the operand to the ALU or the memory requester, the vector data of all of the necessary operands are synchronized and all vector elements necessary for the operation are supplied to the ALU or the memory requester after all of them have become available.

What is claimed is:

1. A vector data processor comprising:
a main storage;
vector storage means connected to receive vector elements from said main storage and including a plurality of storage area for holding a plurality of vector elements, each storage area being selected by an instruction, being capable of holding a number of vector elements and being capable of reading and writing in parallel;
a plurality of resource means connected to said storage means each for sequentially receiving vector elements from said vector storage means and/or for sequentially providing vector elements to said vector storage means, including, as one of said plurality of resource means, at least one operation means connected to said vector storage means for performing an operation on inputs provided sequentially to said operation means from said vector storage means in such a manner as to provide sequential outputs corresponding to the results of said operation to said vector storage means;
instruction means connected to said main storage for decoding instructions fetched from said main storage, for selecting one of said plurality of resource means required by each instruction and for indicating the start of execution for the decoded instructions, said instruction means including means for indicating, irrespective of execution start indication timing of a previously-execution-started first instruction, the execution start of a second instruction which selects the same storage area of said vector storage means for reading of vector elements therefrom as one selected by said first instruction for writing of vector elements therein;
control means connected to said instruction means and said plurality of resource means and responsive to indication of start of execution of a decoded instruction for sequentially reading vector elements out of one of the storage areas of said vector storage means selected by said decoded instruction to provide the read out vector elemtns to one of said plurality of resource means selected for said decoded instruction to be received thereby and/or for sequentially writing vector elements provided from the resource means selected for the decoded instruction into one of the storage areas of said vector storage means selected by said decoded instruction, said control means being capable of responding to the indication of start of execution of the second instruction given by said instruction means before completion of writing of vector elements provided from the first resource means selected for the first instruction into said same selected storage area performed in response to the indication of start of execution of the first instruction, and being capable of starting the sequential reading of the written vector elements out of said same selected storage area from before all the vector elements are written by controlling a read operation of each vector element depending upon whether or not each vector element is already written when each vector element is to be read next, to sequentially provide the read out vector elements to a second one of said plurality of resource means selected for said second instruction.

2. A vector data processor according to claim 1,
wherein said first resource means is operable to intermittently provide vector elements to said vector storage means;
wherein said control means is operable to intermittently write vector elements into said same selected storage area when the vector elements are provided intermittently by said first resource means and to begin intermittently reading the written vector elements out of said same selected storage area from before all the vector elements are written, to provide the read out vector elements to said second resource means; and
wherein said second resource means is operable to intermittently receive the vector elements when intermittently provided from said vector storage means.

3. A vector day processor according to claim 2,
wherein said first resource means is said operation means and said operation means is capable of intermittently providing outputs corresponding to the results of the operation when inputs are provided intermittently thereto;
wherein said first instruction further selects a first storage area of said vector storage means for reading of vector elements therefrom; and
wherein said control means is operable to intermittently read vector elements out of said first storage area to provide the read out vector elements to said operation means and operable to intermittently write into the same selected storage area vector elements provided intermittently by said operation means as the results of the operation on the vector elements intermittently read out of said first selected storage area.

4. A vector data processor according to claim 3, wherein said control means is operable to intermittently read the vector elements out of said first selected storage area in such a manner that a read operation for a vector element to be read out next is not done when the next vector element is present in the first selected storage area.

5. A vector data processor according to claim 4,
wherein said first instruction further selects a second storage area of said vector storage area for reading of vector elements; and
wherein said control means is further operable to sequentially read pairs of vector elements so that one vector element and the other vector element of each pair are respectively read out of said first and second selected storage areas, and further operable to read the pairs intermittently so that a read operation of a pair of vector elements to be read next is not done when either element of the next pair of vector elements is not present in either one of the first and second storage areas.

6. A vector data processor according to claim 5, wherein said control means includes first detect means responsive to the first instruction for detecting whether or not the next pair of vector elements already exist one in said first selected storage area and the other in said second selected storage area, to provide a read request to both the first and second storage selected areas when the detection result is affirmative.

7. A vector day processor according to claim 6, wherein said control means further includes second detect means responsive to the second instruction for detecting whether or not a vector element to be read next is already written in said same selected storage area, to provide a read request to said same selected storage area when the detection result by said second detect means is affirmative.

8. A vector data processor according to claim 4, wherein said control means includes detect means responsive to the first instruction for detecting whether or not the next vector element is already written in said first selected storage area, to provide a read request to the first selected storage area for the next vector element when the detection result is affirmative.

9. A vector data processor according to claim 3, wherein said second resource means is memory requestor means capable of intermittently receiving vector elements read out intermittently from said vector storage means and providing the received vector elements to said main storage to be stored therein.

10. A vector data processor according to claim 3, wherein said second resource means is another operation means for performing an operation on vector elements intermittently read out of said vector storage means to intermittently provide vector elements corresponding to the results of the operation.

11. A vector data processor according to claim 2,
wherein said second resource means is said operation means and said operation means is operable to intermittently provide outputs corresponding to the results of said operation when inputs are provided intermittently thereto;
wherein said second instruction further selects a first storage area of said vector storage means for writing of vector elements therein provided by said operation means; and
wherein said control means is further operable to intermittently write vector elements provided by said operation means into said first selected storage area when said vector elements are provided intermittently by said one operation means as the results of said operation on vector elements intermittently read out of said same selected storage area.

12. A vector data processor according to claim 11,
wherein said second instruction further selects a second storage area of said vector storage means for reading of vector elements; and
wherein said control means is further operable to intermittently read pairs of vector elements so that one vector element and the other vector element of each pair are respectively read out of said same and second selected storage areas, when vector elements to be read out of said same selected storage area are written intermittently therein.

13. A vector data procesor according to claim 12, wherein said control means is further operable to intermittently read said pairs of vector elements from said same and second selected storage areas in such a manner that a read operation of a pair of vector elements to be read out next is not done when either one vector element of the next pair of vector elements is not present in either one of the same and third selected storage areas.

14. A vector data processor according to claim 13, wherein said control means includes detect means responsive to the second instruction for detecting whether or not the next pair of vector elements already exist with one vector element of the next pair in said same selected storage area and with the other vector element in said second selected storage area to provide a read request to both said same and second selected storage areas when the detection result is affirmative.

15. A vector data processor according to claim 11, wherein said first resource means comprises memory requestor means connected to said main storage and said vector storage means for intermittently fetching vector elements from said main storage to intermittently provide the fetched vector elements to said vector storage means.

16. A vector data processor according to claim 2, wherein each of resource means capable of providing vector elements to said vector storage means among said plurality of resource means includes means for providing said control means with write-data-valid signals in synchronism with the vector elements provided therefrom;
wherein each of resource means capable of receiving vector elements read out from said vector storage means among said plurality of resource means includes means for receiving the read out vector elements in response to read-data-valid signals applied from said control means in synchronism with supply of the read out vector elements;
wherein said control means includes first means connected to said plurality of resource means and said vector storage means and responsive to an instruction which requires resource means capable of providing vector elements to said vector storage means and selects a storage araa of said vector storage means to write therein the vector elements provided from said required resource means for selectively writing the vector elements into the storage area in reponse to write-data-valid signals provided from said required resource means; and
second means connected to said plurality of resource means and said vector storage means, and responsive to an instruction which requires resource means, capable of receiving vector elements from said vector storage means and selects a storage area to read vector elements therefrom for detecting whether or not a vector element to be read out next is already written in the storage area, for reading the next vector element from the storage area when the detection result is affirmative and for providing a read-data-valid signal to said resource means required by the instruction.

17. A vector data processor according to claim 16, wherein said second means includes detect means for detecting whether or not the next vector element is already written depending upon difference between a total number of vector elements already written and a total number of vector elements already read out.

18. A vector data processor according to claim 17, further including:
a plurality of count means each provided for a corresponding one of said vector registers and each responsive to write-data-valid signals provided from resource means selected by an instruction which selects each vector register to write vector elements therein for providing a written-vector-element number indicative of a total number of vector elements already written in each vector register, wherein said detect means includes means for performing the detection based upon a written-vector-element number provided from said count means corresponding to a vector register selected by an instruction and a total number of read requests provided by said detect means to the selected vector register.

19. A vector data processor according to claim 18, wherein said detect means includes a plurality of detect means each provided for a corresponding one of plural resource means capable of receiving vector elements from said vector storage means;
wherein said control means includes: first transfer means connected to said plurality of count means and said plurality of detect means and responsive to an instruction for selectively transferring written-vector-element number signal from one of said plurality of count means corresponding to a vector register selected by the instruction to one of said plurality of detect means corresponding to resource means required by the instruction;
second transfer means connected to said plurality of detect means and said plurality of vector registers and responsive to the instruction for transferring a read request provided by said corresponding detect means to said corresponding vector register; and
means connected to said plurality of detect means for generating and providing a read-data-valid signal to said required resource means in response to a read request provided by said detect means corresponding to said required resource means;
wherein said first means includes third transfer means connected to plural resource means capable to providing vector elements to said vector storage means and said plurality of count means and responsive to an instruction which requires on of said plural resource means for selectively transferring write-data-valid signals provided from resource means selected by the instruction to said count means corresponding to a vector register selected by the instruction.

20. A vector data process according to claim 16, wherein said operation means includes:
means connected to said control means for performing the operation on inputs thereto in a pipeline manner; and
means connected to said control means for delaying read-data-valid signals supplied from said control means by a time period which is proportional to the time period required by the operation and for providing the delayed read-data-valid signals as read-data-valid signals.

21. A vector data processor according to claim 20, wherein said plurality of resource means includes at least one memory requestor means connected to said main storage, said vector storage means and said control means and responsive to a first kind of instruction for reading vector elements from said main storage to provide the vector elements to said storage means and responsive to a second kind of instruction for receiving vector elements read out of said vector storage means to write the vector elements into said main storage, said memory requestor means including means responsive to the first kind of instruction for providing write-datavalid signals to said control means in synchronism with supply of the vector elements fetched from said main storage and responsive to the second kind of instruction for receiving the vector elements supplied from said vector storage means to response to read-data-valid signals supplied from said control means.

22. A vector data processor according to claim 20, wherein said plurality of resource means includes:

first memory requestor means connected to said main storage, said vector storage means, and said control means and responsive to a first kind of instruction for reading vector elements from said main storage to provide the vector elements to said vector storage means, said first memory requestor means including means for providing write-data-valid signals to said control means in synchronism with provision of the vector elements to said vector storage means; and second memory requestor means connected to said main storage, said vector storage means and said control means and responsive to a second kind of instruction for receiving vector elements read out of said vector storage means to write the vector elements into said main storage, said second memory requestor means including means for receiving the vector elements in response to read-data-valid signals supplied from said control means.

23. A vector data processor according to claim 16, wherein said control means includes a plurality of pairs of a read counter and a write counter each pair being connected to a corresponding one of said storage areas, said read counter and said write counter of each pair respectively indicating read addresses and write addresses for a corresponding storage area, wherein said plurality of storage areas of said vector storage means being accessible independently from each other, wherein said first means includes means responsive to the instruction which requires resource means capable of providing vector elements to said vector elements and selects a storage area of said vector storage means to write the vector elements therein for selectively transferring write-data-valid signals provided from said required resource means to said write counter provided for said selected storage area;

wherein said second means includes means responsive to the instruction which requires resource means capable of receiving vector elements from said vector storage means and selects a storage area to read and provide the vector elements therefrom providing the read requests to said read counter of the selected storage area.

24. A vector data processor according to claim 2, wherein said control means included means responsive to the second instruction for detecting whether or not a vector element to be read out next is already written in said same selected storage area to provide a read request to said same selected storage area for the next vector element when the result of the detection is affirmative.

25. A vector data processor according to claim 24, wherein said detection for the first one of the vector elements to be read out is done after indication of start of execution of the second instruction.

26. A vector data processor according to claim 1, wherein said instruction means includes:

first indicating means for indicating read and write usuage status of said respective storage areas of said vector storage means to control the indication of execution start of a decoded intruction by said instruction means; and second indicating means for indicating usage status of said respective resource means to prohibit the indication of execution start of a decoded instruction by said instruction means when resource means required by the decoded instruction is in use.

27. A vector data processor according to claim 26, wherein said control means includes a plurality of vector length means each operable in connection with one resource means selected for an execution-start-indicated instruction each for counting a number of vector elements received and processed by said one resource means or provided by said one resource means and each generating an end signal at a time when the counted number amounts to a predetermined number, to change the usage status indicated by said first and second indicating means based upon the end signal.

28. A vector data processor according to claim 27, wherein said plurality of resource means includes at least one resource means which is capable of intermittently receiving vector elements from and or intermittently providing vector elements to said vector storage means; and wherein said plurality of vector length means includes at least one vector length means which is operable in connection with said one resource means to count a number of the vector elements intermittently received or intermittently provided by said one resource means.

29. A vector data processor according to claim 28, wherein said one resource means is capable of intermittently receiving vector elements read out of said vector storage means intermittently;

wherein said control means includes detect means responsive to an execution start indicated instruction which requires said one resource means for detecting whether or not a vector element to be read out next from a storage area of said vector storage means selected for the execution-start-indicated instruction is already stored in said selected storage area, and providing a read request to said selected storage area when the detection result is affirmative; and wherein said one vector length means includes means for counting the read requests provided by said detect means to count a number of vector elements read out from said selected storage area to said one resource means.

30. A vector data processor according to claim 29, wherein said one vector length means includes:

means connected to said counting means for generating a first end signal when a last vector element of a predetermined number of vector elements is read out of the vector storage means;

means responsive to the first end signal for generating a second end signal at a timing when the last vector element is received and processed by said one resource means; and means responsive to the first and second end signals for changing read usage status and resource usage status respectively indicated by said first and second indicating means respectively based upon said first and second end signals.

31. A vector data processor according to claim 28, wherein said one resource means is said one operation means and said one operation means is capable of intermittently receiving vector elements provided intermittently from said vector storage means and intermittently providing said vector storage means with vector elements corresponding to the results of the operation on said intermittently received vector elements;
  wherein said control means includes detect means responsive to an execution start indicated instruction which selects the operation means for detecting whether or not a vector element to be read out next from a storage area of said vector storage means selected by the instruction is already stored therein, and providing a read request to said selected storage area when the detection result is affirmative; and
  wherein said one vector length means includes means connected to said detect means for counting the read request provided to said detect means to detect a number of vector elements read out of said selected storage area.

32. A vector data processor according to claim 31, wherein said one vector length means includes:
  means connected to said counting means for generating a first end signal when the counted number amounts to a predetermined number;
  means responsive to the first end signal for generating a second end signal at a time when said one operation means generates a last result vector element corresponding to the result of the operation on the last vector element corresponding to the predetermined number among the vector elements read out of said selected storage area;
  means responsive to the second end signal for generating a third end signal at a time when the last result vector element is written into vector storage means; and
  means responsive to said first to third end signals for changing the read usage status of said vector storage means, the write usage status of said vector storage means both indicated by said first indicating means, and resource usage status indicated by said second indicating means respectively based upon the first, third and second end signals.

33. A vector data processor according to claim 28, wherein said one resource means is capable of intermittently providing vector elements to said vector storage means; and
  wherein said one vector length means includes:
  means for counting a total number of vector elements provided from said one resource means;
  means connected to said counting means for generating a first end signal at a time when a last vector element of a predetermined number of vector elements is provided by said one resource means;
  means responsive to the first end signal for generating a second end signal at a time when the last vector element is written into the selected storage area of said vector storage means; and
  means responsive to the first and second end signals for changing write usage of said vector storage means and resource usage status respectively indicated by said first and second indicating means based upon the first and second end signals, respectively.

34. A vector data processor according to claim 1, further comprising:
  first indicating means connected to said control means for indicating read and write usage status of respective storage areas of said vector storage means; and
  wherein said instruction means includes;
  decode means connected to said main storage for decoding instructions fetched therefrom;
  start control means connected to said first indicating means and said decode means for detecting whether or not a storage area of said vector storage means selected by a decoded instruction is available for use, based upon read and write usage status inidcated by said first indicating means for said selected storage area and for indicating execution-start of the decoded instruction when the selected storage area is available for use, under a condition that a storage area which is in use for writing of vector elements by a previously-execution-start-indicated instruction is available for use for reading of vector elements by the decoded instruction, said start control means indicating execution start of the decoded instruction irrespective of execution-start-indicated instruction.

35. A vector data processor according to claim 34, further including:
  second indicating means connected to said plurality of resource means for indicating usage status of respective resource means;
  means connected to said second indicating means and said start control means for prohibiting execution-start-indication of a decoded instruction by said start control means when said second indicating means indicates that resource means required by the decoded instruction is in use by a previously-execution-start-indicated instruction.

36. A vector data processor according to claim 35, further including:
  first change means connected to said second indicating means and said start control means and responsive to execution-start-indication of a decoded instruction by said start control means for changing usage status of the resource means required by the decoded instruction indicating by said second indicating means from non-use state to use-status; and
  second change means connected to said plurality of resource means for changing resource usage status of said resource means required by the decoded instruction from use-status to non-use status in synchronism with completion of receiving and/or completion of providing of a predesignated number of vector elements by said resource means.

37. A vector data processor according to claim 36, wherein said second change means includes:
  a plurality of count means each operable in connection with a corresponding resource means each for counting a total number of vector elements received from or provided to said vector storage means by the corresponding resource means and for generating an end signal when the counted number amounts to a predetermined number; and
  means connected to said plurality of count means and said second indicating means for changing usage status indication of respective resource means from use-status to non-use status in response to end signals respectively provided from respective resource means.

38. A vector data processor according to claim 34, further including:
  first change means connected to said first indicating means and said start control means and responsive to execution-start-indication of a decoded instruction by said start control means for changing read usage status of a first storage area selected by the decoded instruction for reading of vector elements from non-use status to use-status and/or for changing write usage status of a second storage area selected by the decoded instruction for writing of vector elements from non-use status to use status; and second change means connected to said first indicating means, said start control means, and said control means and responsive to the execution-start-indication of the decoded instruction for changing indication of read usage status by said first indicating means for said first storage area from use-status to non-use status in synchronism with completion of reading of a predetermined number of vector elements by said control means from said first storage area and/or for changing indication of write usage status by said first indicating means for said second storage area from use-status to non-use status in synchronism with completion of writing of a predetermined number of vector elements by said control means from said second storage area.

39. A vector data processor, according to claim 35, wherein said control means includes:

detect means connected to said vector storage means and responsive to an execution-start-indicated instruction which selects a storage area of said vector storage means for readout of vector elements for detecting whether or not a vector element to be read out from said selected storage area is already written therein and for providing a read request to said selected storage area when the detection result is affirmative; wherein said second change means includes:

means connected to said detect means for counting a total number of read requests provided by said detect means and for changing read usage status indication by said first indicating means for said selected storage area when the counted total number amounts to a predetermined number.

40. A vector data processor according to claim 1, wherein said control means is operable to read the written vector elements from the same selected storage area while the vector elements are being written and from a timing which is dependent upon both a write timing of one of the vector elements written first as a result of execution of the first instruction and the indiction timing of start of execution of the second intruction.

41. A vector data processor according to claim 40, wherein said control means is operable to start reading of the vector elements from said same selected storage area as soon as the first one of the vector elements are written therein, when the start of execution of the second instruction is indicated by said instruction means before the first vector element is written into said same selected storage area as a result of execution of the first instruction.

42. A vector data processor according to claim 40, wherein said control means is operable to start reading of the vector elements from said same selected storage area as soon as the start of execution of the second instruction is indicated by said instruction means when the execution start of the second instruction is idicated after one or plural vector elements are already written into said same selected storage area as a result of the execution of the first instruction.

43. A vector data processor according to claim 1, wherein said plurality of resource means includes at least one memory requestor means connected to said main storage for sequentially fetching vector elements from said main storage, to sequentially provide the fetched vector elements to said vector storage means.

44. A vector data processor according to claim 1, wherein said plurality of resource means includes at least one memory requestor means connected to said main storage for sequentially receiving vector elements provided from said vector storage means and sequentially providing said received vector elements to said main storage to be stored therein.

45. A vector data processor comprising:

a main storage;

vector storage means including a plurality of storage areas, for holding a plurality of vector elements, each storage area being selected by an instruction, being capable of holding a number of vector elements and capable of writing and reading in parallel;

at least one first memory requestor means connected to said main storage and responsive to a first kind of instruction for sequentially fetching and providing vector elements from said main storage to said vector storage means, said first memory requestor means being capable of fetching and providing the vector elements intermittently;

at least one operation means connected to said vector storage means and responsive to a second kind of instruction for performing an operation on vector elementsread out sequentially from said vector storage means and sequentially providing result vector elements to said vector storage means as the results of the operation, said operation means being capable of performing the operation on intermittently provided vector elements and capable of providing the result vector elements intermittently;

at least one second memory requestor means connected to said main storage and responsvie to a third kind of instruction for sequentially storing vector elements provided from said vector storage means into said main storage, said second memory requestor means being capable of providing the vector elements intermittently to said main storage;

first control means connected to said vector storage means and responsive to the first kind of instruction for sequentially writing the vector elements fetched by said first memory requestor means into a first storage area of said vector storage means selected by said first kind of instruction, said first control means being capable of inermittently writing the fetched vector elements into said first storage area when the vector elements are fetched intermittently from said main storage by said first memory requrestor means;

second control means connected to said vector storage means and responsive to the second kind of instruction for sequentially reading operand vector elements from a second storage area of said vector storage means selected by the second kind of instruction, providing the operand vector elements to said operation means, writing result vector elements provided by said operation means into a third storage area selected by the second instruction, said second control means being capable of intermittently reading the operand vector elements from said second storage area whn said operand vector elements are being stored intermittently into said second storage area so that a respective operand vector element is read out of said second storage area after the respective operand vector element is stored therein, and being capable of intermittently writing the result vector elements into said third vector storage area when said operation means provides intermittently the result vecotr elements;

third control means connected to said vector storage means and responsive to the third instruction for sequentially reading vector elements from a fourth storage area said vector storage means selected by the third instruction and providing the read out vector elements to said second memory requestor means, said third control means being capable of intermittently reading the vector elements from said fourth storage area, when said vector elements are being stored in said fourth storage area intermittently so that a respective vector element is read out of said fourth storage area after the respective vector element is stored therein; and instruction means connected to said main storage and said first to third control means for decoding instructions fetched from said main storage, for selecting one of said plurality of resource means required by each instruction and for indicating a start of execution of decoded instructions to said first to third control means, said instruction means being capable of indicating start of execution of a decoded instruction irrespective of execution start indication timing of a previously execution-start-indicated instruction, even when a storage area of said vector storage means selceted by the decoded instruction for reading of vector elements therefrom is in use for writing of vector elements therein for a previously execution-started instruction.

46. A vector data processor according to claim 45, wherein said first and second memory requestor means includes in common:

address generator means for sequentially generating addresses of said main storage;

means responsive to the first kind of instruction for activating said address generator means so as to sequentially provide the generated addresses to said main storage as fetch addresses of vector elements, and responsive to the third kind of instruction for activating said address generator means so as to sequentially provide the generated addresses to said main storage as store addresses of vector elements.

47. A vector data processor comprising:

a main storage;

vector storage means connected to receive vector elements from said main storage and including a plurality of storage areas for holding a plurlity of vector elements, each storage area being capable of holding a number of vector elements and capable of reading and writing in parallel;

a plurality of operation means each connected to said vector storage means performing an operation on inputs sequentially provided to said operation means in such a manner as to provide sequential outputs corresponding to the results of said operation on the inputs in parallel to receiving new inputs;

first indicating means for indicating read usage status and write usage status of the respective storage areas of said vector storage means;

second indicating means for indicating usage status of said plurality of operation means;

instruction means connected to said main storage, said first and second indicating means for decoding intructions fetched from said main storage and for indicating execution start of each instruction based upon indication by said first and second indicating means, in such a manner as to indicate start of execution of a decoded instruction even when a storage area of said vector storage means selected by a decoded instruction as an operand storage area which is required for read out of vector elements therefrom is in use as a result storage area for writing of vector elements therein for a previously execution-started instruction, so long as operation means required for the decoded instruction is available for use;

a plurlaity of write respectively connected to a respective storage area of said vector storage means for sequentially writing vector elements therein provided from one of said plurality of operation means;

a plurality of read means respectively connected to a respective storage area of said vector storage means for sequentially reading vector elements therefrom, respective read means being operable in parallel to respective write means connected to the same storage area;

a plurality of detect means each operable in connection with a respective storage area of said vector storage means and when the respective storage area is selected by an execution-started instruction and responsive to read and write operations of said respective storage area by one of said plurality of write means and one of said plurality of read means both connected to said respective selective storage area for detecting whether or not a vector element to be read out next is already stored in said respective storage area;

a plurality of read request means each provided in correspondence to respective operation means and each connected to said plurality of detect means and said plurality of read means to respond to an affirmative detection result provided by one of said plurality of detect means operable in connection with a storage area selected as an operand storage area to said respective operation means for an execution-started instruction for generating a read request to provide the read request to one of said plurality of read means connected to said selected operand storage area;

a plurality of write request means each connected to said plurality of write means to respond to a read request generated by corresponding read request means for generating a write request in synchronism with generation of a result vector elements by corresponding operation means, to provide the write request to one of said plurality of write means connected to a storage area of said vector storage means selected by an execution-started instruction as a result storage area for the respective operation means;

a plurality of vector length means each connected to respective read request means and responsive to indication of start of execution of a decoded instruction for counting a number of read request generated by said respective read request means and generating an end signal when the counted value amounts to a predetermined value; and means connected to said plurality of vector length means and responsive to the end signal generated by one of said plurality of vector length means for changing usage indication by said first and second indicating means.

48. A vector data processor according to claim 47, further comprising:

first path select means responsive to an execution-started instruction for selectively connecting one of said plurality of detect means which is operable in connection with a first storage area selected by the execution-started instruction to one of said plurality of read request means which corresponds to an operation means selected for said execution-started instruction for transfer of read requests from said one read request means to said one detect means;

second path select means responsive to the execution-started instruction for selectively connecting one of said plurality of read request means which is provided in correspondence to said selected operation means to one of said pluralty of read means which is connected to a second storage area of said vector storage means which is slected by said execution-started instruction as a result storage area, for transfer of read requests from said one read request means to said one read means;

third path select means responsive to the execution-started instruction for selectively connecting one of said plurality of write request means to one of said plurality of write means which is connected to said second storage area for transfer of write requests from said write request means to said one write means;

fourth path select means responsive to the excution-started instruction for selectively connecting said first and second storage areas to said selected operation means respectively for transfer of operand vector elements read out of said first storage area to said selected operation means and for transfer of result vector elements provided by said selected operation means to said second storage area.

49. A vector data processor, according to claim 47, wherein said changing means includes a plurality of first means each connected to respond to an end signal of respective vector length means for generating a first signal at a timing when a last result vector element is generated by said respective operation means;

a plurality of second means each connected to respond to the first signal generated by respective first means for generating a second signal at a timing when the last result vector element is written into a respective storage area selected as a result storage area; and means responsive to the end signal for changing read usage status indicated by said first indicating means of one of said plurality of storage areas which is selected by an execution-started instruction as an operand storage area, responsive to the first signal for changing usage status indicated by the second indicating means of operation means selected by an execution-started instruction, and responsive to the second signal for changing write usage status indicated by said first indicating means of a storage area selecting by an execution-started instruction as a result storage area.

50. A vector data processor comprising:

a main storage;

vector storage means connected to receive vector elements from said main storage and including a plurality of storage areas, for holding a plurality of sets of vector elements, each set being held in a respective one of said storage areas;

a plurality of different kinds of resource means connected to said vector storage means each for sequentially receiving vector elements from said vector storage means and/or sequentially providing said vector storage means with vector elements, including at least one kind of plural resource means as part of said plurality of resource means;

first indicating means for indicating usage status of the respective storage areas of said vector storage means;

second indicating means for indicating usage status of the respective resource means belonging to each kind of resource means;

instruction means connected to said main storage and said first and second indicating means for decoding instructions fetched from said main storage, for detecting a resource kind of resource means required by each instruction and indicating start of execution of a decoded instruction when a storage area of aaid vector storage means selected by the decoded instruction is available for use and at the same time at least one resource means in available for use among one or plural resource means belonging to the same kind as the detected resource kind of resource means required by the decoded instruction;

control means connected to said vector storage means, said plurality of different kinds of resource means and said instruction means to respond to said execution-started instruction for sequentially reading vector elements from one of said plurality of storage area selected by the execution-started instruction and providing the read out vector elements to said one availabe resource means to be processed thereby and/or for sequentially writing vector elements provided by said one available resource means into one of said plurality of storage areas.

51. A vector data processor according to claim 50, where said one kind of plural resource means includes plural memory requestor means each for sequentially fetching vector elements from said main storage or sequentially storing vector elements into said main storage.

52. A vector data processor, according to claim 50, wherein said one kind of plural resource means includes a plurality of arithmetic or logical operation means each for performing an operation on vector elements sequentially provided thereto and sequentially providing vector elements as the results of the operation.

53. A data processor comprising:

a main storage;

data storage means connected to said main storage for data transfer from or to said main storage including a plurality of data storage area for holding data, each data storage area being capable of being designated by program instruction;

resource means connected to said data storage means including a plurality of resources for receiving datafrom said data storage means and/or for providing data to said data storage means;

decode means connected to said main storage for sequentially decoding program instructions fetched from said main storage and for selecting one of said resources required by each instruction;

instruction holding means connected to said decode means and capable of holding a plurlity of decoded instructions at different storage locations;

detect means connected to said instruction holding means for dectecting at least one executable decode instruction in said instruction holding means, wherein said executable instruction is an instruction which satifies both a firt condition that a resource and one or plural data storage areas both required by said one decoded instruction are available for use and a second condition that there is no conflict of a data storage area with respect to one or plural decoded instructions decoded earlier than said one decoded instruction among decoded instruction held by said intruction holding means, when the one decoded instruction is not the least recently decoded instruction among said decoded instructions held by said instructuion holding means;

start control means connected to said instruction holding means and said detect means and responsive to said detection result by said detect means for indicating execution start of the executable decoded instruction among the decoded instruction held by said instruction holding means in such a manner as to allow execution start of said executable decoded instruction detected by said detect means in advance of said earlier decoded instructions; and execution control means connected to said data storage means, said resource means and, said start control means responsive to the execution-start-indication of a program instruction provided by said start control means for reading data from a data storage area designated by the execution started program instruction to provide the read data to a resource required by the execution started program instruction and/or providing data from a resource designated by the execution started program instruction to write the provided data into a data storage area designated by the execution started program instruction.

54. A data processor according to claim 53, wherein said detect means includes a plurality of detect means connected to said instruction holding means each for detecting whether or not a decoded instruction stored in a corresponding storage located of said instruction holding means is executable.

55. A data processor according to claim 54, wherein the number of said plurality of detect means is less than the maximum number of instructions which can be held by said instruction holding means.

56. A data processor according to claim 55, wherein one of said plurality of detect means is connected to said instruction holding means so as to detect executability of the least recently decoded instruction among the decoded instructions held by said instruction holding means, and one of said plurality of detect means is connected to said instruction holding means so as to detect executablity of the most recently decoded instruction among instructions held by said instruciton holding means.

57. A data processor according to claim 56, wherein said instruction holding means includes pointer means for indicating which decoded instruction is the least recently decoded instruction among the decoded instructions held by said instruction holding means, said pointer means changing the indication of the least recently decoded instruction in response to indication of execution start by said start control means of an instruction which is currently indicated by said pointer means as the least recently decoded instruction.

58. A data processor according to claim 56, wherein said instruction hoiding means includes:
first storage location connected to said decoded means for holding the most recently decoded instruction;
plural second storage locations for holding decoded instructions, said plural storage locations being connected to said first storage location to receive said the most recently decoded instruction from said first storage location when execution start is not indicated by said start control means; wherein said plurality of detect means includes:
first detect means connected to said first storage location for detecting executability of the most recently decoded instruction held by said first storage location and second detect means connected to said plural second storage locations for detecting executability of the least recently decoded instruction among instructions held by said plural second storage locations.

59. A data processor according to claim 54, wherein said start control means includes means for selectively indicating execution start of one executable instruction when plural instructions are detected executable by said plurality of detect means.

60. A data processor according to claim 59, wherein said means in said start control means is means for indicating execution start of one executable decoded instruction which is the least recently decoded instruction among the plural executable decoded instructions.

61. A data processor according to claim, 54 wherein at least part of said plurality of detect means are connected to said instruction holding means so as to detect executability of at least part of plural instruction held by said instruction holding means which part of instructions includes the least recently decoded instruction among instructions held by said instruction holding means and at least one instruction decoded earlier than the most recently decoded instruction among instructions held by said instruction holding means.

62. A data processor according to claim 61, wherein said start control means includes means connected to said instruction holding means and responsive to storing a decoded instruction into said instruction holding means and to execution start of one of said part of said decoded instructions by said start control means, for indicating decode order of at least said part of instructions; and select means for selectively indicating execution start of one of plural instructions which are detected as being executable by said plurality of detect means, so that least recently decoded instruction among said plural executable instructions is executed based upon the indication by said decode order indicating means.

63. A data processor according to claim 53, wherein each data storage area is capable of holding a number of vector elements and includes plural access means operable in parallel each to access a number of vector elements held by each data storage area;

wherein each resource is capable of sequentially receiving vector elements and/or sequentially providing vector elements; and wherein said detect means includes means for indicating that a storage area designated by an instruction held by said instruction holding means is availabe for use when one of the plural access means associated with the designated storage area is not in use of an execution-started instruction.

64. A data processor according to claim 63, wherein said plural access means include write access means for sequentially writing vector elements and read access means for sequentially reading vector elements; and wherein said means included in said detect means includes means for indicating that a storage area disignated by an instruction held by said instruction holding means is available for use even when the write access means associated with said designated storage area is in use for an execution-started instruction, if the instruction requires said read access means associated with said designated storage area.

65. A data processor according to claim 64, wherein said control means includes means connected to a storage area designated by a first execution-started instruction to write of vector elements therein and responsive to execution start given after execution start of the first instruction, of a second instruction which designates said storage area to read vector elements therefrom, for controlling a read operation to said designated storage area so that each vector element is read out for the second instruction after each vector element is written as a result of execution of the first instruction, and in parallel to a write operation of vector elements for the first instruction.

66. A data processor according to claim 63, further comprising:

first status indicating means for indicating a usage status of each resource; and second status indicating means for indicating a usage status of each data storage; wherein said start control means includes means for controlling said first and second status indicating means so that the usage statuses of a resource and a data storage are both required by an execution-start-indicated instruction are changed in response to the execution start of the instruction;

wherein said execution control means includes means for controlling said first and second status indicating means so that the usage statuses of the resource and the data storage area required by the execution-start-indicated instruction are changed respectively in response to the end of the execution of the execution-start instructing; and wherein said detect means is connected to respond to said first and second status indicating means so as to detect presence of an executable instruction.

67. A data processor according to claim 66, wherein each data storage area is capable of holding a number of vector elements; wherein each resource is operable of sequentially receiving vector elements provided thereto and/or for sequentially providing vector elements therefrom; and wherein said execution control means includes: means for sequentially reading vector elements to be provided to a resource designated by an execution-started instruction from a data storage area designated by the execution-started instruction, and/or for sequentially writing vector elements provided by a resource designated by the execution-started instruction into a data storage area designated by the execution-started instruction; and means for controlling said first and second status indicating means respectively in synchronism with receiving or providing of the last vector element of plural vector elements by the resource and in synchronism with reading or writing of the last vector element of plural vector elements from or into the data storage area.

68. A data processor according to claim 53, wherein said detect means includes means for detecting presence of conflict between a later decoded instruction held by said instruction holding means and one or plural instructions decoded earlier than the later decoded instruction and held by said instruction holding means based upon whether or not the later decoded instruction and the one or plural earlier decoded instructions designated mutually the same storage area and at the same time either the later decoded instruction or the one or plural earlier decoded instructions require a write operation to the same storage area.

69. A method of processing vector elements in a computer having a main storage; vector storage means connected to receive vector elements from said main storage, including a plurality of storage areas for holding a plurality of vector elements, each storage area being selected by an instruction, being capable of holding a number of vector elements and being capable of reading and writing in parallel; a plurality of resource means connected to said vector storage means each for sequentially receiving vector elements read out of said vector storage means and/or sequentially providing vector elements to said vector storage means, said plurality of resource means including at least one operation means for performing an operation on vector elements sequentially provided thereto and sequentially providing said vector storage means with vector elements corresponding to the results of the operation on said sequentially provided vector elements, comprising the steps of:

(a) indicating start of execution of a first instruction which is fetched from said main storage and selects a first one of said plurality of resource means and a first one of said plurality of storage areas, said first resource means being capable of sequentially providing vector elements to said vector storage means;

(b) sequentially providing vector elements from said first resource means to said vector storage means in response to the indication of execution start of said first instruction;

(c) sequentially writing the vector elements provided by said first resource means into the first storage area in response to the indication of execution start of the first instruction;

(d) indicating start of execution of a second instruction after and irrespective of the indication timing of execution start of the first instruction, said second instruction selecting the first storage area for reading of vector elements therefrom, and a second one of said plurality of resource means which is capable of sequentially receiving vector elements provided by said vector storage means, (e) beginning to sequentially read the written vector elements from said first storage area in response to the indication of the execution start of the second instruction from before all the vector elements provided by said first resource means are written into said first storage area and by controlling a read operation of each vector element depending upon whether or not each vector element is already written when each vector element is to be read next; and (f) sequentially providing the read out vector elements to said second resource means to be received thereby.

70. A method according to claim 69, wherein said step (b) includes a step of intermittently providing the vector elements from said first resource means to said vector storage means;

wherein said step (c) includes a step of intermittently writing the provided vector elements into said first storage area in synchronism with the supply of the respective vector elements by said first resource means; and wherein said step (e) includes a step of intermittently reading the vector elements from said first storage area, while the result vector elements are being intermittently written into said first storage area with each result vector element being read out of said first storage area after the writing of the respective vector element in said first storage area.

71. A method according to claim 70, wherein said first resource means comprises memory requestor means connected to said main storage for sequentially fetching vector elements from said main storage to provide the fetched vector elements to said vector storage means, said memory requestor means being capable of intermittently fetching the vector elements;

wherein said second resource means is said operation means and said operation means is capable of intermittently receiving vector elements provided intermittently thereto and intermittently generating vector elements corresponding to the results of the operation on said intermittently received vector elements;

wherein said method further includes the steps of;

intermittently fetching vector elements in response to the first instruction from said main storage to said memory requestor means so as to enable said memory requestor means to intermittently provide the fetched vector elements to said vector storage means; and intermittently writing in response to the second instruction vector elements provided intermittently by said operation means into a storage area selected by the second instruction.

72. A method according to claim 71, wherein said step (e) further includes the step of intermittently reading vector elements from a third storage area of said vector storage means selected by said second instruction so that pairs of vector elements are sequentially provided to said operation means as operands therefor, each pair including one and the other vector elements respectively read out of said first and third storage areas.

73. A method according to claim 72, wherein said step (e) includes the step of reading a pair of vector elements to be read out next one vector element from said first storage area and the other vector element from said third storage area, only when the one vector element to be read next and the other vector element to be read next are already written in said first and third storage area respectively.

74. A method according to claim 70, wherein said step (e) includes the steps of detecting whether or not a vector element to be read next is already stored in said first storage area; and reading the next vector element from the storage area in response to an affirmative result of the detection.

75. A method according to claim 70, wherein said first resource means is said operation means, said operation means is capable of intermittently providing vector elements corresponding to results of the operation of vector elements provided intermittently thereto and said second resource means comprises memory requestor means connected to said main storage for sequentially receiving vector elements provided from said vector storage means and sequentially providing the receivd vector elements to said main storage to be stored therein;

wherein said method further includes the steps of:

intermittently reading, in response to the first instruction, vector elements from a second storage area of said vector storage means selected by the first instruction;

providing, in response to the first instruction, the read out vector elements to said operation means so as to enable said operation means to provide said vector storage means with vector elements corresponding to the results of the operation;

intermittently providing, in response to the second instruction, the intermittently read out vector elements to said main storage from said memory requestor means to be stored in said main storage.

76. A method according to claim 70, further including the steps of:

indicating usage status of the vector storage means as to whether or not each of the storage areas of said vector storage means is in use for read of vector elements therefrom and whether or not each of the sotrage areas is in use for writing of vector elements therein;

indicating usage status of the plurality of resource means; and decoding instructions sequentially and detecting, based upon the indications of the usage status of said vector storage means and the usage status of said plurality of resource means, whether or not a storage area of said vector storage means selected by a decoded instruction is available for use, wherein a storage area of said vector storage means under use for writing of vector elements therein for a previously execution-started instruction is regarded as available for reading of vector elements therefrom and at the same time whether or not one of said plurality of resource means selected by the decoded instruction is available for use, wherein each of said steps (a) and (d) is executed in responsse to an affirmative result of the detection by the decoding and detecting step for the first and second instructions, respectively.

77. A method according to claim 69, wherein said step (e) includes the step of starting to sequentially read the written vector elements from the first selected storage area before all the vector elements are written and from a timing which is dependent upon both a write timing of one of the vector elements written first and the indication timing of start of execution of the second instruction.

78. A method according claim 69, wherein said step (e) includes the step of starting the reading of the vector elements from said first selected storage area as soon as the first one of the vector elements is written therein, when the start of execution of the second instruction is indicated by said instruction means before the first vector element is written into said first selected storage area.

79. A method according to claim 69, wherein said step (e) includes the step of starting reading of the vector elements from said first selected storage area as soon as the start of execution of the second instruction is indicated by said instruction means when the execution start of the second instruction is indicated after one or plural vector elements are already written into said first selected storage area.

* * * * *